US010928265B2

(12) United States Patent
Brucker et al.

(10) Patent No.: US 10,928,265 B2
(45) Date of Patent: Feb. 23, 2021

(54) GAS ANALYSIS WITH AN INVERTED MAGNETRON SOURCE

(71) Applicant: MKS Instruments, Inc., Andover, MA (US)

(72) Inventors: Gerardo A. Brucker, Longmont, CO (US); Timothy C. Swinney, Fort Collins, CO (US); Clinton L. Percy, Windsor, CO (US)

(73) Assignee: MKS Instruments, Inc., Andover, MA (US)

( * ) Notice: Subject to any disclaimer, the term of this patent is extended or adjusted under 35 U.S.C. 154(b) by 108 days.

(21) Appl. No.: 16/397,436

(22) Filed: Apr. 29, 2019

(65) Prior Publication Data

US 2019/0368959 A1    Dec. 5, 2019

Related U.S. Application Data

(60) Provisional application No. 62/677,386, filed on May 29, 2018, provisional application No. 62/717,634, filed on Aug. 10, 2018.

(51) Int. Cl.
*G01L 21/34* (2006.01)
*H01J 41/06* (2006.01)

(52) U.S. Cl.
CPC .............. *G01L 21/34* (2013.01); *H01J 41/06* (2013.01)

(58) Field of Classification Search
CPC ........ G01L 21/30; G01N 27/62; G01N 27/64; H01J 41/00; H01J 41/02
See application file for complete search history.

(56) References Cited

U.S. PATENT DOCUMENTS

| 2,770,772 A | 11/1956 | Foulkes et al. |
| 3,342,990 A | 11/1967 | Barrington et al. |
| 3,835,319 A | 9/1974 | Roehrig et al. |
| 4,303,865 A | 12/1981 | Swingler |
| 4,542,321 A | 9/1985 | Singh et al. |
| 4,774,437 A | 9/1988 | Helmer et al. |
| 5,089,746 A | 2/1992 | Rosenblum et al. |
| 5,157,333 A | 10/1992 | Peacock et al. |

(Continued)

FOREIGN PATENT DOCUMENTS

| DE | 102016105222 A1 | 5/2016 |
| EP | 3 100 020 B1 | 1/2019 |

(Continued)

OTHER PUBLICATIONS

International Search Report and Written Opinion for International Application No. PCT/US2019/033343, entitled "Gas Analysis with an Inverted Magnetron Source", dated Nov. 7, 2019.
Invitation to Pay Additional Fees for International Application No. PCT/US2019/033343, entitled "as Analysis with an Inverted Magnetron Source", dated Sep. 12, 2019.
Barrington, A.E., et al., "An Inverted Magnetron Helium Leak Detector," Journal of Vacuum Science and Technology, 2, pp. 198-202 (1965).

(Continued)

*Primary Examiner* — Tung X Nguyen
(74) *Attorney, Agent, or Firm* — Hamilton, Brook, Smith & Reynolds, P.C.

(57) ABSTRACT

A total pressure cold cathode ionization gauge is disclosed. An inverted magnetron electrode design is capable of simultaneously detecting and measuring total gas pressure in a high vacuum system, along with partial pressures of one or more gases, such as hydrogen, helium and water. In addition, a leak detector, such as a helium leak detector, is disclosed with a compact counterflow arrangement of a gas inlet passage to an ion detection passage.

65 Claims, 69 Drawing Sheets

(56) References Cited

U.S. PATENT DOCUMENTS

| | | | |
|---|---|---|---|
| 5,210,413 A | 5/1993 | Balzer | |
| 5,568,053 A | 10/1996 | Drubetsky et al. | |
| 6,761,804 B2 | 7/2004 | Perrin | |
| 7,098,667 B2 | 8/2006 | Liu | |
| 7,129,708 B1 | 10/2006 | Liu et al. | |
| 8,120,366 B2 | 2/2012 | Kawasaki | |
| 8,324,904 B2 | 12/2012 | Kawasaki | |
| 8,384,391 B2 | 2/2013 | Kawasaki et al. | |
| 8,456,167 B2 | 6/2013 | Key | |
| 8,648,604 B2* | 2/2014 | Brucker | G01L 21/32 324/460 |
| 8,947,098 B2* | 2/2015 | Carmichael | G01L 21/32 324/460 |
| 9,116,065 B2 | 8/2015 | Andreaus | |
| 9,316,555 B2 | 4/2016 | Enomoto et al. | |
| 9,588,004 B2 | 3/2017 | Brucker et al. | |
| 10,222,287 B2 | 3/2019 | Kawasaki et al. | |
| 2006/0049738 A1* | 3/2006 | Tabata | C01B 13/11 313/362.1 |
| 2010/0259273 A1 | 10/2010 | Kawasaki et al. | |
| 2015/0091579 A1 | 4/2015 | Brucker et al. | |

FOREIGN PATENT DOCUMENTS

| | | |
|---|---|---|
| GB | 895602 | 5/1962 |
| WO | 2017/211627 A1 | 12/2017 |
| WO | 2019/231765 A1 | 12/2019 |

OTHER PUBLICATIONS

Blum, P., et al., "Cold Cathode Quadrupole Mass Spectrometer," The Review of Scientific Instruments, vol. 38, No. 10 (Oct. 1967).

Emlin, D.R., et al., "Cold-cathode source of ribbon gaseous ion beams," Review of Scientific Instruments, vol. 75, No. 5 (May 2004).

Inficon, Operating Manual, Inverted Magnetron Pirani Gauge, pp. 1-32 (Oct. 2008).

Torney, F.L., et al., "Lunar Mass Spectrometer Test Program," National Research Corporation for National Aeronautics and Space Administration, Final Report, 83 pages (1972).

Torney, F.L., et al., "Research and Development Program on the Use of Counting Techniques," National Aeronautics and Space Administration (Mar. 1971).

* cited by examiner

FIG. 20A
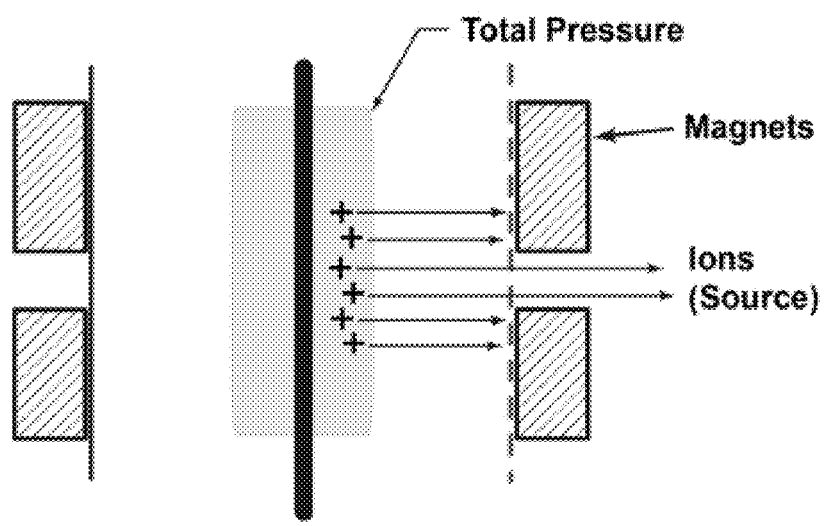
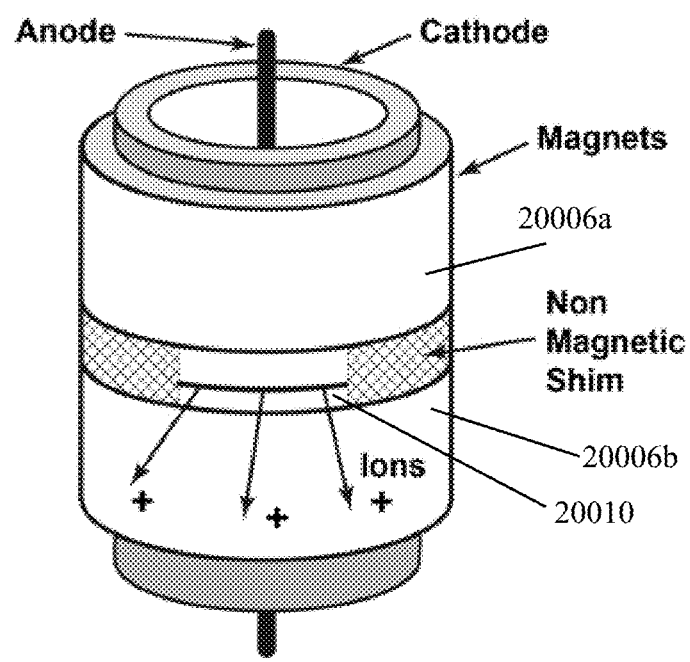
FIG. 20B

Deflector Control Circuit

66241

Sawtooth Voltage Processor

66283

Peak Width Control Processor

66285

Deflector Voltage Scanning Processor

66287

Anode Voltage Deflector Control Processor

Anode Voltage Control Circuit

67164

| Low Voltage Setting Circuit | High Voltage Setting Circuit |
|---|---|
| 67291 | 67293 |

FIG. 67

GAS ANALYSIS WITH AN INVERTED MAGNETRON SOURCE

RELATED APPLICATIONS

This application claims the benefit of U.S. Provisional Application No. 62/677,386, filed on May 29, 2018, and claims the benefit of U.S. Provisional Application No. 62/717,634, filed on Aug. 10, 2018. The entire teachings of the above applications are incorporated herein by reference.

BACKGROUND

There is an ongoing need to facilitate trouble shooting in high vacuum processes. High vacuum processes typically follow a workflow that starts with a pumpdown of a vacuum chamber from atmospheric pressure. The user tracks the pressure of the vacuum chamber during the pumpdown and, when the total pressure meets a target pressure, the vacuum process or experiment can start. There is generally an expectation that the target pressure will be met within a pre-specified time range. If the target pressure is not reached after an expected period of time, or it takes longer than usual to reach it, the vacuum system user needs to troubleshoot the vacuum chamber. Often, troubleshooting requires not only using an ionization gauge, but also the need to break vacuum to use a helium leak detector, and sometimes, to use an expensive Residual Gas Analyzer to measure water levels.

There is, therefore, an ongoing need to provide equipment that reduces the time and expense involved in troubleshooting high vacuum processes.

SUMMARY

A total pressure cold cathode ionization gauge is disclosed. An inverted magnetron electrode design is capable of simultaneously detecting and measuring total gas pressure in a high vacuum system, along with partial pressures of one or more gases, such as hydrogen, helium and water. The cold cathode ionization gauge includes a cold ionization source with an inverted magnetron discharge to generate a pure electron plasma and to produce ions via electron impact with gas molecules, without any need for a hot cathode.

In one embodiment, there is provided an inverted magnetron cold cathode ionization vacuum gauge. The vacuum gauge comprises an anode electrode, and a cathode electrode assembly surrounding a length of the anode electrode that is positioned to create an electric field in a discharge space between the cathode electrode assembly and the anode electrode. A magnet assembly is positioned to define a magnetic field across the electric field. An opening in the cathode electrode assembly is positioned to permit entry of a gas from a monitored chamber into the discharge space such that ions of the gas are formed in the discharge space to be accelerated by the electric field in a direction towards the cathode electrode assembly. A source aperture in the cathode electrode assembly is positioned to emit a portion of the ions of the gas out of the cathode electrode assembly. The magnet assembly is positioned to angularly displace the emitted portion of the ions based on a mass to charge ratio of ions of the gas. A detector is positioned to detect a displaced ion component of the emitted portion of the ions. Ion current measurement circuitry is electrically connected to measure a total current flowing between the anode electrode and the cathode electrode assembly, and is electrically connected to measure a current produced from receipt of the displaced ion component at the detector.

In further, related embodiments, the inverted magnetron cold cathode ionization vacuum gauge may further comprise a total pressure display, in electrical connection with the ion current measurement circuitry, providing an indication of a total pressure of the gas from the monitored chamber; and a partial pressure display, in electrical connection with the ion current measurement circuitry, providing an indication of a partial pressure of a gas from the monitored chamber. The vacuum gauge may further comprise a gas inlet passage positioned to flow the gas from the monitored chamber to the opening in the cathode electrode assembly, wherein the emitted portion of the ions travel in a direction counter to the flow of the gas from the monitored chamber in the gas inlet passage. The detector may be positioned at a side edge of the gas inlet passage, or in the center of the gas inlet passage. The vacuum gauge may further comprise an electrostatic shield grid positioned between the source aperture and the detector. The vacuum gauge may further comprise an energy filter grid positioned between the source aperture and the detector. The detector may comprise an ion shield, a detector aperture and a Faraday collector. The vacuum gauge may comprise more than one detector, each of the more than one detectors being positioned to detect a different one of more than one different displaced ion components of the emitted portion of the ions. The vacuum gauge may comprise more than one detector, comprising an array of Faraday collectors. The vacuum gauge may comprise an energy filter grid positioned between the source aperture and the array of Faraday collectors. The detector may comprise an electron multiplier. The vacuum gauge may comprise more than one source aperture.

In other related embodiments, the vacuum gauge may comprise a power supply, and a current limiting circuit, which may comprise a current limiting resistor, electrically connected between the power supply and the anode electrode. An anode voltage control circuit may be configured to maintain a constant voltage of the anode electrode independent of the total current flowing between the anode electrode and the cathode electrode assembly. An anode voltage control circuit may be configured to vary a voltage of the anode electrode based on the total current flowing between the anode electrode and the cathode electrode assembly. A magnetic field extension assembly, which may comprise a ferromagnetic material, may be positioned to extend the magnetic field outside the cathode electrode assembly. A high pass ion energy filter, which may comprise a voltage source applying a bias voltage to the detector, may be configured to permit only ions that have energies higher than a desired threshold energy to reach the detector. A voltage source may be configured to vary a bias voltage of the high pass ion energy filter based on a voltage of the anode electrode. A low pass ion energy filter may be configured to permit only ions that have energies lower than a desired threshold energy to be detected. The low pass ion energy filter may comprise a voltage-biased deflector plate and a collector plate of the detector. The deflector plate may be perpendicular to a path of a beam of the displaced ion component of the emitted portion of the ions; or may be angled relative to a path of a beam of the displaced ion component of the emitted portion of the ions, with the collector plate being off an axis of the beam of the displaced ion component. The magnet assembly may comprise a pair of flat plate magnets positioned to define both the magnetic field across the electric field and an external magnetic field outside the cathode electrode assembly. The magnet assembly may comprise a cylindrical magnet, the cylindrical magnet surrounding the cathode electrode assembly and comprising an opening coinciding with the source aperture, the cylindrical magnet defining both the magnetic field across the electric field and an external fringe magnetic field outside the cathode electrode assembly.

In further related embodiments, the vacuum gauge may further comprise a total pressure determination circuit configured to determine a total pressure of the gas from the monitored chamber based at least on a total current flowing between the anode electrode and the cathode electrode assembly. A source aperture grid may be positioned over the source aperture. A flux control detector may be positioned to collect a fraction of the emitted portion of the ions; and a flux feedback circuit may be configured to adjust a high voltage power supply, which is electrically connected to power the anode electrode, based on a current received from the flux control detector. A magnetic sector or a quadrupole filter may be positioned between the source aperture and the detector; and the source aperture may be positioned to emit the ions of the gas into a time-of-flight mass spectrometer, an ion trap or a Radio Frequency dynamic ion trap.

In other related embodiments, the displaced ion components may comprise at least one of: helium ions, hydrogen ions, water ions, and residual gas ions. The displaced ion components may comprise helium ions separated from other components of the gas from the monitored chamber. The displaced ion components may comprise water ions separated from other components of the gas from the monitored chamber; or may comprise both displaced helium ions and displaced water ions, each separated from each other and from other components of the gas from the monitored chamber.

In further related embodiments, the vacuum gauge may comprise a cathode rotation coupling. An electronically controlled actuator may be coupled to the cathode rotation coupling. An ion beam deflector, such as a pair of parallel plates or a pair of curved plates, may be positioned between the source aperture and the detector. A deflector power supply may be electrically connected to the ion beam deflector to create an electrostatic field between a pair of deflector plates of the ion beam deflector. The deflector power supply may be electrically connected to (i) provide a positive deflector bias voltage to a first deflector plate of the ion beam deflector relative to a ground voltage of a second deflector plate of the ion deflector, or (ii) provide a negative deflector bias voltage to the first deflector plate relative to the ground voltage of the second deflector plate, or (iii) provide a first deflector bias voltage to the first deflector plate and a second deflector bias voltage to the second deflector plate.

In other related embodiments, a deflector control circuit may be configured to supply a deflector control signal to the deflector power supply. The deflector control circuit may be configured to vary a voltage of the deflector power supply to cause the ion beam deflector to vary a deflection of the displaced ion component of the emitted portion of the ions. The deflector control circuit may be configured to vary the voltage of the deflector power supply based on (i) a triangular sawtooth variation of the voltage with time, or (ii) a voltage waveform to control a peak width and temporal position, relative to other ion components, of the displaced ion component. The deflector control circuit may be configured to scan a voltage of the deflector power supply to cause the ion beam deflector to deflect plural ion components to be detected by the detector in succession as the voltage of the deflector power supply is scanned. The deflector control circuit may be configured to scan the voltage of the deflector power supply to permit detection of a mass spectrum of the plural ion components. One of the ion components may be a residual gas; and the vacuum gauge may further comprise a residual gas partial pressure measurement circuit configured to determine a residual gas partial pressure based on a current produced by the detector. One of the ion components may be water; and the vacuum gauge may further comprise a water partial pressure measurement circuit configured to determine a water partial pressure based on a current produced by the detector. One of the ion components may be helium; and the vacuum gauge may further comprise a helium partial pressure measurement circuit configured to determine a helium partial pressure based on a current produced by detection of the helium by the detector. An automatic baseline correction circuit may be configured to perform a baseline correction of the helium partial pressure. One of the ion components may be hydrogen.

In further, related embodiments, the deflector control circuit may be configured to control a voltage of the deflector power supply to cause the ion beam deflector to direct displaced ion components having different energies and a common ion component mass to be focused through a detector aperture of the detector. The vacuum gauge may further comprise a cathode rotation coupling, and an actuator configured to rotate the cathode electrode assembly using the cathode rotation coupling so that the displaced ion components having different energies are directed to the detector at the voltage of the deflector power supply that causes the displaced ion components having different energies to be focused through the detector aperture of the detector. The displaced ion components having different energies to be focused may comprise a water ion component, and may comprise a residual gas ion component. The deflector control circuit may be configured to vary a voltage of the deflector power supply, as a voltage of the anode electrode changes, to cause the ion beam deflector to direct the displaced ion component to the detector without changing a time position of the displaced ion component at the detector relative to other ion components as the voltage of the anode electrode changes. The vacuum gauge may further comprise a high pass ion energy filter configured to permit only ions that have energies higher than a desired threshold energy to be detected. A high energy filter control circuit may be configured to reduce a bias voltage of the high pass ion energy filter in proportion to a voltage of the anode electrode.

In further related embodiments, a partial pressure display, in electrical connection with the ion current measurement circuitry, may provide an indication of a partial pressure of a gas from the monitored chamber; and a partial pressure determination circuit may be configured to determine the partial pressure of the gas from the monitored chamber based at least on the current, produced from receipt of the displaced ion component at the detector, measured by the ion current measurement circuitry. The vacuum gauge may be included in a modular unit comprising: a total pressure display, in electrical connection with the ion current measurement circuitry, providing an indication of a total pressure of the gas from the monitored chamber; a partial pressure display, in electrical connection with the ion current measurement circuitry, providing an indication of a partial pressure of a gas from the monitored chamber; and the ion current measurement circuitry. The vacuum gauge may further comprise a water partial pressure display, in electrical connection with the ion current measurement circuitry, providing an indication of a partial pressure of water in the gas from the monitored chamber; and may comprise a water percentage display providing an indication of a water percentage of the gas in the monitored chamber. A water percentage determination circuit may be configured to determine the water percentage based at least on: (i) the total current, flowing between the anode electrode and the cathode electrode assembly, measured by the ion current measurement circuitry, (ii) the current, produced from receipt of the displaced ion component at the detector, measured by the ion current measurement circuitry, and (iii) a ratio of a cross sectional area of the source aperture to a surface area of a portion of the cathode electrode assembly exposed to the ions of the gas. The vacuum gauge may further comprise a residual gas to water ratio display, providing an indication of a ratio of a partial pressure of water from the monitored chamber to a partial pressure of residual gases from the monitored chamber; and a residual gas to water ratio determination circuit configured to determine the ratio of the partial pressure of water to the partial pressure of residual gases based at least on the current, produced from receipt of the displaced ion component at the detector, measured by the ion current measurement circuitry. The magnet assembly may be radially symmetric about an axis across the electric field.

In further, related embodiments, the ion current measurement circuitry may comprise an ion current measurement circuit electrically connected to measure both the total current flowing between the anode electrode and the cathode electrode assembly, and the current produced from receipt of the displaced ion component at the detector. The ion current measurement device may comprise a multiplexer, which may be electrically connected to receive a plurality of ion current signals comprising a first ion current signal from the total current flowing between the anode electrode and the cathode electrode assembly, and a second ion current signal from the current produced from receipt of the displaced ion component at the detector. The ion current measurement circuitry may comprise a first ion current measurement circuit electrically connected to measure the total current flowing between the anode electrode and the cathode electrode assembly, and a second ion current measurement circuit electrically connected to measure the current produced from receipt of the displaced ion component at the detector. The ion current measurement circuitry may comprise a first ammeter electrically connected to measure the total current flowing between the anode electrode and the cathode electrode assembly, and a second ammeter electrically connected to measure the current produced from receipt of the displaced ion component at the detector. The inverted magnetron cold cathode ionization vacuum gauge may further comprise a dual signal leak detection circuit configured to determine a concurrent occurrence of both: (i) a decrease in the total current, flowing between the anode electrode and the cathode electrode assembly, measured by the ion current measurement circuitry, and (ii) an increase in the current, produced from receipt of the displaced ion component at the detector, measured by the ion current measurement circuitry. A dual signal leak detection display may comprise an indication of pressure data for a leak based on the concurrent occurrence determined by the dual signal leak detection circuit.

In other related embodiments, the inverted magnetron cold cathode ionization vacuum gauge may further comprise a detector shield surrounding a length of the detector, the detector shield comprising a detector aperture. The vacuum gauge may comprise an energy filter grid surrounding or covering the detector aperture. A detector shield electrical connector may be in electrical connection between the detector shield and a voltage source applying a bias voltage to the detector shield. The vacuum gauge may further comprise a detector shield rotation coupling; and may further comprise a detector rotation coupling. The detector of which a length is surrounded by the detector shield may comprise a Faraday collector, which may comprise a Faraday cup comprising a side shield. The detector shield may be grounded. The vacuum gauge may further comprise a magnet rotation coupling.

In further related embodiments, a magnetic field extension assembly may be positioned to extend the magnetic field in a direction extending longitudinally from the source aperture towards the detector. The magnetic field extension assembly may comprise a magnet positioned to increase a magnetic field between the magnet assembly and the detector; and may comprise a magnetic yoke surrounding at least part of an outside of a passage that extends between the source aperture and the detector. The magnet assembly may comprise a monolithic magnet that extends over the cathode assembly and extends in a direction extending longitudinally from the source aperture towards the detector.

In another related embodiment, the inverted magnetron cold cathode ionization vacuum gauge may comprise a portion of a combination gauge that further comprises a high pressure total pressure sensor connected to measure a total pressure of the gas from the monitored chamber when the total pressure is greater than a threshold total pressure, and the inverted magnetron cold cathode ionization vacuum gauge may be connected to measure the total pressure of the gas from the monitored chamber when the total pressure is less than the threshold total pressure of the high pressure total pressure sensor. The high pressure total pressure sensor may comprise a Pirani total pressure sensor or a combination of a Pirani gauge and a Piezo differential pressure sensor, and the threshold total pressure may be one of: about $10^{-4}$ Torr or about $10^{-5}$ Torr.

In another embodiment according to the invention, there is provided an inverted magnetron cold cathode ionization vacuum gauge comprising an anode electrode and a cathode electrode assembly surrounding a length of the anode electrode and positioned to create an electric field in a discharge space between the cathode electrode assembly and the anode electrode. A magnet assembly is positioned to define a magnetic field across the electric field. An opening in the cathode electrode assembly is positioned to permit entry of a gas from a monitored chamber into the discharge space such that ions of the gas are formed in the discharge space to be accelerated by the electric field in a direction towards the cathode electrode assembly. A source aperture in the cathode electrode assembly is positioned to emit a portion of the ions of the gas out of the cathode electrode assembly. The magnet assembly is positioned to angularly displace the emitted portion of the ions based on a mass to charge ratio of ions of the gas. A detector is positioned to detect a displaced ion component of the emitted portion of the ions. Ion current measurement circuitry is electrically connected to measure a current produced from receipt of the displaced ion component at the detector. A gas inlet passage is positioned to flow the gas from the monitored chamber to the opening in the cathode electrode assembly, wherein the emitted portion of the ions travel in a direction counter to the flow of the gas from the monitored chamber in the gas inlet passage.

In further, related embodiments, the displaced ion components may comprise helium ions separated from other components of the gas from the monitored chamber.

In another embodiment according to the invention, there is provided an inverted magnetron cold cathode ionization source. The ionization source comprises an anode electrode; a cathode electrode assembly surrounding a length of the anode electrode and positioned to create an electric field in a discharge space between the cathode electrode assembly and the anode electrode; and a magnet assembly positioned to define a magnetic field across the electric field. An opening in the cathode electrode assembly is positioned to permit entry of a gas from a chamber into the discharge space such that ions of the gas are formed in the discharge space to be accelerated by the electric field in a direction towards the cathode electrode assembly. A source aperture in the cathode electrode assembly is positioned to emit a portion of the ions of the gas out of the cathode electrode assembly. A magnetic sector, a quadrupole mass filter, a time-of-flight mass spectrometer, an ion trap, or a Radio Frequency dynamic ion trap, is positioned to receive the ions of the gas emitted from the source aperture.

In further, related embodiments, a gas inlet passage may be positioned to flow the gas from the monitored chamber to the opening in the cathode electrode assembly, wherein the emitted portion of the ions travel in a direction counter to the flow of the gas from the monitored chamber in the gas inlet passage. The ionization source may further comprise ion current measurement circuitry electrically connected to measure a total current flowing between the anode electrode and the cathode electrode assembly. A total pressure display, in electrical connection with the ion current measurement circuitry, may provide an indication of a total pressure of the gas from the chamber.

In another embodiment according to the invention, there is provided a method of measuring a total pressure and a partial pressure from a gas in a monitored chamber. The method comprises applying a voltage between an anode electrode and a cathode electrode assembly of an inverted magnetron cold cathode ionization vacuum gauge, the cathode electrode assembly surrounding a length of the anode electrode, to create an electric field in a discharge space between the cathode electrode assembly and the anode electrode. A magnetic field is defined across the electric field using a magnet assembly. Entry of a gas from the monitored chamber into the discharge space is permitted, through an opening in the cathode electrode assembly, such that ions of the gas are formed in the discharge space to be accelerated by the electric field in a direction towards the cathode electrode assembly. A portion of the ions of the gas are emitted out of the cathode electrode assembly through a source aperture in the cathode electrode assembly. The emitted portion of the ions are angularly displaced based on a mass to charge ratio of ions of the gas, using the magnet assembly. A displaced ion component of the emitted portion of the ions, is detected using a detector. A total current flowing between the anode electrode and the cathode electrode assembly is measured using ion current measurement circuitry; and an indication of a total pressure of the gas from the monitored chamber is displayed based on the total current measured by the ion current measurement circuitry. A current produced from receipt of the displaced ion component at the detector is measured using the ion current measurement circuitry; and an indication of a partial pressure of a gas from the monitored chamber is displayed based on the current, produced from receipt of the displaced ion component at the detector, measured by the ion current measurement circuitry.

In further, related embodiments, the method may further comprise maintaining a constant voltage of the anode electrode independent of the total current flowing between the anode electrode and the cathode electrode assembly. The method may further comprise performing high pass ion energy filtering to permit only ions of the emitted portion of the ions that have energies higher than a desired threshold energy to reach the detector; or performing low pass ion energy filtering to permit only ions of the emitted portion of the ions that have energies lower than a desired threshold energy to reach the detector. The method may further comprise diagnosing a vacuum system comprising the monitored chamber, the method further comprising measuring a current produced from receipt of a water ion component at the detector using the ion current measurement circuitry, and measuring a current produced from receipt of a residual gas ion component at the detector using the ion current measurement circuitry.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 20A is a schematic side view diagram, and FIG. 20B is a projection view, of an inverted magnetron cold cathode ionization vacuum gauge with a radially directed elongated source aperture, in accordance with an embodiment of the invention.

FIG. 60 is a cross-sectional view of the vacuum gauge of FIG. 59, along the line A-A of FIG. 59.

FIG. 66 is a schematic block diagram of a deflector control circuit, in accordance with an embodiment of the invention.

FIG. 67 is a schematic block diagram of an anode voltage control circuit, in accordance with an embodiment of the invention.

DETAILED DESCRIPTION

A description of example embodiments follows.

In accordance with an embodiment of the invention, a total pressure cold cathode ionization gauge, with an inverted magnetron electrode design, is capable of simultaneously detecting and measuring total gas pressure in a high vacuum system, along with partial pressures of one or more gases, such as hydrogen, helium and water. The cold cathode ionization gauge includes a cold ionization source with an inverted magnetron discharge to generate a pure electron plasma and to produce ions via electron impact with gas molecules, without any need for a hot cathode. The cold cathode ionization gauge can be used for trouble shooting vacuum systems, for helium leak detection, water percentage determination, and other uses described below. In addition, the cold ionization source can be used as a source for magnetic sectors, quadrupole mass filters and other systems described below.

Figure 1:
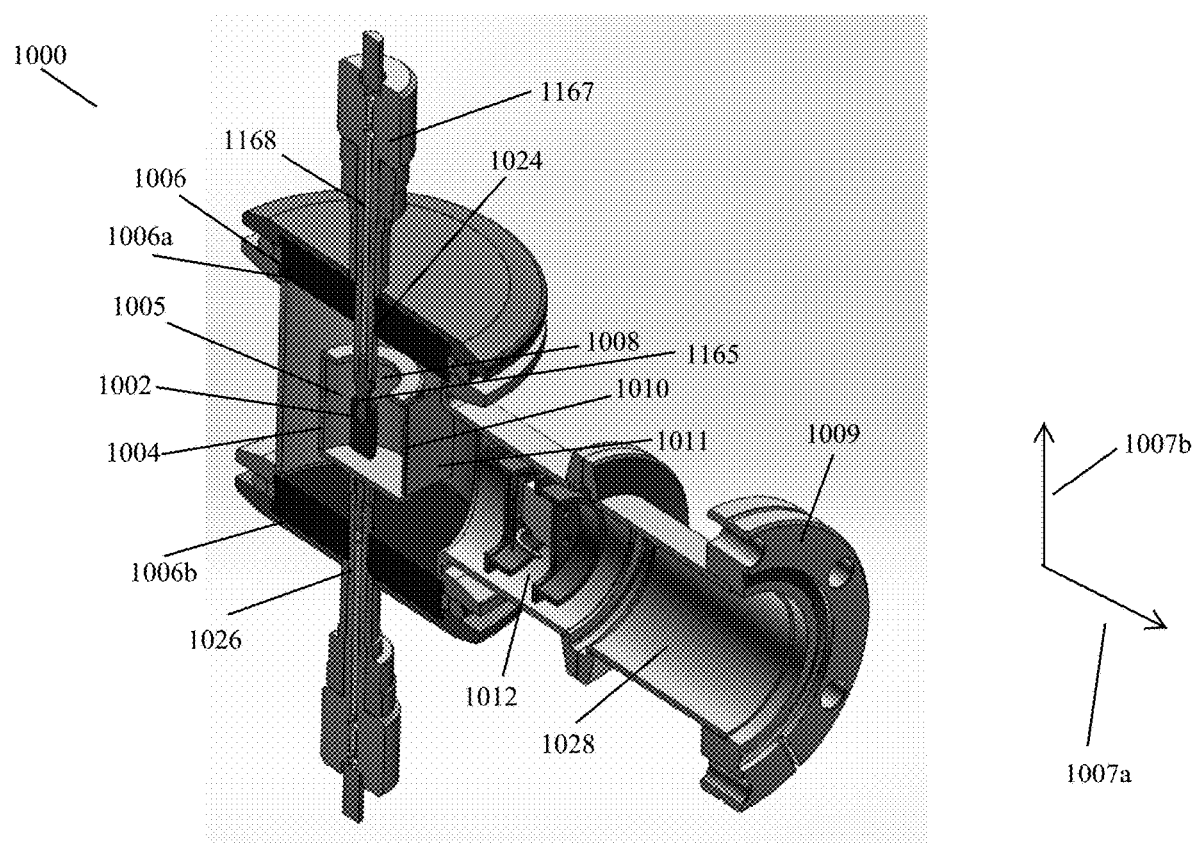
FIG. 1 is a cross-sectional projection view of an inverted magnetron cold cathode ionization vacuum gauge in accordance with an embodiment of the invention.
Figure 2A:
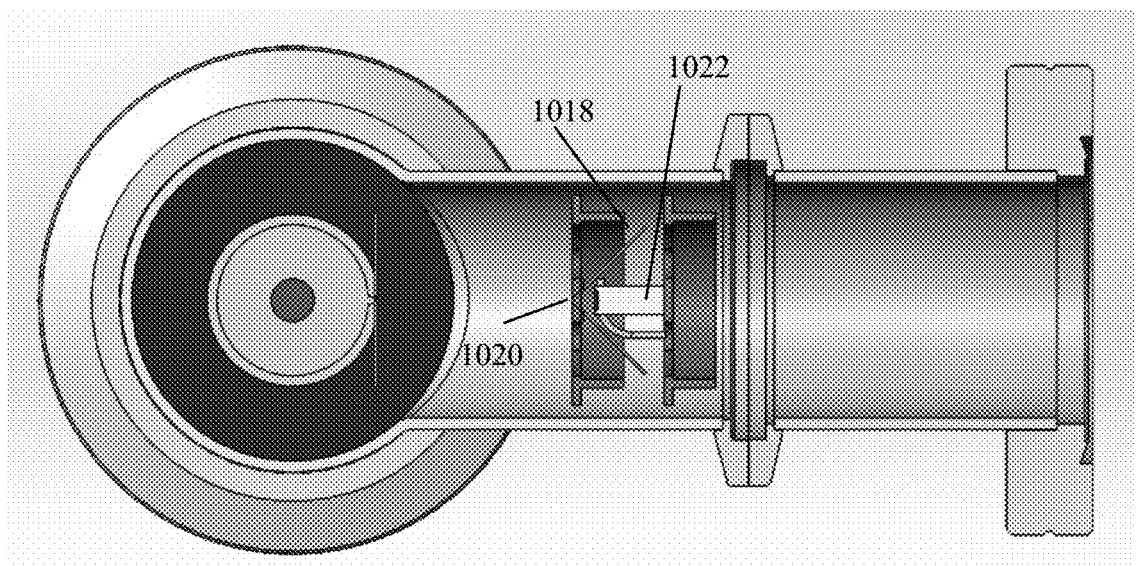
FIG. 2A is a cross-sectional top view of the inverted magnetron cold cathode ionization vacuum gauge of FIG. 1.

FIG. 1 is a cross-sectional projection view of an inverted magnetron cold cathode ionization vacuum gauge 1000 in accordance with an embodiment of the invention. FIG. 2A is a cross-sectional top view and FIG. 2B is a projection view of the vacuum gauge 1000 of FIG. 1.

Figure 2B:
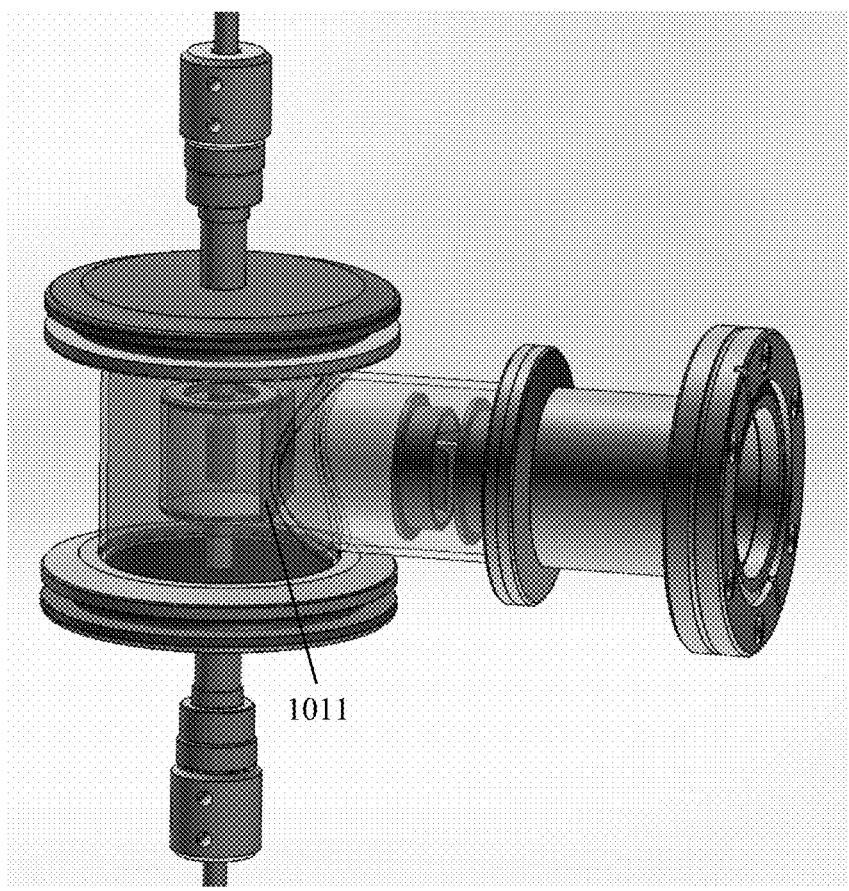
FIG. 2B is a projection view of the inverted magnetron cold cathode ionization vacuum gauge of FIG. 1.

With reference to the embodiment of FIGS. 1, 2A and 2B, the vacuum gauge 1000 includes an anode electrode 1002 and a cathode electrode assembly 1004 surrounding a length of the anode electrode 1002. The cathode electrode assembly 1004 can, for example, be of a cylindrical shape, and can completely or partially surround a length of the anode electrode 1002. Alternatively, a non-cylindrical shape can be used for the cathode electrode assembly 1004, such as a square shape. The cathode electrode assembly 1004 can be a single piece cathode electrode, or can be formed of two or more cathode electrode sections (such as two half-cylinders) that together form the cathode electrode assembly 1004. The cathode electrode assembly 1004 is positioned to create an electric field in a discharge space 1005 between the cathode electrode assembly 1004 and the anode electrode 1002, when a voltage is applied between the anode electrode 1002 and the cathode electrode assembly 1004. Although two separate ground insulated feedthroughs 1024 and 1026 respectively are shown in FIG. 1 for the anode electrode 1002 and the cathode electrode assembly 1004, it will be appreciated that both electrodes 1002 and 1004 need not be ground insulated, and the electrical feedthrough connections 1024 and 1026 can enter the vacuum components through a single feedthrough point rather than from two sides. The electrical feedthroughs 1024 and 1026 can include a threaded metal connector 1165 to connect to each of the anode electrode 1002 and cathode electrode assembly 1004, and an insulator 1167 (such as a plastic insulator, made for example of PEEK polymer, or for example, Vespel glass or a ceramic such as alumina), containing an internal bore 1168 through which wire connections can be made to each of the anode electrode 1002 and the cathode electrode assembly 1004.

Continuing with the embodiment of FIGS. 1, 2A and 2B, a magnet assembly 1006 is positioned to define a magnetic field across the electric field, so that the magnetic field and the electric field are in a cross-field arrangement, with the electric field lines being perpendicular to the magnetic field lines. For example, in FIG. 1, the electric field can extend in a radial direction 1007a between the anode electrode 1002 and the cathode electrode assembly 1004, while the magnetic field extends perpendicularly between two flat plate magnets 1006a and 1006b of the magnet assembly 1006, so that the magnetic field extends in a direction 1007b perpendicular to the electric field. Although flat plate magnets 1006a and 1006b are shown, it will be appreciated that other shapes of magnets can be used to provide a cross-field magnetic field. An opening 1008 in the cathode electrode assembly 1004 is positioned to permit entry of a gas from a monitored chamber (not shown) into the discharge space 1005 such that ions of the gas are formed in the discharge space 1005 to be accelerated by the electric field in a direction towards the cathode electrode assembly 1004. For example, a flange 1009 can be used to attach to a source of gas from the monitored chamber (not shown), so that gas travels through a gas inlet passage 1028 and into the opening 1008 in the cathode electrode assembly 1004. A source aperture 1010 in the cathode electrode assembly 1004 is positioned to emit a portion of the ions of the gas, which are formed in the discharge space 1005, out of the cathode electrode assembly 1004. In FIGS. 1, 2A and 2B, the source aperture 1010 is formed by a vertical slit between two source aperture plates 1011 (one of which is shown in the section view of FIG. 1, and two in FIG. 2B), but it will be appreciated that a variety of different possible shapes of source apertures 1010 can be used.

The magnet assembly 1006 is positioned to angularly displace the emitted portion of the ions based on a mass to charge ratio of ions of the gas, for example by defining the magnetic field in the cross-field direction 1007b across the radial direction 1007a. A detector 1012 is positioned to detect a displaced ion component of the emitted portion of the ions, which may be a separated ion stream of a displaced ion component, such as a separated stream of ions of helium, hydrogen, water or one or more residual gases of molecular weight higher than water (such as nitrogen). As used herein, a "residual gas" is an ion component that is of a molecular weight higher than water. The detector 1012 can, for example, include an ion shield 1018 (see FIG. 2A), a detector aperture 1020 (see FIG. 2A) and a Faraday collector 1022 (see FIG. 2A). As discussed further below, ion current measurement circuitry (which can, for example, include a first current measurement circuit 12014, see FIG. 12) is electrically connected to measure a total current, $I_{total}$ (see FIG. 12) flowing between the anode electrode 1002 and the cathode electrode assembly 1004. As discussed below, this total current, $I_{total}$, is used to determine a total pressure of the gas in the monitored chamber. In addition, as discussed further below, the ion current measurement circuitry (which can, for example, include a second current measurement circuit 12016, see FIG. 12) is electrically connected to measure a current, $I_{signal}$, produced from receipt of the displaced ion component at the detector 1012. As discussed below, this current, $I_{signal}$, from the detector 1012 is used to determine a partial pressure of a gas in the monitored chamber, such as a partial pressure of helium, hydrogen, water or nitrogen. In this way, the vacuum gauge functions as both a total pressure gauge and a partial pressure gauge for components such as helium, hydrogen, water or nitrogen.

Figure 3:
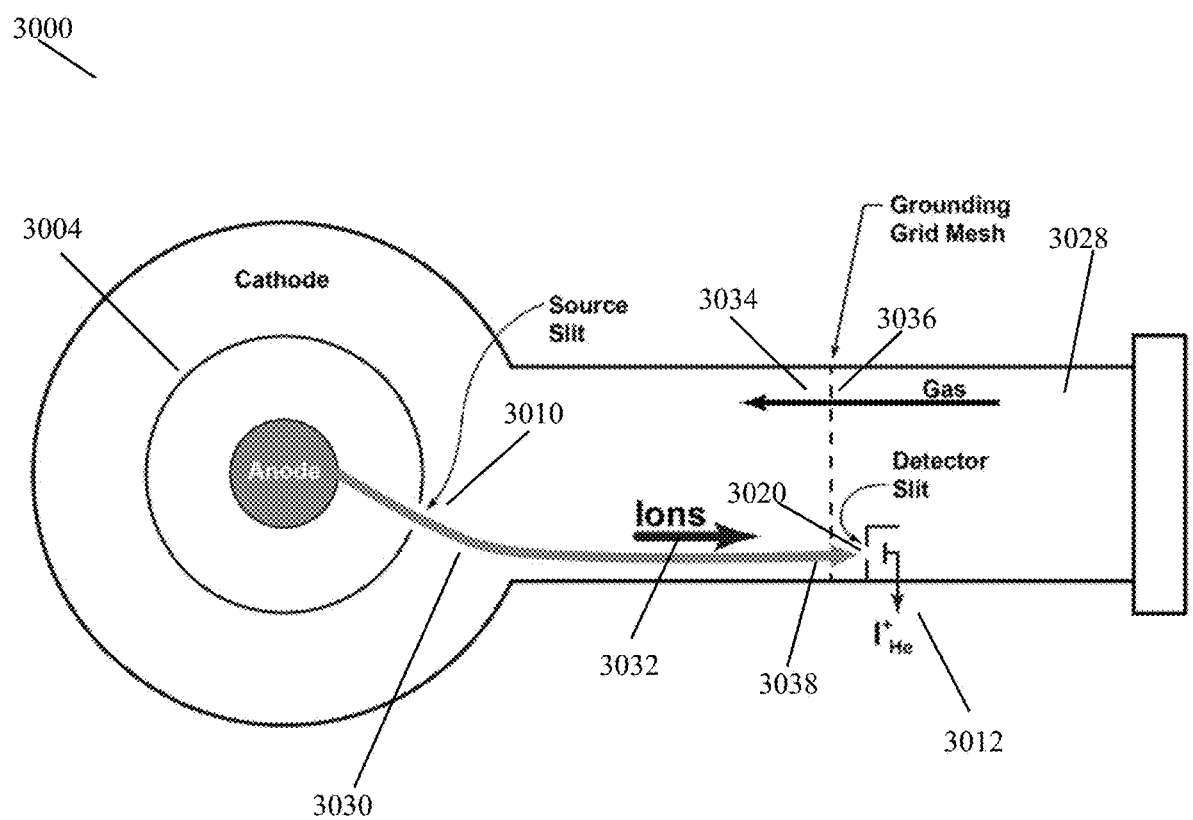
FIG. 3 is a schematic top view diagram of an inverted magnetron cold cathode ionization vacuum gauge with a counter-flow of ions in a gas inlet passage, and a side-mounted detector, in accordance with an embodiment of the invention.
Figure 4:
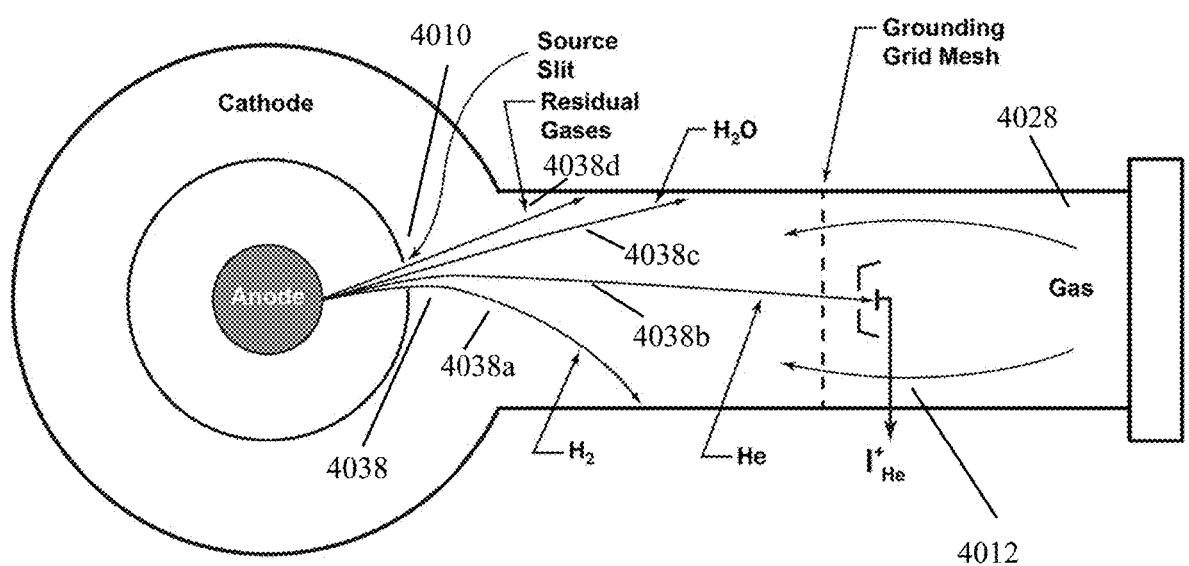
FIG. 4 is a schematic top view diagram of an inverted magnetron cold cathode ionization vacuum gauge with a centrally-mounted detector, in accordance with an embodiment of the invention.

FIG. 3 is a schematic top view diagram of an inverted magnetron cold cathode ionization vacuum gauge 3000 with a counter-flow of ions in a gas inlet passage 3028, and a side-mounted detector 3012, in accordance with an embodiment of the invention. The gas inlet passage 3028 is positioned to flow the gas from the monitored chamber (not shown) to the opening 1008 (see FIG. 1) in the cathode electrode assembly 3004. The portion 3030 of the ions that are emitted out of the cathode electrode assembly 3004 travel in a direction 3032 counter to the direction of flow 3034 of the gas from the monitored chamber in the gas inlet passage 3028. The detector 3012 is positioned at a side edge of the gas inlet passage 3028. Alternatively, as shown in the embodiment of FIG. 4, a detector 4012 can be positioned in the center of a gas inlet passage 4028. Returning to the embodiment of FIG. 3, the vacuum gauge 3000 can include an electrostatic shield grid 3036, such as a grounding grid mesh biased at a ground voltage relative to the anode voltage. The electrostatic shield grid 3036 is positioned between the source aperture 3010 and the detector 3012. The electrostatic shield grid 3036 can assist to provide an electric field-free region between the cathode electrode assembly and the detector aperture 3020. Without an electrostatic shield grid 3036, a change to a bias voltage applied to the detector aperture 3020 can cause a change to ion trajectory and affect coupling of the ion beam through the detector aperture 3020, which effect can be mitigated or eliminated using an electrostatic shield grid 3036. As shown in FIG. 3, a displaced ion component 3038 is directed through the detector aperture 3020, and generates a current $I^+_{He}$, which is measured to determine a partial pressure of the ion component 3038, such as a partial pressure of helium.

As shown in the embodiment of FIG. 4, displaced ion components 4038 are separated based on their mass-to-charge ratio, into different ion streams, which diverge increasingly from each other as they travel further from the source aperture 4010. The magnetic field across the direction of motion of the ions imposes a force on the ions according to the right hand rule. In FIG. 4, for example, a displaced ion component 4038a is made of hydrogen ions, 4038b is made of helium ions, 4038c is made of water ions, and 4038d is made of residual gases. As can be seen in FIG. 4, the detector 4012 is positioned so that a desired displaced ion component 4038b (here, helium) is detected. In addition, in accordance with embodiments herein, an angle of the source aperture 4010 (for example, relative to a central axis of the gas inlet passage) can likewise be adjusted so that the desired displaced ion component 4038b is detected.

Figure 5:
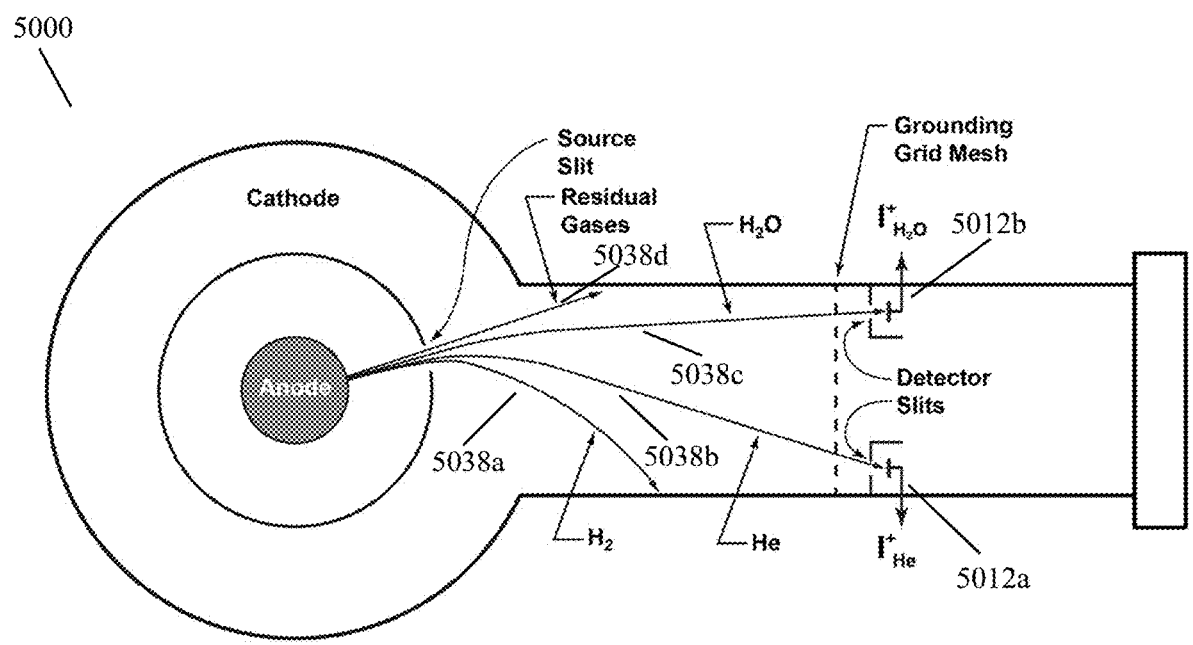
FIG. 5 is a schematic top view diagram of an inverted magnetron cold cathode ionization vacuum gauge with two side-mounted detectors, in accordance with an embodiment of the invention.

As shown in the embodiment of FIG. 5, the vacuum gauge 5000 can include more than one detector 5012a, 5012b, with each of the more than one detectors 5012a, 5012b being positioned to detect a different one of the more than one different displaced ion components 5038a-d of the emitted portion of the ions. For example, in FIG. 5, one detector 5012a is positioned to detect helium ions 5038b so that a current, $I^+_{He}$, is generated to permit measurement of a partial pressure of helium, while another detector 5012b is positioned to detect water ions 5038c so that a current, $I^+_{H2O}$, is generated to permit measurement of a partial pressure of water. In FIG. 5, both detectors 5012a, 5012b are mounted on a side of the gas inlet passage 5028, but one or more of them can also be centrally mounted.

Figure 6:
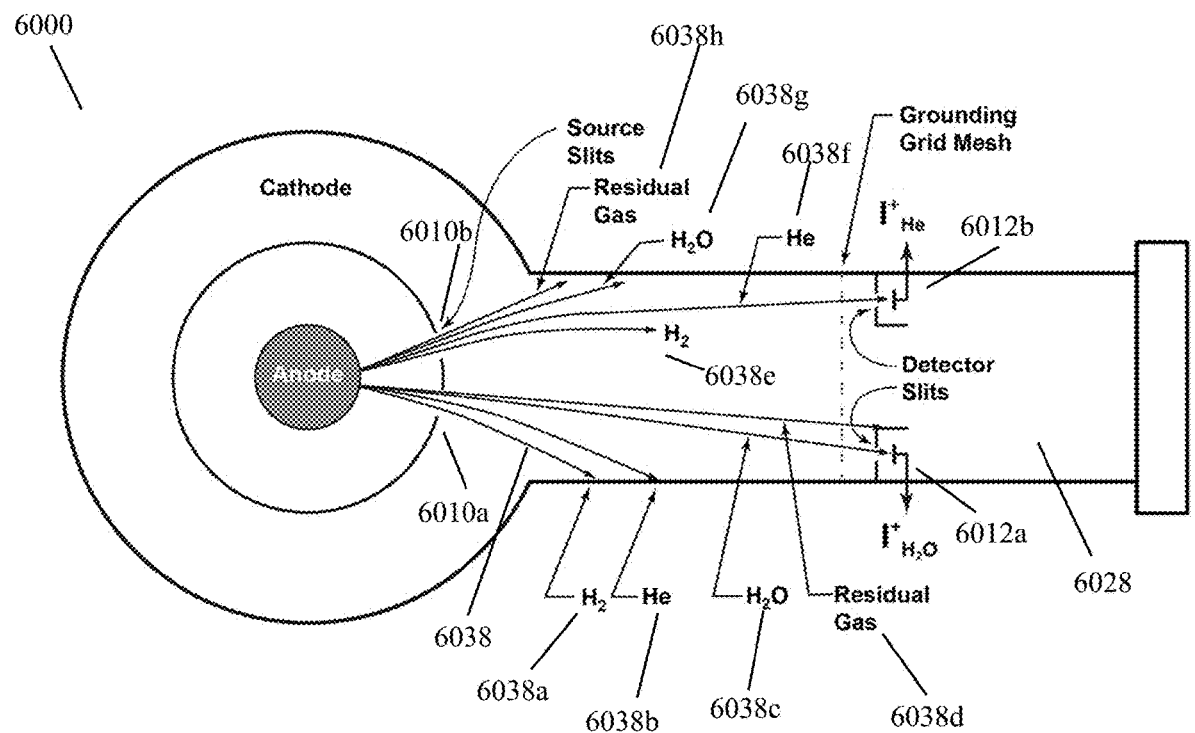
FIG. 6 is a schematic top view diagram of an inverted magnetron cold cathode ionization vacuum gauge with two source apertures and two side-mounted detectors, in accordance with an embodiment of the invention.

As shown in the embodiment of FIG. 6, the vacuum gauge 6000 can include more than one source aperture 6010a, 6010b and more than one detector 6012a, 6012b. In this case, each source aperture 6010a, 6010b separates the displaced ion components emitted from the source apertures 6010a, 6010b into different ion streams. For example, source aperture 6010a separates the emitted ions into displaced ion components 6038a-d, of hydrogen 6038a, helium 6038b, water 6038c and residual gases 6038d; while source aperture 6010b separates its emitted ions into displaced ion components 6038e-h, of hydrogen 6038e, helium 6038f, water 6038g and residual gases 6038h. Based on the different emitted ion streams, the multiple detectors 6012a, 6012b can be positioned to detect different ion components so that currents can be generated from the measurement of partial pressures of more than one gas. For example, in FIG. 6, stream 6038c of water is shown directed to detector 6012a, so that a current, $I^+_{H2O}$, is generated to permit measurement of a partial pressure of water; while stream 6038f is directed to detector 6012b so that a current, $I^+_{He}$, is generated to permit measurement of a partial pressure of helium. In FIG. 6, both detectors 6012a, 6012b are mounted on a side of the gas inlet passage 6028, but one or more of them can also be centrally mounted. In embodiments according to the invention, the displaced ion components 6038 can comprise at least one of: helium ions, hydrogen ions, water ions, and residual gas ions, such as nitrogen ions and oxygen ions. The displaced ion components 6038 can comprise helium ions separated from other components of the gas from the monitored chamber. The displaced ion components 6038 can comprise water ions separated from other components of the gas from the monitored chamber; or can comprise both displaced helium ions and displaced water ions, each separated from each other and from other components of the gas from the monitored chamber.

Figure 7:
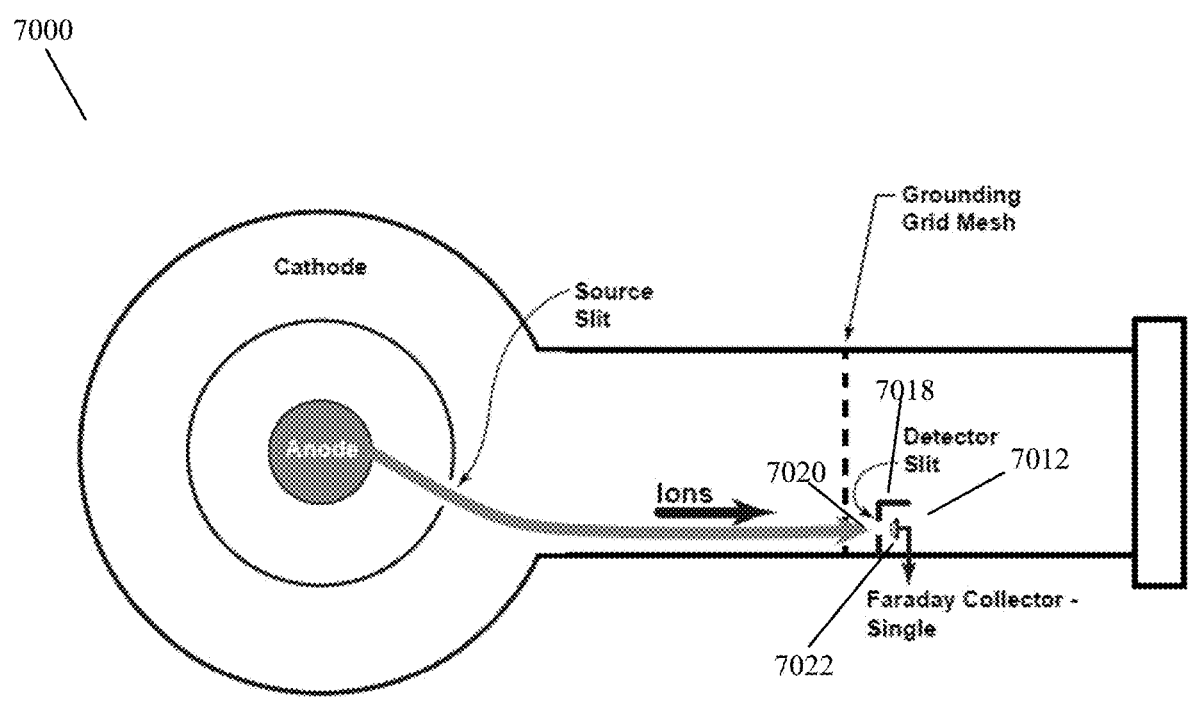
FIG. 7 is a schematic top view diagram of an inverted magnetron cold cathode ionization vacuum gauge with a single Faraday collector detector, in accordance with an embodiment of the invention.

As shown in the embodiment of FIG. 7, the vacuum gauge 7000 can include a detector 7012 with a Faraday collector 7022. The detector includes an ion shield 7018, a detector aperture 7020 (which, here and in other drawings herein, is referred to as a detector slit, although it will be appreciated that other shapes of detector aperture can be used) and the Faraday collector 7022. Faraday collectors discussed herein can be designed as flat plates, for low cost, but improved performance can be obtained using Faraday cups. Faraday cups can capture secondary electrons that might result from the ion collision, thereby providing a more linear response to ion current. In FIG. 7, only a single Faraday collector 7022 is used.

Figure 8:
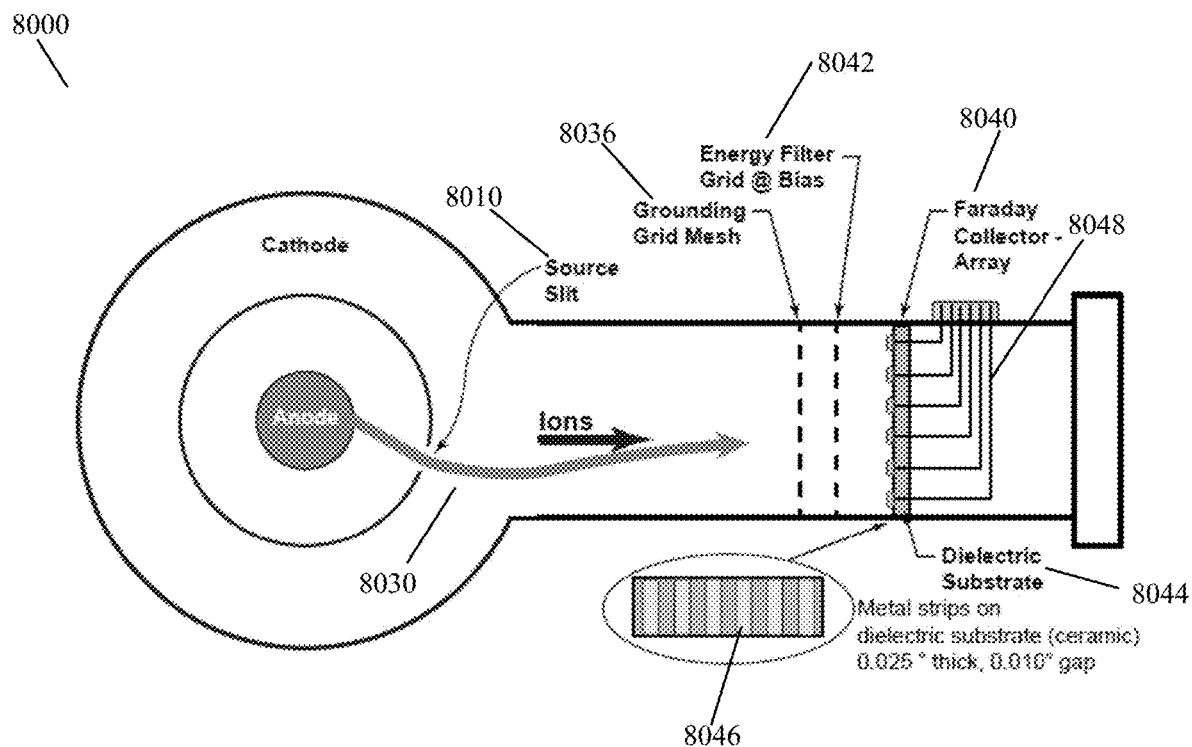
FIG. 8 is a schematic top view diagram of an inverted magnetron cold cathode ionization vacuum gauge with an array of Faraday collectors, in accordance with an embodiment of the invention.

Alternatively, as shown in the embodiment of FIG. 8, the vacuum gauge 8000 can also include more than one detector in an array 8040 of Faraday collectors. Here, a stream of ions 8030 emitted from the source aperture 8010 can travel through an electrostatic shield grid 8036, such as a grounding grid mesh biased at a ground voltage relative to the anode voltage, and then through an energy filter grid 8042, which is at a bias voltage relative to the anode voltage, before reaching the array 8040 of Faraday collectors. The electrostatic shield grid 8036 can provide similar benefits to the electrostatic shield grid 3036 of FIG. 3. The energy filter grid 8042 can be used for high energy filtering, by being at a bias voltage relative to the anode voltage, which applies high pass ion energy filtering for the array 8040 of Faraday collectors, thereby playing an analogous role to the high pass ion energy filtering for a single detector described relative to item 11054 in FIG. 11A, below. Other vacuum gauges taught herein can also use an energy filter grid 8042 positioned between the source aperture and the detector, regardless of whether a Faraday collector array 8040 is used. The array 8040 of Faraday collectors can, for example, include a dielectric substrate 8044, such as a ceramic, with metal strips 8046 forming the Faraday collectors. The metal strips 8046 can, for example, be about 0.025 inches thick and be separated by a gap of about 0.01 inches. In another example, the Faraday collector array can be implemented by adding air gaps of a width of, for example, about 0.010 inches, between the metal strips 8046 (of, for example, about 0.025 inches thickness), which can avoid crosstalk between adjacent collectors. Using electrical connections 8048 to the Faraday collectors, the ion current received at each of the Faraday collectors in the array 8040 can then be fed to a multiplexer 30124 (see FIG. 30, below). In another embodiment, a detector 8040 can comprise an electron multiplier, in place of, or in addition to, a Faraday collector. Electron multipliers can provide advantages such as enhanced detection limits and faster data acquisition rates.

Figure 9:
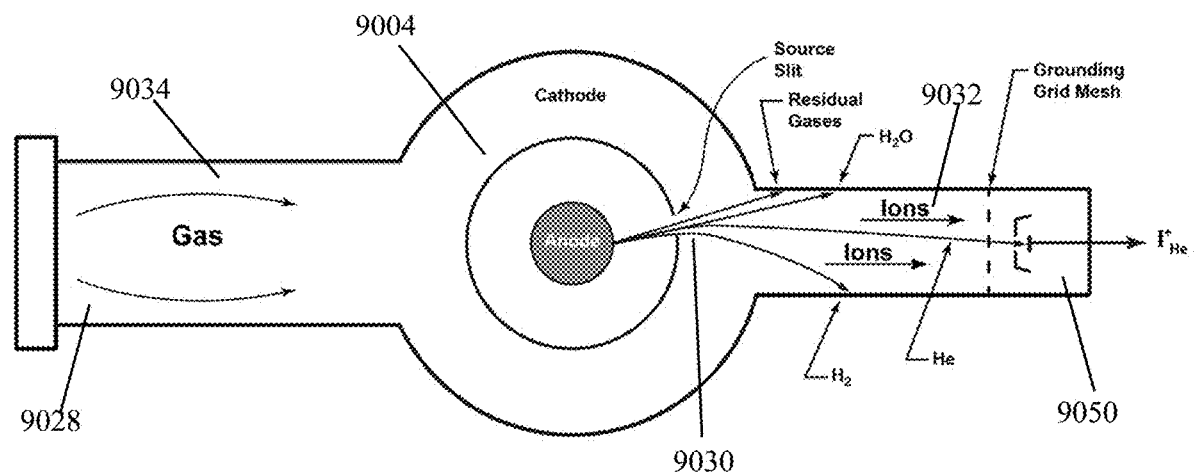
FIG. 9 is a schematic top view diagram of an inverted magnetron cold cathode ionization vacuum gauge in which a gas inlet passage is a separate passage from an ion detection passage, in accordance with an embodiment of the invention.

As shown in the embodiment of FIG. 9, in an alternative geometry, a gas inlet passage 9028 can be a separate passage from an ion detection passage 9050, so that the portion 9030 of the ions that are emitted out of the cathode electrode assembly 9004 travel in a direction of flow 9032 that is generally parallel, or at another angle, to the direction of flow 9034 of the gas from the monitored chamber in the gas inlet passage 9028, as opposed to the counter-flow arrangement of the embodiment of FIG. 3. In another alternative geometry, of parallel flow, a gas inlet could be at or near the cathode electrode assembly 9004, so that incoming gas flows from the source to the detector, in the same direction 9032 as the emitted ions traveling towards the detector, rather than having counter-flow of the gas flow and the emitted ion components. A potential drawback of the parallel flow configuration is, however, that the cathode electrode assembly 9004 and/or anode electrode themselves can provide a low conductance barrier to the incoming gas flow, thereby requiring a larger inlet gas connection. Also, if the cathode is positioned between the gas flow and the detector, there is a conductance restriction that can make it difficult to pump out the detector. If there is any outgassing at the detector, the pressure in that region will increase and affect the performance of the device. By having the smaller detector on the way to the cathode, it remains well pumped, that is, with high conductance (noting that the device is pumped through the flange 1009, see FIG. 1, from the vacuum in the connected chamber). This is advantageous, because higher pressures can affect the displaced ion beams through neutral-ion collisions.

Figure 10:
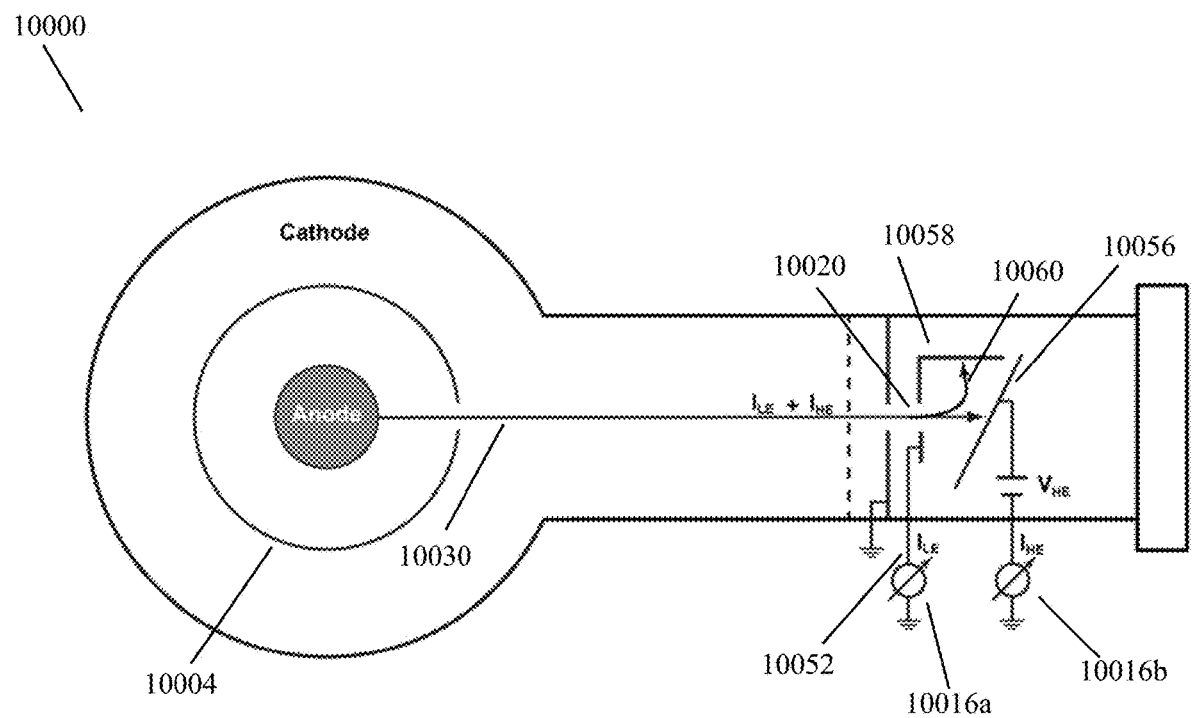
FIG. 10 is a schematic top view diagram of an inverted magnetron cold cathode ionization vacuum gauge using a low pass ion energy filter and a high pass energy filter, in accordance with an embodiment of the invention.

FIG. 10 is a schematic top view diagram of an inverted magnetron cold cathode ionization vacuum gauge 10000 using a low pass ion energy filter 10052, in accordance with an embodiment of the invention. An ion stream 10030 emitted out of the cathode electrode assembly 10004 includes both low energy and high energy ions, so that its total ion current is equal to a current of low energy ions, $I_{LE}$, plus a current of high energy ions, $I_{HE}$. The ion stream 10030 (or an angularly displaced portion of it, noting that FIG. 10 is simplified to omit the angular displacement of the ion components), travels through the detector aperture 10020. A low pass ion energy filter 10052 is configured to permit only ions that have energies lower than a desired threshold energy to be detected. For example, the low pass ion energy filter 10052 can include a voltage-biased deflector plate 10056 and a collector plate 10058 of the detector. Ions 10060 that have energies lower than the threshold determined by the voltage bias, $V_{HE}$, on the deflector plate 10056 are deflected to collector plate 10058, so that the current of low energy ions, $I_{LE}$, is detected. The deflector plate 10056 can be perpendicular (not shown) to the path of the beam 10030 of the detected ion component of the emitted portion of the ions; or, as shown in FIG. 10, may be angled relative to the path of the beam 10030, with the collector plate 10058 being off the axis of the beam 10030 of the displaced ion component (that is, including at least a portion of collector plate 10058 that is positioned to collect the deflected ions 10060). Ion current measurement circuitry, which can, for example, include low energy ion current measurement circuit 10016a and high energy ion current measurement circuit 10016b (which can, for example, each be an ammeter), is electrically connected to measure the ion current from the low energy ions, $I_{LE}$, and the ion current from the high energy ions, $I_{HE}$.

Figures 11A, 11B:
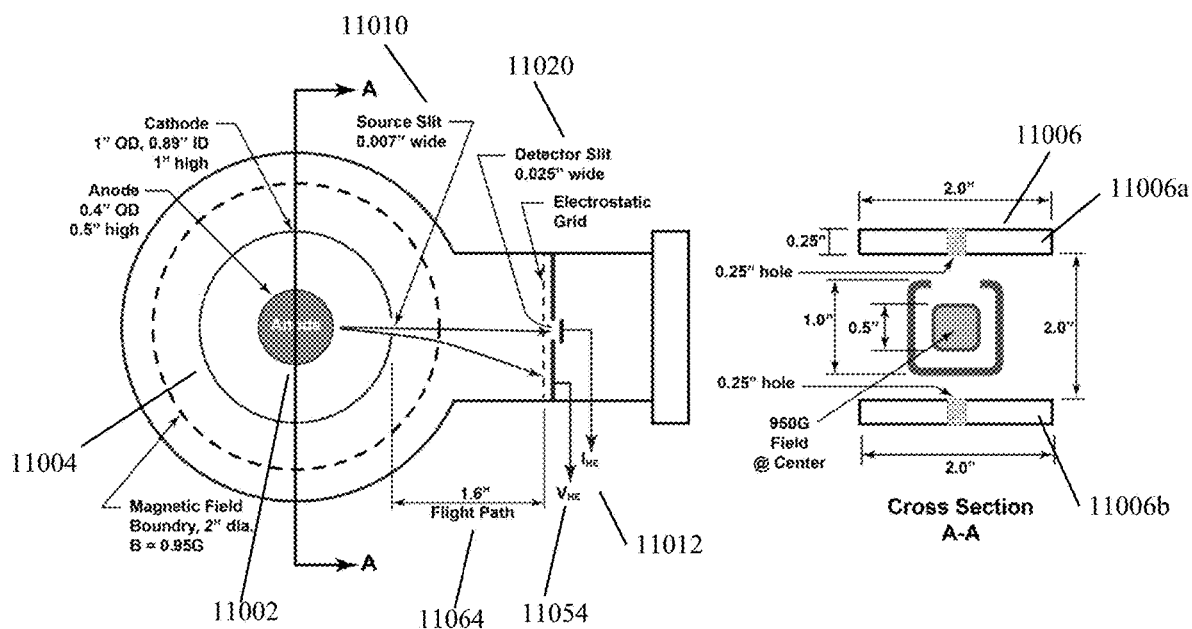
FIG. 11A is a schematic top view diagram of an inverted magnetron cold cathode ionization vacuum gauge illustrating example dimensions that can be used, in accordance with an embodiment of the invention.
FIG. 11B is a schematic cross-sectional side view diagram of a magnet assembly and electrode assembly of an inverted magnetron cold cathode ionization vacuum gauge illustrating example dimensions that can be used, in accordance with an embodiment of the invention.

FIG. 11A is a schematic top view diagram of an inverted magnetron cold cathode ionization vacuum gauge, and FIG. 11B is a schematic cross-sectional side view diagram (through a vertical line through the center of the anode electrode) of a magnet assembly and electrode assembly, each illustrating example dimensions that can be used, in accordance with an embodiment of the invention. It will be appreciated that a variety of different possible dimensions can be used in embodiments according to the invention; for example, dimensions of another example embodiment are shown below relative to FIGS. 59 and 60. The embodiment of FIGS. 11A and 11B can, for example, be useful to separate helium from residual gases, whereas, the embodiment of FIGS. 59 and 60 can, for example, be useful to separate a larger variety of components from each other, including hydrogen, helium, water, and one or more different residual gases. In the example of FIG. 11A, the anode electrode 11002 can, for example, have a diameter (an outside diameter) between about 0.25 inches and about 0.5 inches, such as about 0.4 inches; and a height of, for example, about 0.5 inches. The cathode electrode assembly 11004 can, for example, have an inner diameter between about 0.85 inch and about 1.5 inches, such as about 0.89 inches inner diameter; and a corresponding outer diameter based on a thickness of the cathode electrode (such as about 1 inch outer diameter for an inner diameter of 0.89 inches); and a height of, for example, about 1 inches. The source aperture 11010 can, for example, have a width of between about 0.005 inches and about 0.02 inches, such as about 0.007 inches. The detector aperture 11020 can, for example, have a width between about 0.01 inches and about 0.03 inches, such as about 0.025 inches wide. The source aperture 11010 can, for example, be positioned at a flight path distance 11064 of between about 1 inch and about 2 inches from the detector 11012, such as about 1.6 inches. A gap between the anode electrode 11002 and the cathode electrode assembly 11004 can, for example, be greater than about 0.25 inches. Different dimensions can be used; for example, a higher resolution device can have an increased length of the device, with an increased flight path distance.

In the embodiment of FIG. 11A, a high pass energy filter 11054 is implemented by applying a bias voltage $V_{HE}$, to an aperture 11020 of the detector, so that a current of high energy ions, $I_{HE}$, is detected. A high pass ion energy filter 11054 is configured to permit only ions that have energies higher than a desired threshold energy to be detected. For example, the high pass ion energy filter 11054 can include a voltage source applying a bias voltage, $V_{HE}$, to an aperture of the detector, so that a current of high energy ions, $I_{HE}$, is detected. It will be appreciated that a low pass ion energy filter 10052 (see FIG. 10) can be used alone, as can a high pass ion energy filter 11054 (see FIG. 11A), or both can be used together. In choosing between a high pass ion energy filter and a low pass ion energy filter in an embodiment, the choice can be driven by the distribution of ion energies in the cold cathode magnetron discharge. The energy distribution has been found to change from being weighted towards high energy ions (generated closer to the anode) for small diameter anodes to being weighted towards low energy ions (formed closed to the cathode) for larger diameter anodes. Measuring an energy distribution can be performed for each source design, and the results can then be used to select between low pass and high pass ion energy filtering, as well as to select the proper energy thresholds to be used for the selected filtering mode or modes.

With reference to the embodiment of FIG. 11B, the magnet assembly 11006 can, for example, exert the magnetic field at a magnetic field strength between about 600 Gauss and about 1500 Gauss, such as about 950 Gauss field strength at the center of the field. The magnet assembly 11006 can, for example, include two flat plate magnets 11006a and 11006b, with dimensions of, for example, about 2 inches diameter and a thickness of about 0.25 inches, separated by a distance of about 2 inches, and including center holes of about 0.25 inches. Although not shown in FIG. 11B, the anode electrode and the cathode electrode assembly can be supported, for example, by electrodes extending through holes in the magnet assembly 11006.

In order to provide improved resolution of ion components, an embodiment according to the invention can, for example, use a detector aperture width that is equal to a full width half maximum width of a spatial distribution, at the detector aperture, of the ion component beam. In addition, the source aperture can be sized to have an angular spread that is less than the angular spread of the ion components that are to be resolved, over the distance between the source aperture and the detector.

Figure 12:
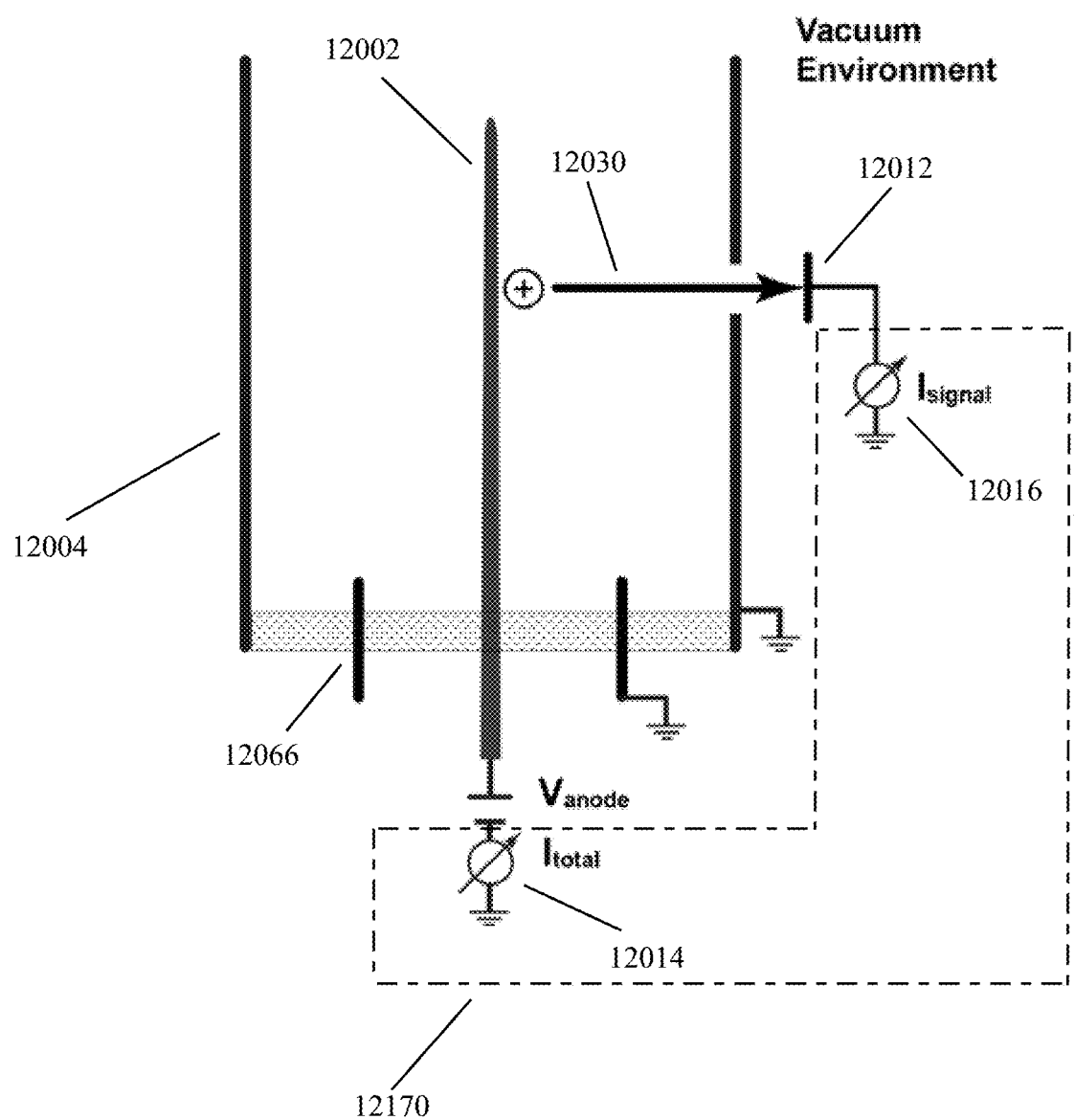
FIG. 12 is a schematic electrical diagram of an inverted magnetron cold cathode ionization vacuum gauge measuring both a total anode current and a detected ion current, in accordance with an embodiment of the invention.

FIG. 12 is a schematic electrical diagram of an inverted magnetron cold cathode ionization vacuum gauge measuring both a total anode current and a detected ion current, in accordance with an embodiment of the invention. The cathode electrode assembly 12004 is at a ground potential, as is a guard ring 12066. The anode electrode 12002 is biased at an anode voltage, $V_{anode}$. Ion current measurement circuitry 12170 includes a first ion current measurement circuit 12014 that is electrically connected to measure a total current, $I_{total}$, flowing between the anode electrode 12002 and the cathode electrode assembly 12004. For example, in FIG. 12, the first ion current measurement circuit 12014 can be an ammeter connected to measure the total current flowing through the anode electrode 12002, which is equal to the total current flowing between the anode electrode 12002 and the cathode electrode assembly 12004. Alternatively, an ammeter can be connected to measure the total current flowing from the cathode electrode assembly 12004 to ground, which likewise would measure a current equal to the total current flowing between the anode electrode 12002 and the cathode electrode assembly 12004. As discussed below, this total current, $I_{total}$, is used to determine a total pressure of the gas in the monitored chamber. The ion current measurement circuitry 12170 includes a second ion current measurement circuit 12016 that is electrically connected to measure a current, $I_{signal}$, produced from receipt of the displaced ion component 12030 at the detector 12012. For example, the second ion current measurement circuit 12016 can be an ammeter connected to measure the current, $I_{signal}$, produced from receipt of the displaced ion component 12030 at the detector 12012. As discussed below, this current, $I_{signal}$, from the detector 12012 is used to determine a partial pressure of a gas in the monitored chamber, such as a partial pressure of helium, hydrogen, water or nitrogen. As used herein, it should be appreciated that "ion current measurement circuitry" can be implemented using separate first and second ion current measurement circuits, such as first and second ammeters respectively functioning as a first ion current measurement circuit and a second ion current measurement circuit; or using a single ion current measurement circuit that performs the functions of both the first ion current measurement circuit and the second ion current measurement circuit; or using any combination of components of one or more different ion current measurement circuits to perform the functions of a first ion current measurement circuit and a second ion current measurement circuit, or of ion current measurement circuitry collectively. For example, two currents, $I_{total}$ and $I_{signal}$, can be fed to a single ion current measurement circuit, which can provide a measurement of both currents, either at the same time or at different times, thereby performing the role of ion current measurement circuitry. In one example, a multiplexer can be used to feed different ion current signals into a common current measurement channel, with the multiplexer sequencing through the ion current signals, and providing a specific index to each. In another example, with reference to FIG. 30, discussed further below, the ion current measurement circuitry 12170 can, for example, include: a current to voltage converter for total ion current, 30120*a* (see FIG. 30) at the anode, I2V $I_T$ (Anode), or at the cathode, 30120*b*, I2V $I_T$ (Cathode); a current to voltage converter for partial pressure current, 30122, I2V $I_{PP}$; and an analog to digital converter and multiplexer 30124. The multiplexer 30124 (see FIG. 30) can, for example, be electrically connected to receive a first ion current signal, $I_T$, from the total current flowing between the anode electrode and the cathode electrode assembly, and a second ion current signal, $I_{PP}$, from the current produced from receipt of the displaced ion component at the detector. It will be appreciated that other arrangements of ion current measurement circuitry 12170 can be electrically connected to measure a total current flowing between the anode electrode and the cathode electrode assembly, and electrically connected to measure a current produced from receipt of the displaced ion component at the detector.

Figure 13A:
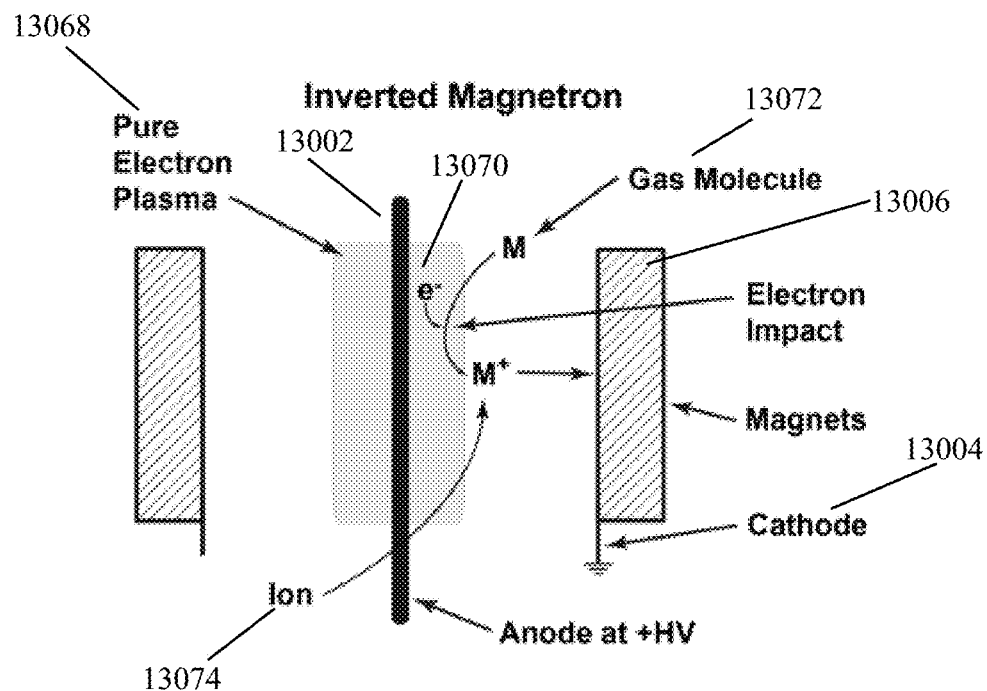
FIG. 13A is a schematic diagram illustrating production of ions from an electron discharge plasma, in an inverted magnetron cold cathode ionization vacuum gauge in accordance with an embodiment of the invention.

FIG. 13A is a schematic diagram illustrating production of ions from an electron discharge plasma, in an inverted magnetron cold cathode ionization vacuum gauge in accordance with an embodiment of the invention. Here, a pure electron plasma 13068 is produced when the anode electrode 13002 is biased at a voltage +HV, in the presence of the cross-field magnetic field, so that circulating electrons, e⁻, 13070 collide with gas molecules, M, 13072, resulting in a certain production of gas ions, M⁺, 13074 from ionization of the gas. The gas ions 13074 are, in turn, accelerated radially in a direction towards the cathode electrode assembly 13004, due to the electric field that is created between the anode electrode 13002 and the cathode electrode assembly 13004. In FIG. 13A, it is noted that a cylindrical magnet assembly 13006 is shown, but it will be appreciated that similar considerations apply when other arrangements of magnets are used, such as a pair of flat plate magnets positioned at top and bottom of the cathode electrode assembly 13004 (such as in FIG. 11B, above).

In operation of the embodiment of FIG. 13A, the ions are not prevented from approaching the cathode by the magnetic field as they are much heavier than the electrons in the pure electron plasma, whereas, electrons are prevented from reaching the anode as they precess due to the magnetic field. The much heavier ions only undergo a lateral displacement that does not prevent them from reaching the cathode immediately after being formed and after following the electric field. The electron plasma 13068 is pressure independent, and ions are produced from gas molecules with a rate of formation of ions proportional to the gas density. Because the electron density in the pure electron plasma 13068 is almost entirely pressure independent, it follows that the rate of ion formation is strictly related to the gas partial pressure, or more accurately, the gas density in the ionization region.

Figure 13B:
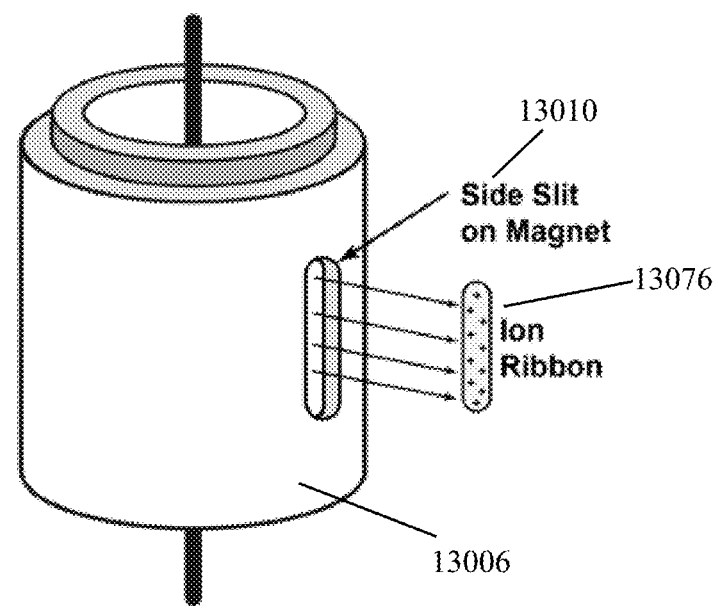
FIG. 13B is a schematic diagram of a cylindrical magnet assembly in an inverted magnetron cold cathode ionization vacuum gauge in accordance with an embodiment of the invention.

FIG. 13B is a schematic diagram of a cylindrical magnet assembly 13006 in an inverted magnetron cold cathode ionization vacuum gauge in accordance with an embodiment of the invention. Here, a side slit 13010, or other shape of source aperture 13010, is formed in the cylindrical magnet assembly 130006, which enables an ion ribbon 13076 to be emitted from the source aperture 13010, whose shape will initially depend on the shape of the source aperture 13010.

Figure 14:
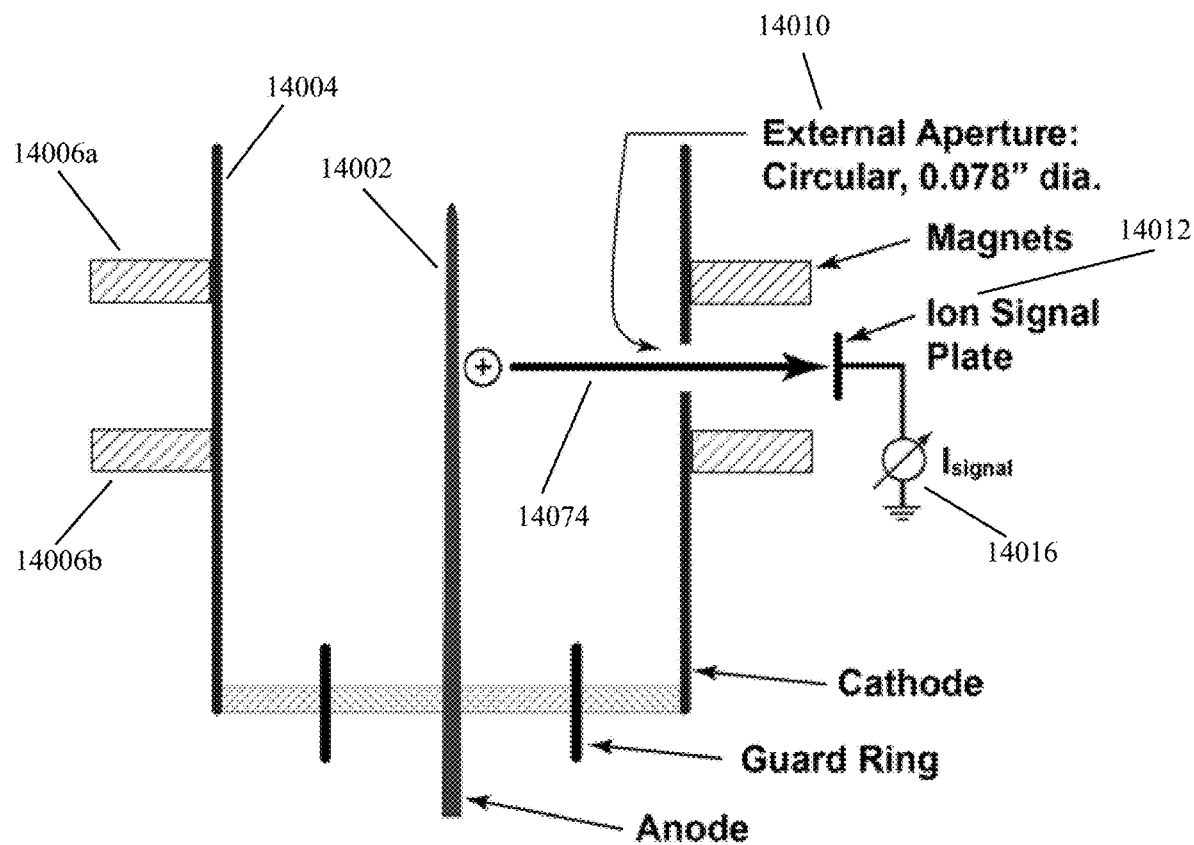
FIG. 14 is a schematic side view diagram of an inverted magnetron cold cathode ionization vacuum gauge using flat cylindrical magnets, in accordance with an embodiment of the invention.

FIG. 14 is a schematic side view diagram of an inverted magnetron cold cathode ionization vacuum gauge using flat cylindrical ring magnets 14006*a* and 14006*b*, in accordance with an embodiment of the invention. Here, the flat cylindrical magnets 14006*a* and 14006*b* are positioned over only a portion of the cathode electrode assembly 14004, although in other embodiments magnets can also be positioned entirely above and below the cathode electrode assembly 14004, as in FIG. 11B. The gas ions 14074 are accelerated in a direction towards the cathode electrode assembly 14004, due to the electric field that is created between the anode electrode 14002 and the cathode electrode assembly 14004, and a portion of the gas ions exit through source aperture 14010 and ultimately reach the detector 14012. A circular source aperture 14010 (here, for example, of 0.078 inches diameter, although other dimensions can be used), or another shape of source aperture 14010, can be used. Ion current measurement circuitry, which can, for example, include ion current measurement circuit 14016, such as an ammeter, is electrically connected to measure the current, $I_{signal}$, produced from receipt of the gas ions 14074 at the detector 14012.

In an embodiment according to the invention, a magnet assembly (such as magnet assembly 1006 of FIG. 1) can be symmetric, for example, by comprising a radially symmetric magnet assembly. This can, for example, help to reduce or avoid discontinuities, as discussed further below. As used herein, a magnet assembly is "radially symmetric" if its appearance is unchanged when the magnet assembly is rotated any amount about an axis, for example an axis that is aligned perpendicular to the electric field lines between the anode electrode and the cathode electrode assembly. For example, a cylindrical magnet assembly, a pair of flat plate magnets of radially symmetric cylindrical design, or other radially symmetric shapes with their magnetic field lines and axis of radial symmetry aligned in a cross-field arrangement to the electric field, can be used.

Figure 15:
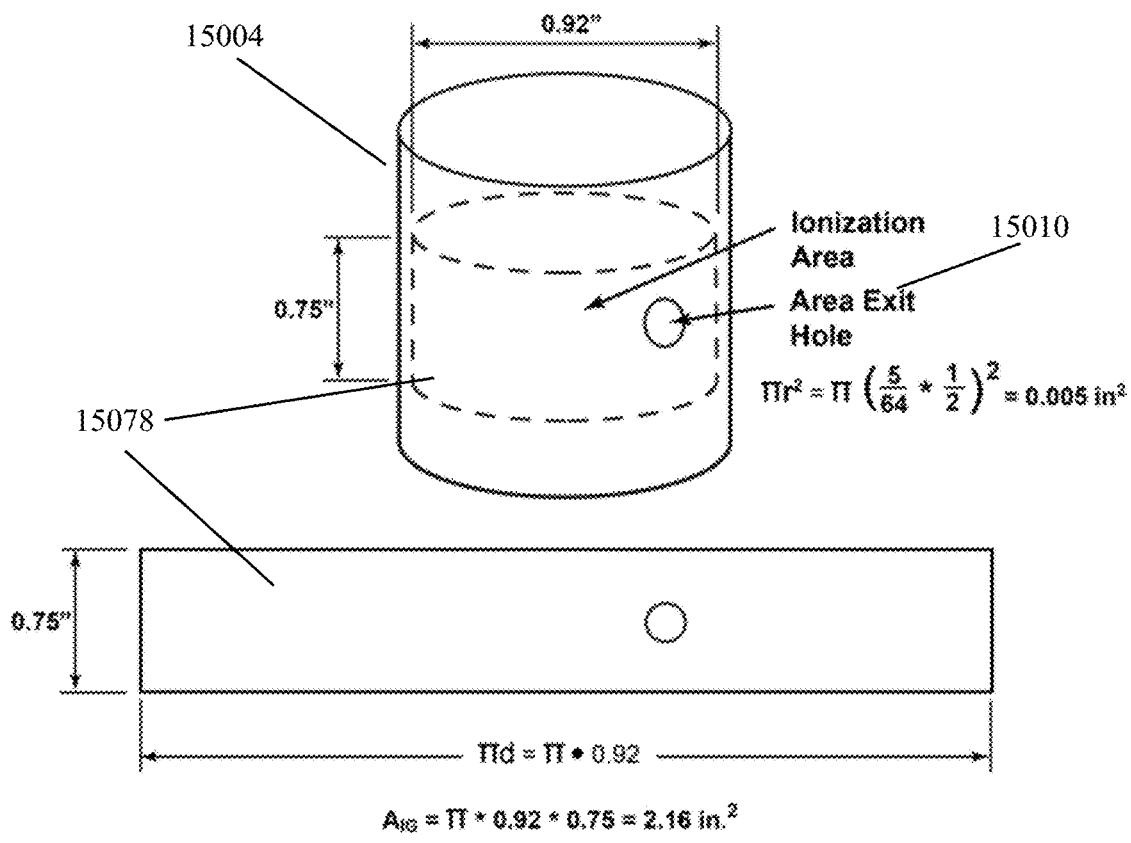
FIG. 15 is a schematic diagram illustrating determination of a ratio of a cross sectional area of the source aperture to a surface area of a portion of the cathode electrode assembly exposed to the ions of the gas, which can be used in an inverted magnetron cold cathode ionization vacuum gauge in accordance with an embodiment of the invention.

FIG. 15 is a schematic diagram illustrating determination of a ratio of a cross sectional area of the source aperture to a surface area of a portion of the cathode electrode assembly exposed to the ions of the gas, which can be used in an inverted magnetron cold cathode ionization vacuum gauge in accordance with an embodiment of the invention. This ratio is shown, in FIG. 15, being determined based on a simple estimate of the area of a circular source aperture 15010, using its radius, and an unrolled surface of the portion 15078 of the cylinder of the cathode electrode assembly 15004, whose area is determined based on its diameter and the height of the portion. It will be appreciated that determination of this ratio will vary based on the shape of the source aperture 15010 and the portion 15078 of the cathode electrode assembly 15004 that is exposed to the ions of the gas.

In accordance with an embodiment of the invention, the ratio determined in FIG. 15 can be used in performing a variety of measurements, and subsequent determinations made in an automated fashion based on those measurements. Specifically, for a current, $I_{signal}$, of ions exiting the source aperture 15010, and a total current, $I_{total}$, flowing between an anode electrode and a cathode electrode assembly, it transpires that the ratio, $I_{signal}/I_{total}$, is a constant, which does not change with pressure of anode voltage, and which is equal to the ratio determined in FIG. 15. That is, $I_{signal}/I_{total}$ is equal to a ratio of a cross sectional area of the source aperture to a surface area of a portion of the cathode electrode assembly exposed to the ions of the gas. This follows because the ratio, $I_{signal}/I_{total}$, is entirely determined by geometrical factors of the inverted magnetron source design—namely, the proportion of the ions created in the discharge space that exit the source aperture will depend entirely on the ratio of the area of the source aperture to the area exposed to the total ion flux. Therefore, the geometric ratio determined in FIG. 15 can be used to know the ratio, $I_{signal}/I_{total}$, which is useful in performing a variety of measurements, and subsequent determinations made in an automated fashion based on those measurements, for an embodiment according to the invention. As one example, the fact that this ratio is independent of the anode voltage and pressure, and is defined by geometry, indicates that it is possible to know accurately the amount of ion current in the ion beam if the total anode (or cathode) current is measured. In addition, for example, calibration of mass separator throughput and detector efficiency can be performed using this ratio.

Figure 16:
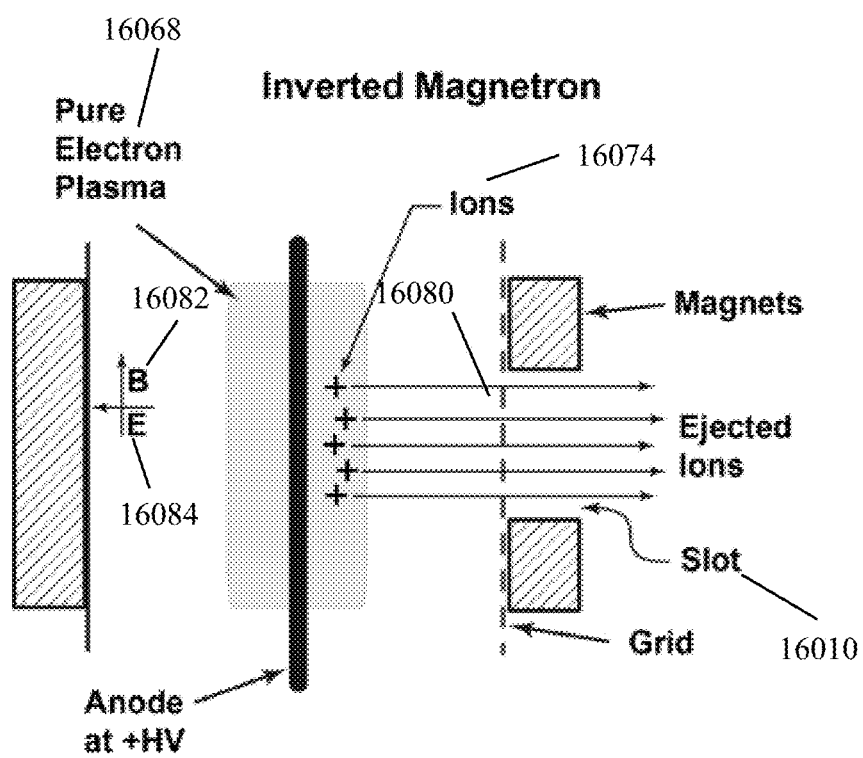
FIG. 16 is a schematic side view diagram of an inverted magnetron cold cathode ionization vacuum gauge using a source aperture grid, in accordance with an embodiment of the invention.

FIG. 16 is a schematic side view diagram of an inverted magnetron cold cathode ionization vacuum gauge using a source aperture grid 16080, in accordance with an embodiment of the invention. Here, the cross-field arrangement of the magnetic field, B, 16082, and the electric field, E, 16084, is shown. Ions 16074 produced by collisions of the gas molecules with the pure electron plasma 16068 are accelerated towards the source aperture 16010. The source aperture grid 16080, which can, for example, be a grounded grid, can cover the source aperture 16010 and be used to provide a more cylindrically uniform electric field.

Figure 17:
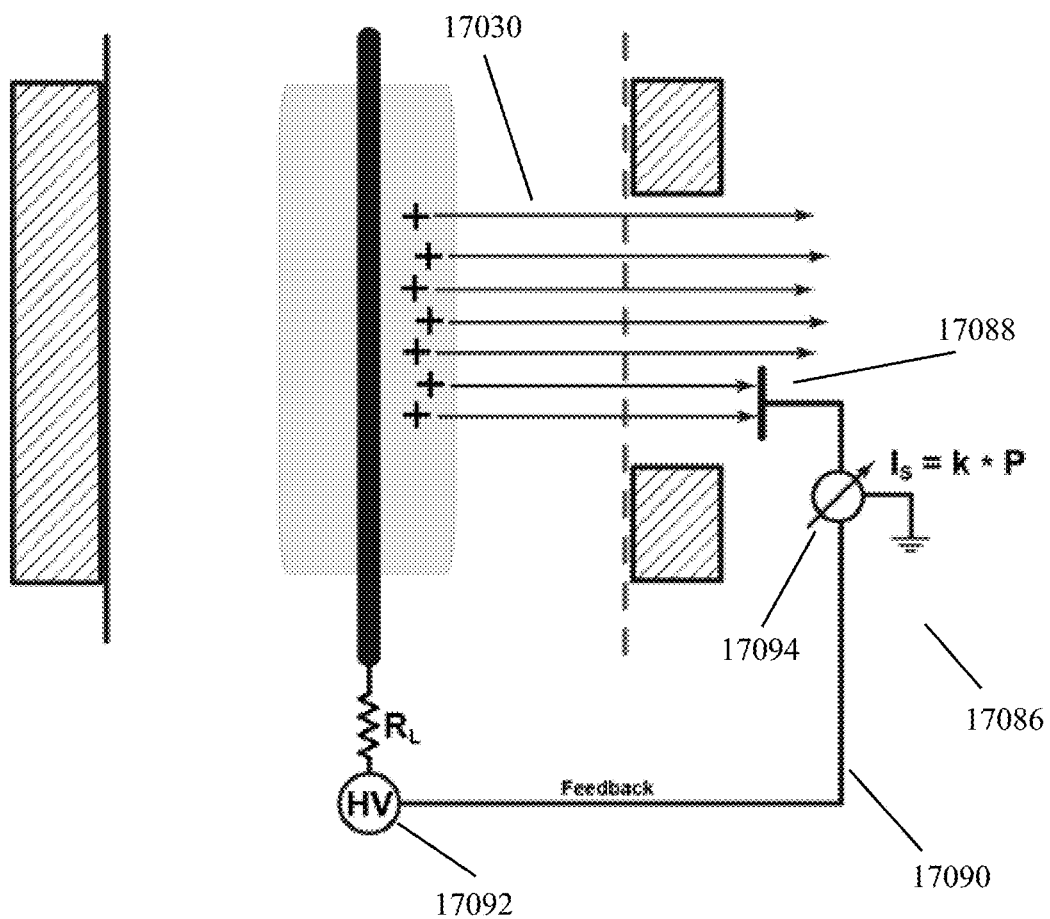
FIG. 17 is a schematic side view diagram of an inverted magnetron cold cathode ionization vacuum gauge using a flux control circuit, in accordance with an embodiment of the invention.

FIG. 17 is a schematic side view diagram of an inverted magnetron cold cathode ionization vacuum gauge using a flux control circuit 17086, in accordance with an embodiment of the invention. A flux control detector 17088 is positioned to collect a fraction of the emitted portion of the ions 17030. A flux feedback circuit 17090 is configured to adjust a high voltage power supply 17092, which is electrically connected to power the anode electrode, based on a current received from the flux control detector 17088, such as a current, $I_s$, measured by an ammeter 17094. In this way, the flux of ions emitted by the source can be controlled to a desired level. A flux control circuit 17086 can, for example, be useful where an inverted magnetron cold cathode ionization source, based on the principles of the sources of the vacuum gauges described above, is used as a source for a magnetic sector (see FIG. 18), Residual Gas Analyzer (RGA), or in other settings involving an ion source.

Figure 18:
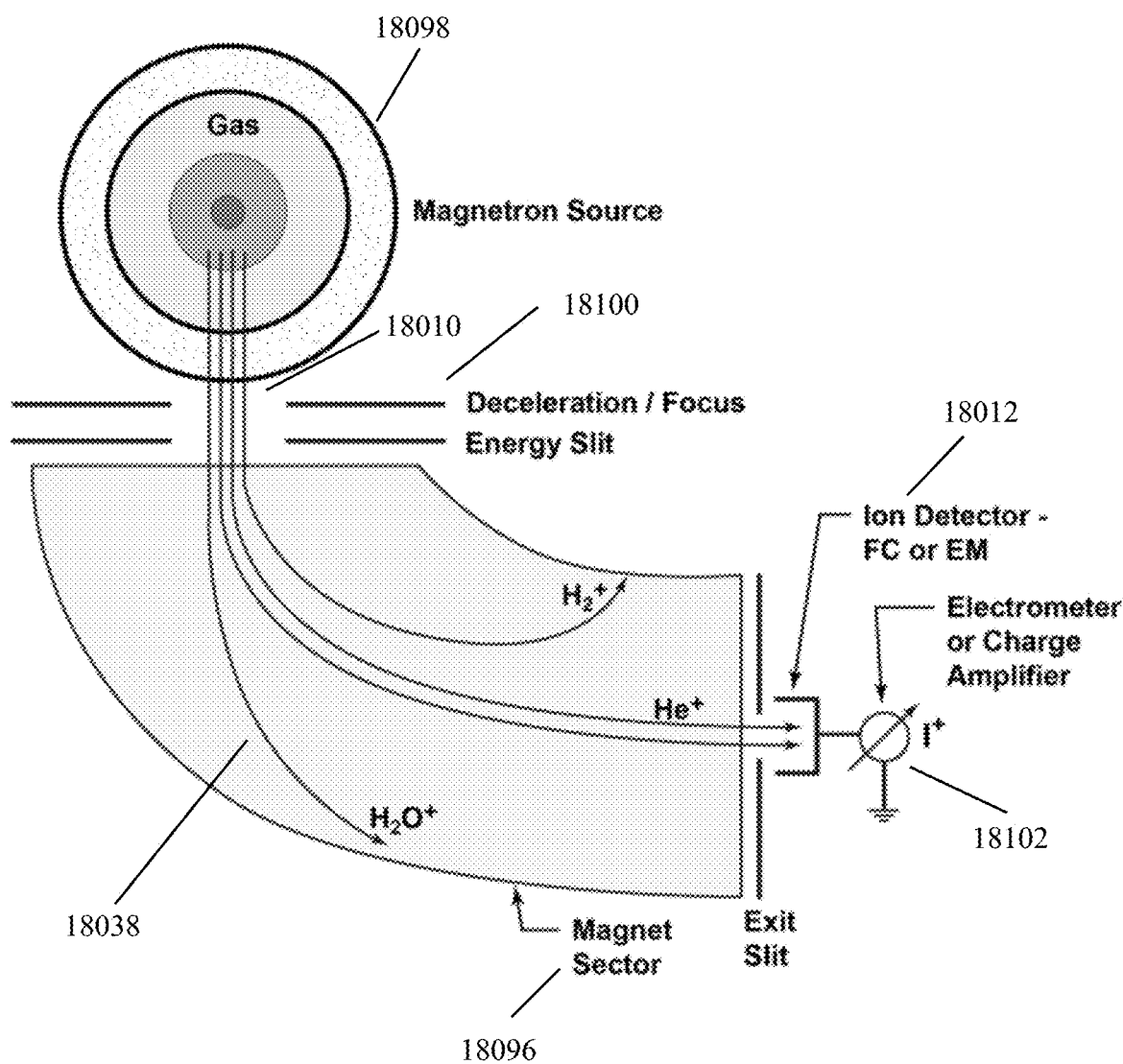
FIG. 18 is a schematic diagram of an inverted magnetron cold cathode ionization source used with a magnetic sector, in accordance with an embodiment of the invention.

FIG. 18 is a schematic diagram of an inverted magnetron cold cathode ionization source used with a magnetic sector 18096, in accordance with an embodiment of the invention.

Here, a cold cathode ionization source 18098, based on the principles of the sources of the vacuum gauges described above, is used to generate ions that are directed into the magnetic sector 18096. The ions can be decelerated or focused and directed through one or more energy apertures 18100. A detector 18012, such as a Faraday cup or other detector, can be positioned on the other side of the magnetic sector 18096 from the source aperture 18010 of the cold cathode ionization source 18098. Current can be measured by an electrometer or charge amplifier 18102. Within the magnetic sector 18096, the ions are separated into component streams 18038, such as hydrogen, helium and water ion component streams, based on their mass to charge ratio.

Figure 19:
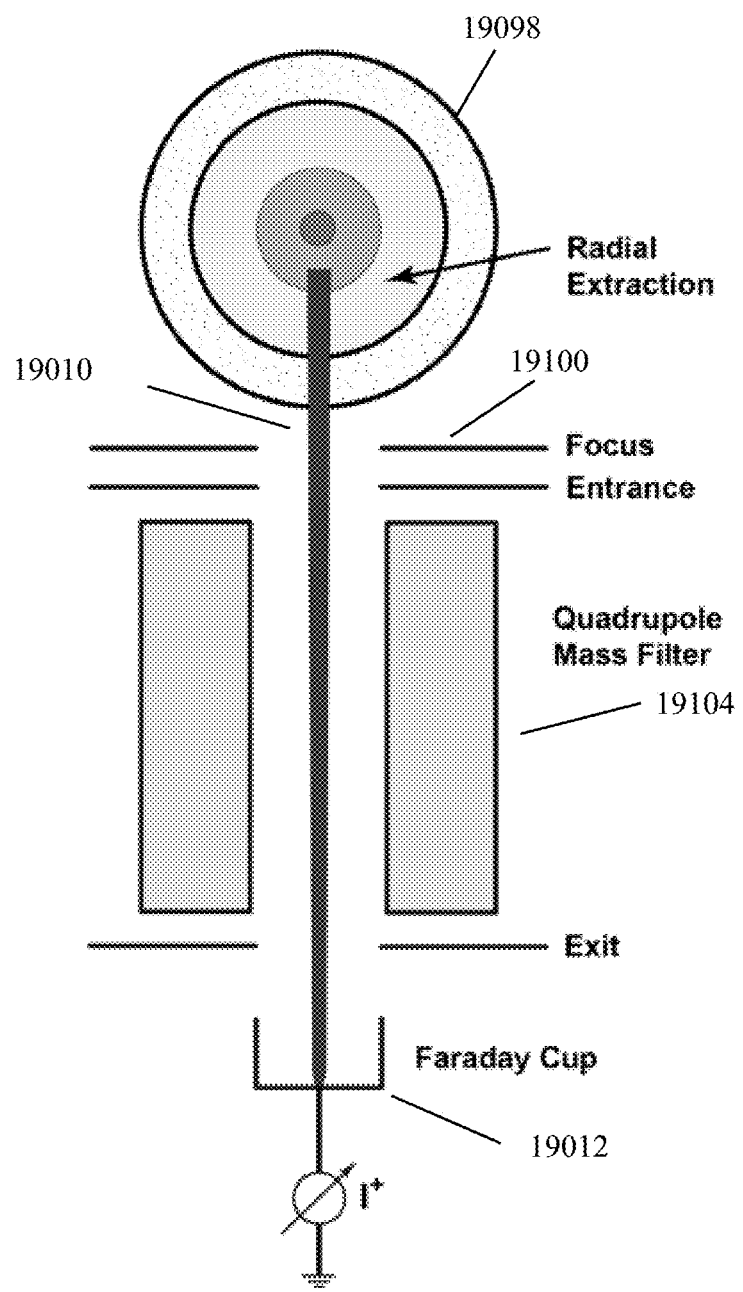
FIG. 19 is a schematic diagram of an inverted magnetron cold cathode ionization source used with a quadrupole mass filter, in accordance with an embodiment of the invention.

FIG. 19 is a schematic diagram of an inverted magnetron cold cathode ionization source used with a quadrupole mass filter, in accordance with an embodiment of the invention. In a similar fashion to the embodiment of FIG. 18, a cold cathode ionization source 19098, based on the principles of the sources of the vacuum gauges described above, is used to generate ions that are directed into the quadrupole mass filter 19104. Quadrupole mass filters are relatively forgiving in terms of the direction and velocity spread for the ions entering the filter assembly. The small lateral displacement of ions caused by the magnet assembly of an embodiment according to the invention is not enough to reduce ion throughput through a quadrupole filter. The ions can be decelerated or focused and directed through one or more energy apertures 19100. A detector 19012, such as a Faraday cup or other detector, can be positioned on the other side of the quadrupole mass filter 19104 from the source aperture 19010 of the cold cathode ionization source 19098.

In other embodiments according to the invention, the source aperture 19010 of a cold cathode ionization source 19098 can, for example, be positioned to emit the ions of the gas into a time-of-flight mass spectrometer, an ion trap or a Radio Frequency dynamic ion trap (in place of the quadrupole mass filter 19104 of FIG. 19), or be used as a source of ions for other purposes. A cold cathode ionization source 19098 can be used with or without ion current measurement circuitry to measure either or both the partial pressure or the total pressure. Adding the cold cathode ionization source 19098 does, however, bring the helpful ability to report total pressure, which can be a useful addition to devices such as magnetic sectors, quadrupole mass filters and other devices. For example, using such a cold source with a quadrupole mass spectrometer can provide the advantage that the ion flux being ejected can be known if the total current is known. In other words, measuring the total pressure current can provide a measure of the ion flux going into the quadrupole mass spectrometer, which provides the ability to check the device for drift in sensitivity or mass spectrometer throughput. This can, for example, eliminate the need for use of a separate and independent total pressure gauge with magnetic sector mass spectrometers. Where a cold cathode ionization source 18098 or 19098 is used to emit ions into a magnetic sector, a quadrupole mass filter, a time-of-flight mass spectrometer, an ion trap, a Radio Frequency dynamic ion trap, or as a source of ions for other purposes, it may not be required that the magnet assembly needs to angularly displace the emitted ions, and smaller magnets can potentially be used than in a vacuum gauge. The focus of such devices can be on sensitivity in ions made per Torr of pressure, with the separation of ions being performed by other means, such as in the magnetic sector or other device itself.

FIG. 20A is a schematic side view diagram, and FIG. 20B is a projection view, of an inverted magnetron cold cathode ionization vacuum gauge with a radially directed elongated source aperture, in accordance with an embodiment of the invention. Here, ions are emitted through a source aperture 20010 that is elongated in a radial direction, for example, between two cylindrical portions of magnet assembly 20006a and 20006b, which can be separated by a non-magnetic shim. Other configurations of the source aperture 20010 can be used. For example, the source aperture can be a hole, or an elongated slot extending either in a direction perpendicular to the direction of the magnetic field, or parallel to the direction of the magnetic field; and axially elongated or radially elongated ribbon shaped ion beams can be used.

Figure 21:
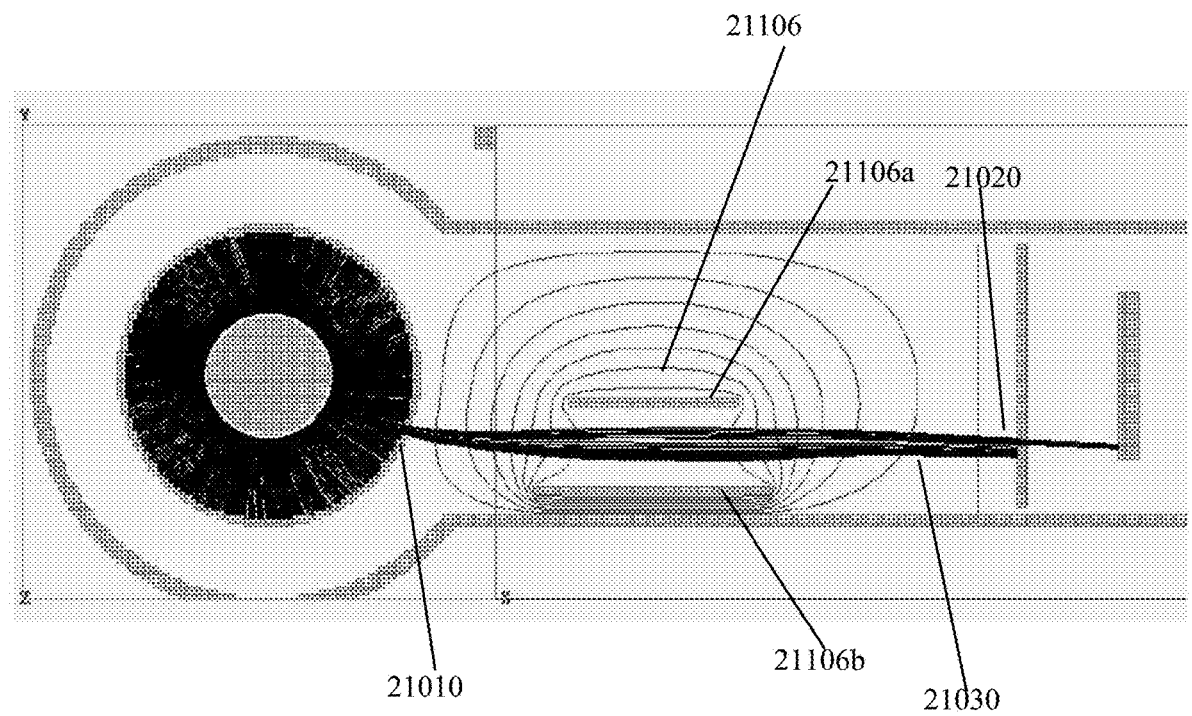
FIG. 21 is a schematic top view diagram of inverted magnetron cold cathode ionization vacuum gauge with an ion beam deflector, in accordance with an embodiment of the invention.

FIG. 21 is a schematic top view diagram of inverted magnetron cold cathode ionization vacuum gauge with an ion beam deflector 21106, in accordance with an embodiment of the invention. Here, an ion beam deflector 21106, such as a pair of parallel plates 21106a and 21106b, is positioned between the source aperture 21010 and the detector aperture 21020. As will be described further below, such an ion beam deflector 21106 can be used to deflect the ion beam 21030, and to perform energy focusing, for example to permit an improved signal for an ion component in the ion beam 21030.

Figure 22A:
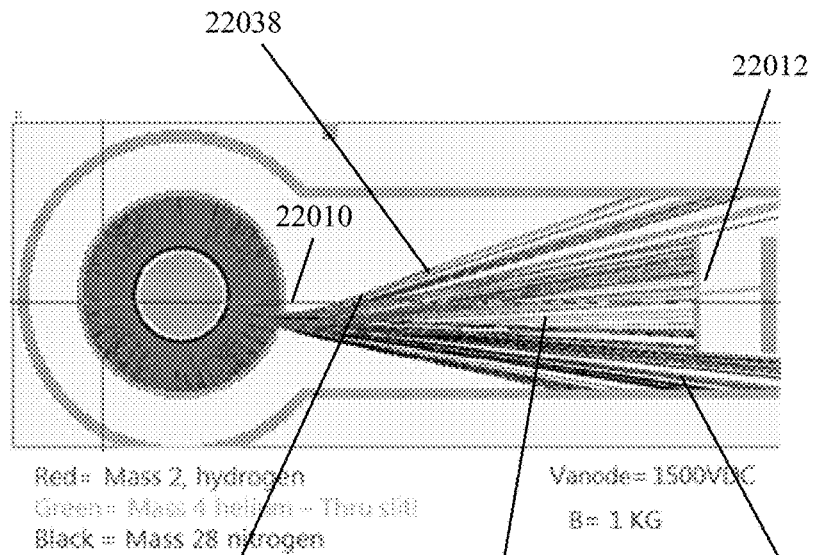
FIG. 22A is a schematic top view diagram of inverted magnetron cold cathode ionization vacuum gauge illustrating separation of ion components in a combined view.
Figure 22B:
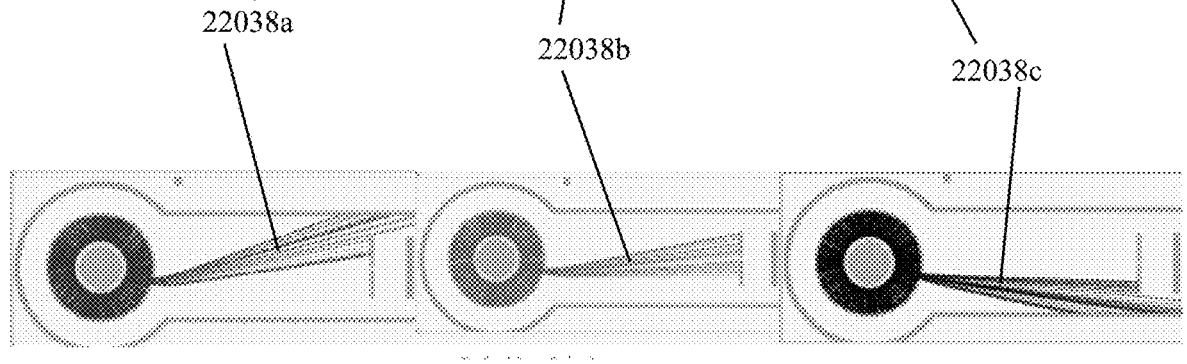
FIG. 22B is a schematic top view diagram of the ion components separated by component, in accordance with an embodiment of the invention.

FIG. 22A is a schematic top view diagram of inverted magnetron cold cathode ionization vacuum gauge illustrating separation of ion components in a combined view, and FIG. 22B is a schematic top view diagram of the ion components separated by component, in accordance with an embodiment of the invention. Here, displaced ion components 22038 are separated based on their mass-to-charge ratio into different ion streams, which diverge increasingly from each other as they travel further from the source aperture 22010. For example, displaced ion component 22038a is made of hydrogen ions, 22038b is made of helium ions and 22038c is made of nitrogen ions. The detector 22012 position is determined, and the angle of the source aperture 22010 is determined, so that a desired displaced ion component 22038b (here, helium) is detected. In the combined view of FIG. 22A and separated view of FIG. 22B, the separation of the components 22038a-c based on the relative mass to charge ratios of hydrogen 22038a, helium 22038b, and nitrogen 22038c can be seen, with hydrogen 22038a being angularly displaced to the greatest extent from the direction of the source aperture 22010, followed by helium 22038b, and then nitrogen 22038c, based on the mass to charge ratios of those components.

Figures 23A, 23B:
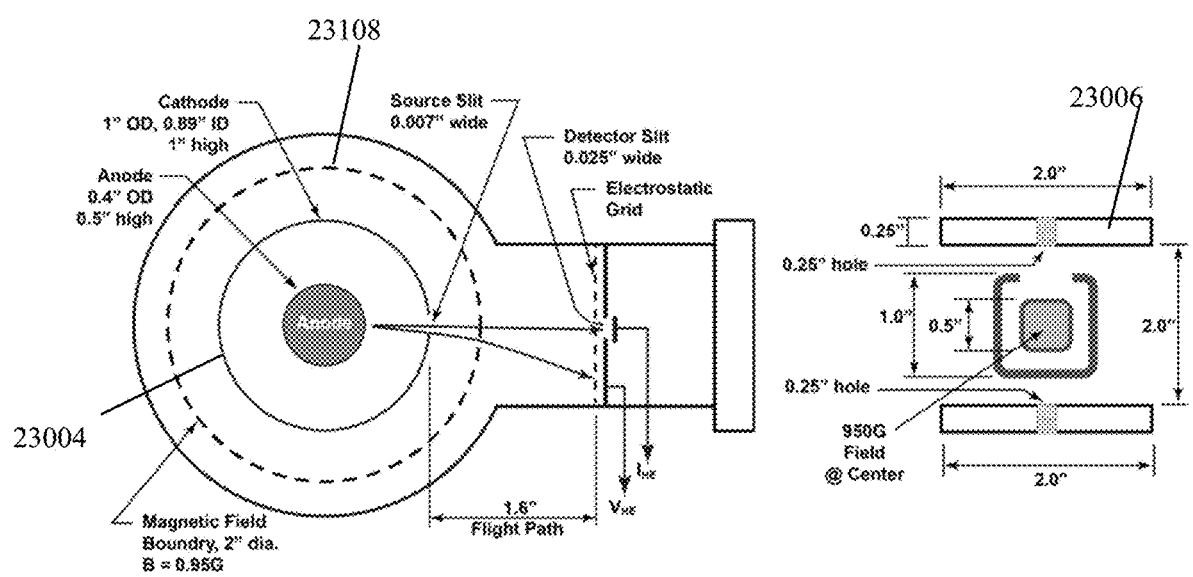
FIG. 23A is a schematic top view diagram of an inverted magnetron cold cathode ionization vacuum gauge.
FIG. 23B is a schematic side view diagram of an electrode assembly and magnet assembly, showing an external magnetic field extending outside a cathode electrode assembly, in accordance with an embodiment of the invention.

FIG. 23A is a schematic top view diagram of an inverted magnetron cold cathode ionization vacuum gauge, and FIG. 23B is a schematic side view diagram of an electrode assembly and magnet assembly, showing an external magnetic field extending outside a cathode electrode assembly, in accordance with an embodiment of the invention. Here, a magnetic field boundary 23108 is used to indicate a continuing strong magnetic field outside of the cathode electrode assembly 23004. This can be created, for example, by using a larger diameter for the magnet assembly 23006 than for the cathode electrode assembly 23004 (such as 2 inches versus 1 inch, in FIGS. 23A and 23B), so that the magnetic field extends with some strength for a distance outside the cathode electrode assembly 23004, to create an external magnetic field outside the cathode electrode assembly 23004. This is used to encourage angular separation of ion component streams to permit resolution of ion components. The magnet assembly 23006 can include a flat plate magnet positioned to define both the magnetic field across the electric field and an external magnetic field outside the cathode electrode assembly 23004. Other magnetic arrangements can be used to create an external magnetic field, including by using ferromagnetic components to extend the field of the magnet assembly 23006. For a cylindrical magnet assembly, for example, a fringe field, outside of the cylindrical magnet, can extend the field outside the cylindrical cathode assembly. In some versions, the magnet assembly can include one assembly to define both the magnetic field across the electric field and the external magnetic field outside the cathode electrode assembly. Alternatively, a separate component of the magnetic assembly, or additional components, such as ferromagnetic extensions or additional magnets, can be used to strengthen, extend or tune the external magnetic field outside the cathode electrode assembly.

Figure 24:
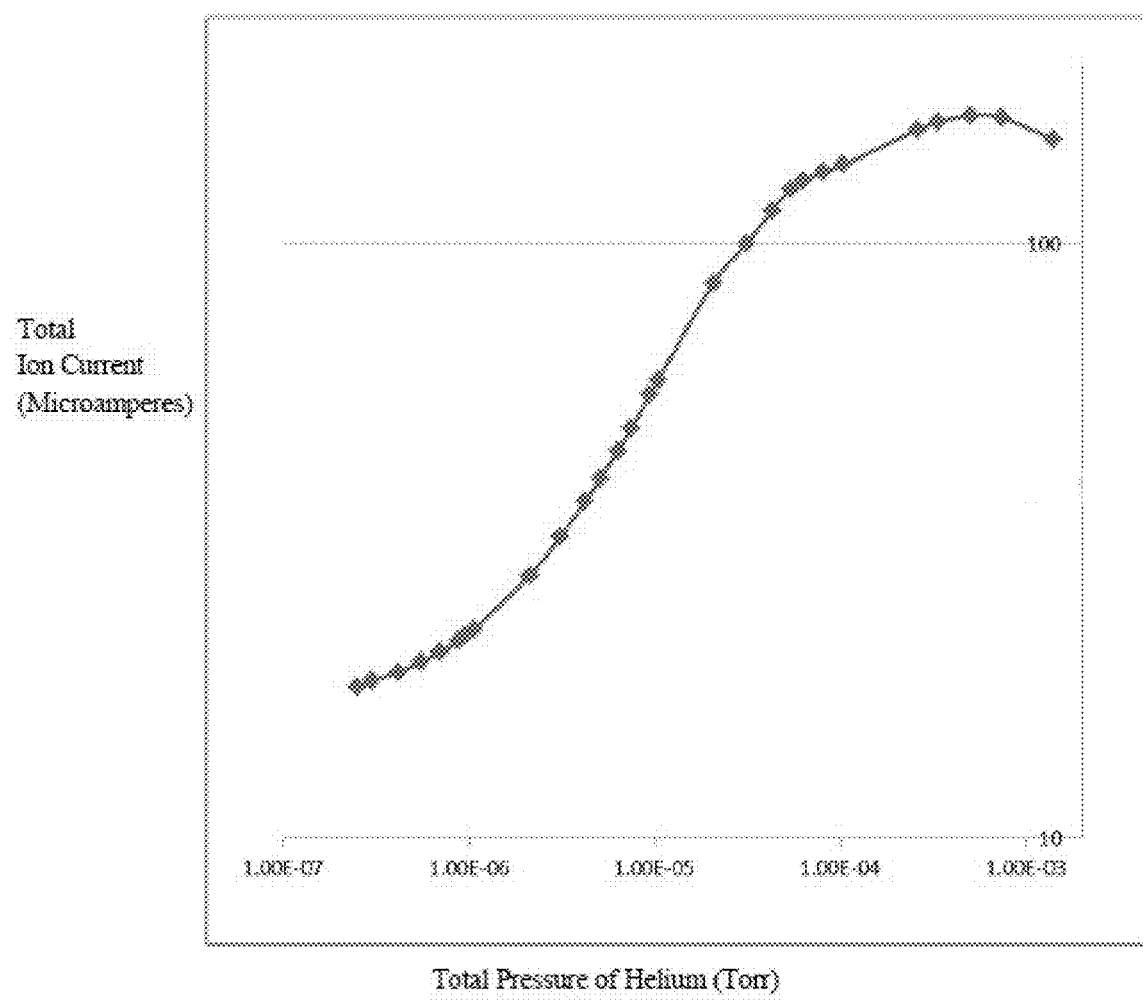
FIG. 24 is a graph of a total pressure response to helium of an inverted magnetron cold cathode ionization vacuum gauge in accordance with an embodiment of the invention.

FIG. 24 is a graph of a total pressure response to helium of an inverted magnetron cold cathode ionization vacuum gauge in accordance with an embodiment of the invention. A total pressure of helium (in Torr) within the discharge space is shown on the horizontal axis, while a total measured ion current (in microamperes) is shown on the vertical axis. The curve of FIG. 24 has the desirable characteristic of having no pressure discontinuities, so that a unique reading of pressure can be made based on the measured current. In accordance with an embodiment of the invention, the total current flowing between the anode electrode and the cathode electrode assembly, which is measured by the ion current measurement circuitry can, for example, comprise a current greater than 1 Ampere per Torr (A/Torr) of a total pressure of the gas from the monitored chamber. The measured total pressure of the gas from the monitored chamber can, for example, comprise a pressure between $10^{-9}$ and $10^{-2}$ Torr, such as between $10^{-8}$ and $10^{-3}$ Torr total pressure. A measured partial pressure, which is measured by the ion current measurement circuitry can, for example, be between $10^{-8}$ Torr and 2 times $10^{-5}$ Torr. The current measured by the ion current measurement circuitry can, for example, comprise a current greater than $10^{-4}$ Ampere per Torr (A/Torr) of a partial pressure of a gas component of the gas from the monitored chamber. The current measured by the ion current measurement circuitry can, for example, comprise a current greater than 2.5 times $10^{-4}$ Ampere per Torr (A/Torr) of a partial pressure of a helium gas component of the gas from the monitored chamber. The gas from the monitored chamber can, for example, comprise a total helium pressure greater than $10^{-4}$ Torr. The total current flowing between the anode electrode and the cathode electrode assembly can, for example, be less than about 200 microamperes, such as less than about 175 microamperes.

Figure 25:
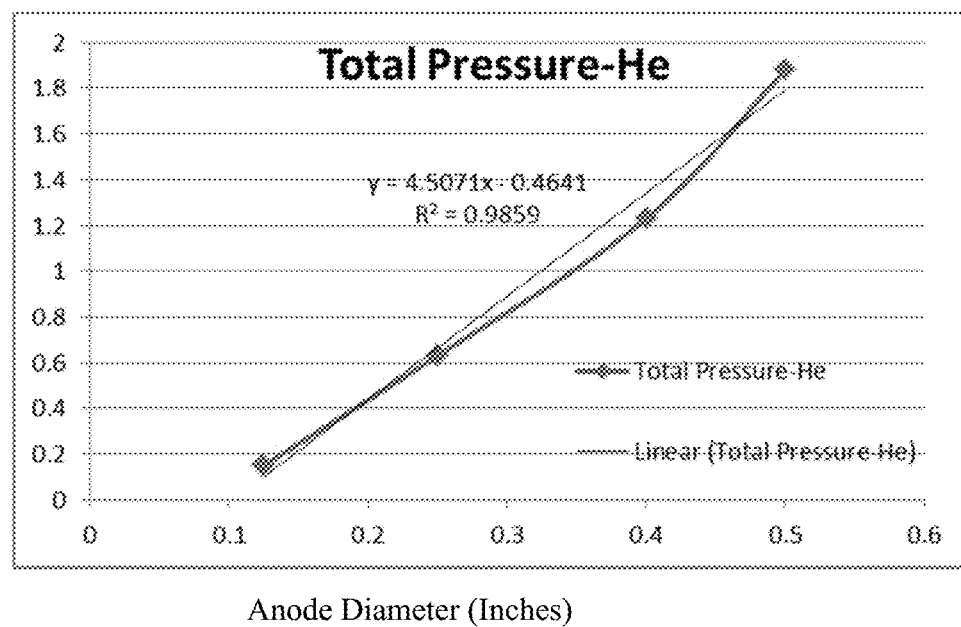
FIG. 25 is a graph of a total pressure sensitivity to helium, versus anode diameter, of an inverted magnetron cold cathode ionization vacuum gauge in accordance with an embodiment of the invention.

FIG. 25 is a graph of a total pressure sensitivity to helium, versus anode diameter, of an inverted magnetron cold cathode ionization vacuum gauge in accordance with an embodiment of the invention. Total pressure sensitivity in Amperes per Torr for pure helium gas is shown on the vertical axis, and anode diameter in inches is shown on the horizontal axis. An increasing anode diameter, here shown between greater than 0.1 inches and over 0.5 inches in anode diameter, tends to increase the total pressure sensitivity to helium. However, an anode that is too large can potentially encourage discontinuities in total pressure response. A total pressure sensitivity of at least 1 Ampere per Torr for helium is desirable, in accordance with an embodiment of the invention.

Figure 26:
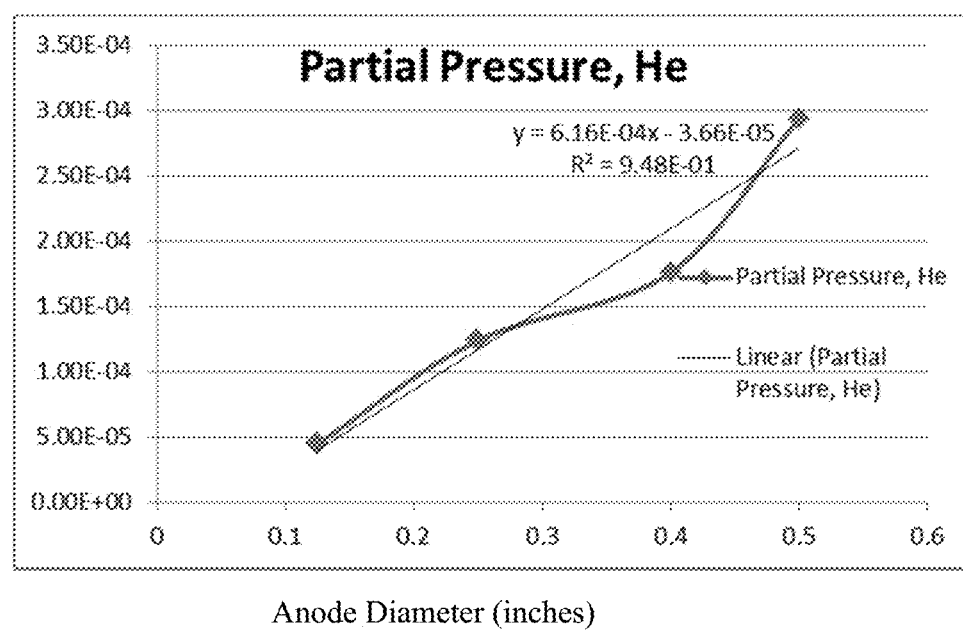
FIG. 26 is a graph of a partial pressure sensitivity to helium, versus anode size, of an inverted magnetron cold cathode ionization vacuum gauge in accordance with an embodiment of the invention.

FIG. 26 is a graph of a partial pressure sensitivity to helium, versus anode size, of an inverted magnetron cold cathode ionization vacuum gauge in accordance with an embodiment of the invention. Partial pressure sensitivity in Amperes per Torr to helium is shown on the vertical axis, and anode size in inches is shown on the horizontal axis. An increasing anode size, here shown between greater than 0.1 inches and over 0.5 inches in anode diameter, tends to increase the partial pressure sensitivity to helium.

Figure 27:
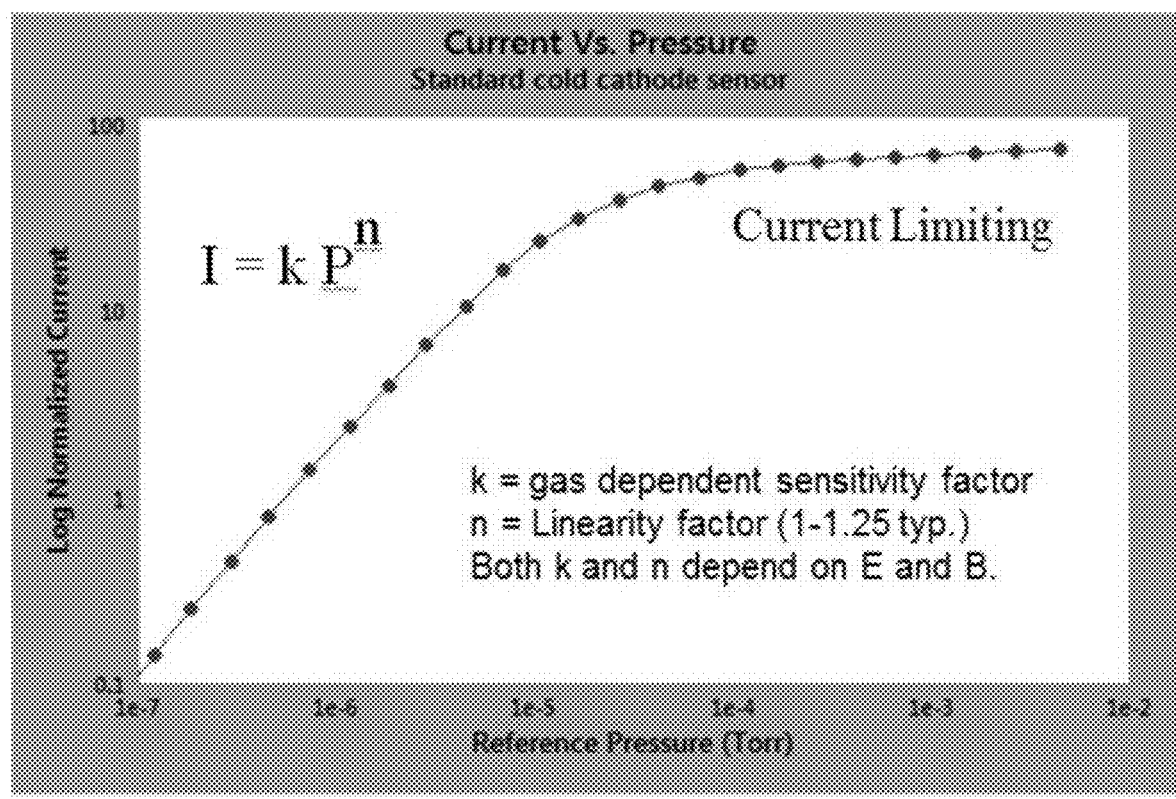
FIG. 27 is a graph showing a normalized current (on a logarithmic scale) versus a reference pressure, which can be used for a calibration curve of an inverted magnetron cold cathode ionization vacuum gauge in accordance with an embodiment of the invention.

FIG. 27 is a graph showing an example of a normalized current (on a logarithmic scale) versus a reference pressure, which is a type of curve that can be used as a calibration curve of an inverted magnetron cold cathode ionization vacuum gauge in accordance with an embodiment of the invention. A total pressure determination circuit 30142 (see FIG. 30) can be configured to determine the total pressure of the gas from the monitored chamber based on a specific calibration curve or a nominal calibration curve relating the total pressure of the gas from the monitored chamber to the total current that is measured by the ion current measurement circuitry. Here, a "specific calibration curve" is a calibration curve relating pressure to current that is specific to an individual vacuum gauge, whereas, a "nominal calibration curve" is a calibration curve relating pressure to current that is generalized over a group or type of vacuum gauge.

Figure 28:
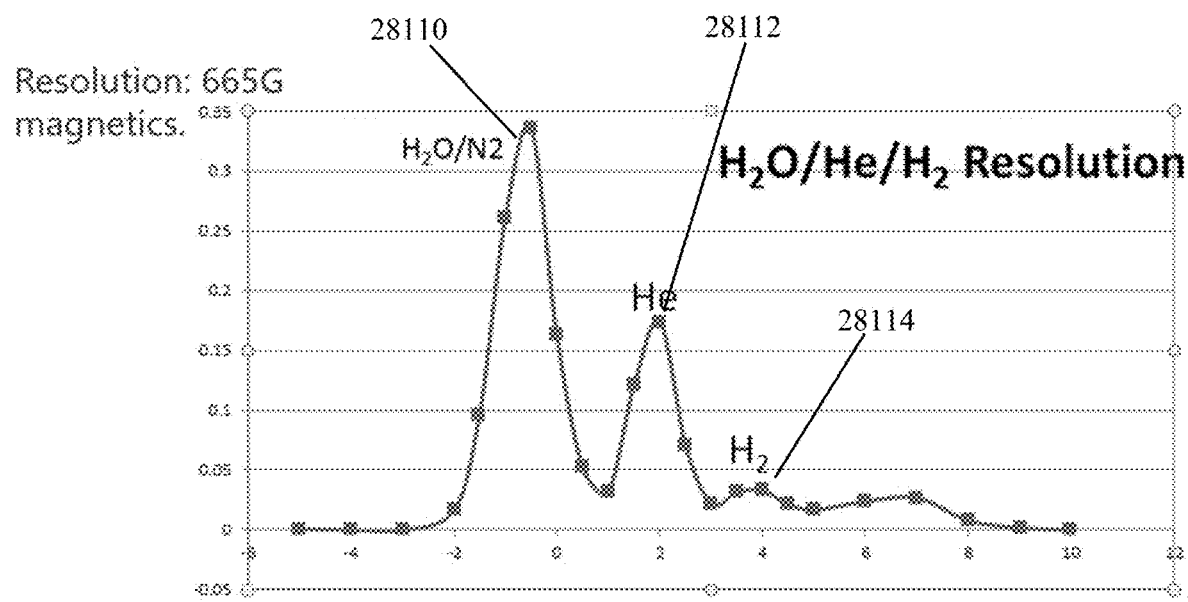
FIG. 28 is a graph showing angular resolution of residual gases (including water), helium and hydrogen ion components by an inverted magnetron cold cathode ionization vacuum gauge in accordance with an embodiment of the invention.

FIG. 28 is a graph showing angular resolution of residual gases (including water), helium and hydrogen ion components by an inverted magnetron cold cathode ionization vacuum gauge in accordance with an embodiment of the invention. An angle, in degrees, of the source aperture is shown on the horizontal axis, relative to a central axis of a gas inlet passage, and a detected partial pressure current in nanoamperes is shown on the vertical axis. For the spectrum of FIG. 28, a source centered magnet was used, with reliance on fringing magnetic fields outside the diameter of the magnet. Resolution can be seen between a residual gas peak 28110 (including water and nitrogen), a helium peak 28112 and a hydrogen peak 28114. Based on the position of the detector, or of more than one detector, one or more of these peaks can be detected to measure a partial pressure of one or more of these gas components.

Figure 29:
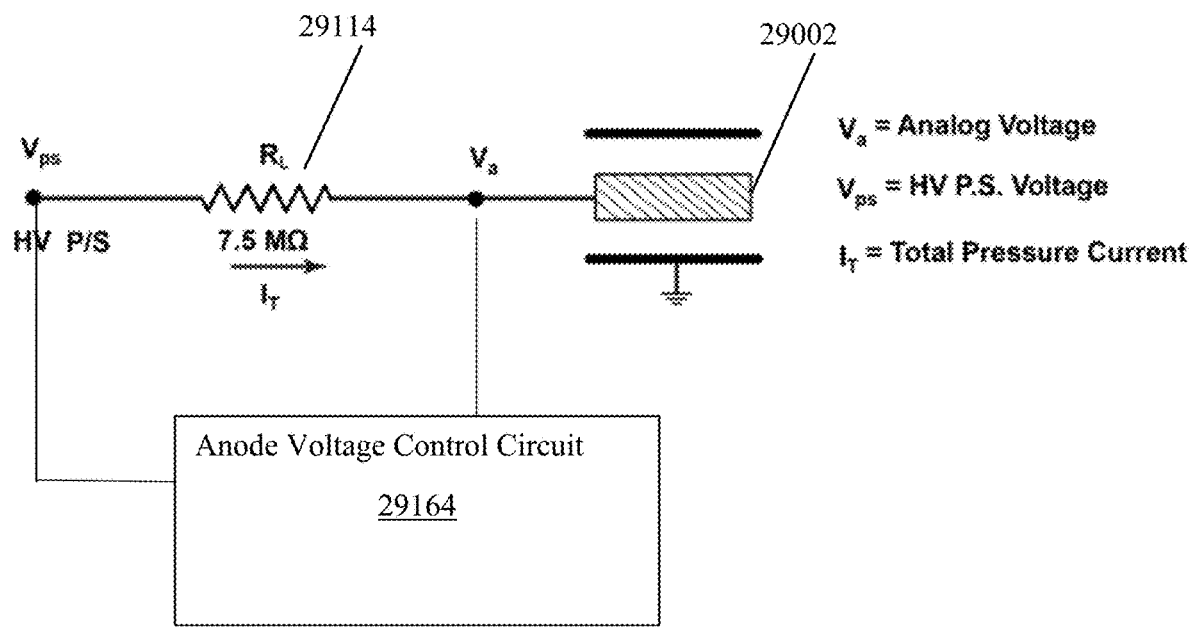
FIG. 29 is a schematic electrical diagram illustrating an anode voltage and current limiting resistor, in an inverted magnetron cold cathode ionization vacuum gauge in accordance with an embodiment of the invention.

FIG. 29 is a schematic electrical diagram illustrating an anode voltage and current limiting resistor, in an inverted magnetron cold cathode ionization vacuum gauge in accordance with an embodiment of the invention. A current limiting circuit, such as a current limiting resistor 29114, is used to limit the total pressure current, $I_T$, going through the anode electrode 29002. For example, a 7.5 MΩ resistor, or another value of resistor, $R_L$, can be used. A high voltage power supply voltage, $V_{PS}$, is applied, and a voltage $V_a$ is achieved at the anode. An anode voltage control circuit 29164 can be configured to maintain a constant voltage of the anode electrode independent of the total current flowing between the anode electrode and the cathode electrode assembly. For example, the anode voltage $V_A$ applied to the anode electrode can be set by the anode voltage control circuit 29164 based on the voltage of the power supply minus the drop in voltage at the limiting resistor, that is, based on the relationship $V_A = V_{PS} - R_L(I_T)$, where $V_{PS}$ is the high voltage anode power supply voltage, $R_L$ is the resistance of the current limiting resistor, and $I_T$ is the total pressure current (such as through the anode). In the absence of a current limiting resistor, the total ion current for pressures exceeding $10^{-4}$ Torr can potentially be so large that it could destroy a sensor in a relatively short period of time. Therefore, limiting the current through the anode electrode to a current of, for example, less than about 200 microamperes, such as less than about 175 microamperes, can lengthen the lifetime of an embodiment according to the invention.

Figure 30:
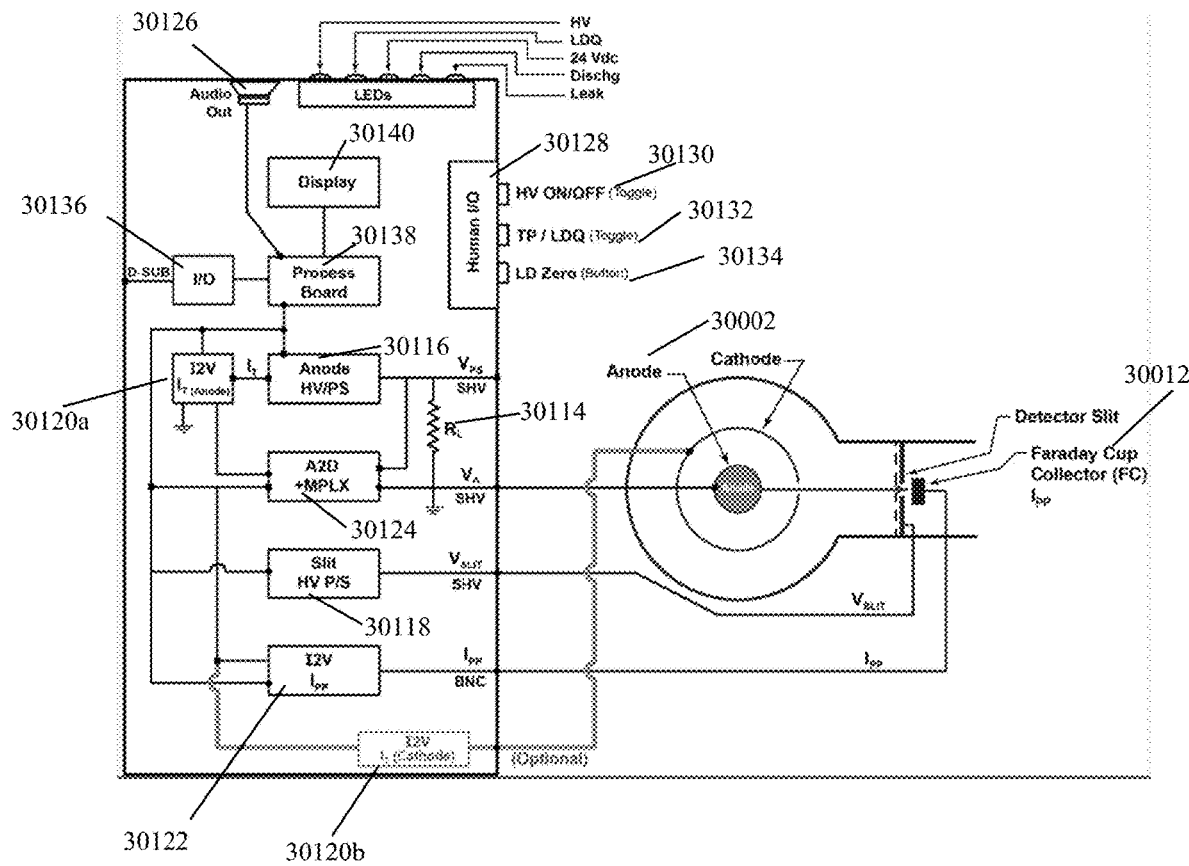
FIG. 30 is a schematic electrical diagram of a control unit used with an inverted magnetron cold cathode ionization vacuum gauge in accordance with an embodiment of the invention.

FIG. 30 is a schematic electrical diagram of a control unit used with an inverted magnetron cold cathode ionization vacuum gauge in accordance with an embodiment of the invention. A total current, $I_T$, which is the total ion current from the anode to the cathode, is proportional to the total pressure of the gas from the monitored chamber, and can, for example, be used to determine the total pressure using a lookup table. A range of the total current, $I_T$, can for example be between about 10 nA and 250 μA. The total current, $I_T$, can for example be measured either by a current to voltage converter for total ion current, 30120*a* at the anode, I2V $I_T$ (Anode), or at the cathode, 30120*b*, I2V $I_T$ (Cathode). A partial pressure current, $I_{PP}$, which is a partial pressure current from a detector 30012 such as a Faraday cup collector, is proportional to a partial pressure of a gas from the monitored chamber and can, for example, be determined either using a linear relationship or using a lookup table. The partial pressure current, $I_{PP}$, can, for example, be in a range between about 10 pA and about 100 nA. A total current limiting resistor 30114, with resistance, $R_L$, such as a 7.5 MΩ resistor or another value is used to limit the current through the anode electrode 30002. A voltage $V_{PS}$ is the voltage of anode high voltage power supply 30116, and can for example be between 0 V and about 2500 V, with a maximum current of, for example, about 250 microA. In operation, the voltage $V_{PS}$ can, for example, be configured to bias the anode electrode at a voltage between about 500 V and about 2000 V. A voltage $V_{Slit}$ is applied by a detector bias power supply 30118, and can for example be between 0 V and about 1000 V, with a 10 microA current. Maintaining an anode voltage that is less than about 2500 V can, for example, simplify the design and material choices for air-to-vacuum electrical feedthroughs. A typical anode voltage can, for example, be about 1600 V. When using a high pass ion energy filter (such as 11054 in FIG. 11), the detector bias voltage, such as voltage $V_{Slit}$ for detector bias power supply 30118, can be set relative to the anode voltage. For example, a detector aperture voltage, $V_{Slit}$, of about 600 V can be used to bias the detector when the anode voltage is about 1600 V, and a similar ratio of 600 to 1600 can, for example, be used to scale the ratio of $V_{Slit}$ to the anode voltage for other values of $V_{Slit}$ and the anode voltage. An anode voltage $V_A$ applied to the anode electrode 30002 can be set based on the relationship $V_A = V_{PS} - R_L(I_T)$, where $V_{PS}$, $R_L$ and $I_T$ are as above, for example using an anode voltage control circuit 29164 (see FIG. 29). A current to voltage converter for total ion current, 30120*a*, I2V $I_T$ (Anode), can, for example carry between about 10 nA and about 250 μA of current. A current to voltage converter for partial pressure current, 30122, I2V $I_{PP}$, can, for example carry between about 1 pA and about 100 mA of current. An analog to digital converter and multiplexer, A2D+MPLX, 30124, converts analog signals to digital signals and multiplexes them, including $V_{PS}$, $V_{Slit}$, $V_A$, $I_T$ and $I_{PP}$. An audio out device 30126, such as a loudspeaker, can for example have a beat frequency proportional to a partial pressure or helium leak rate from the monitored chamber. A human input/output interface 30128 can for example include: a button HV ON/OFF 30130, which turns on the high voltage to the anode and the detector aperture (for example where a default is pressure measurement and total pressure); a button TP/LDQ 30132 which sets the anode voltage to center the beam on the detector aperture; and a button LD Zero 30134, which zeroes the partial pressure measurement signal eliminating baseline offset signal. An input/output component 30136 can, for example, include a computer interface, such as an interface to a computer display and a controller program. A process board 30138 can include a processor that communicates with, and controls, the input/output interface 30128, a display 30140, the audio out 30126, the anode voltage power supply 30116, the analog to digital converter and multiplexer 30124, the detector bias power supply 30118, the current to voltage converter for total ion current, 30120a, and the current to voltage converter for partial pressure current, 30122.

Figure 31A:
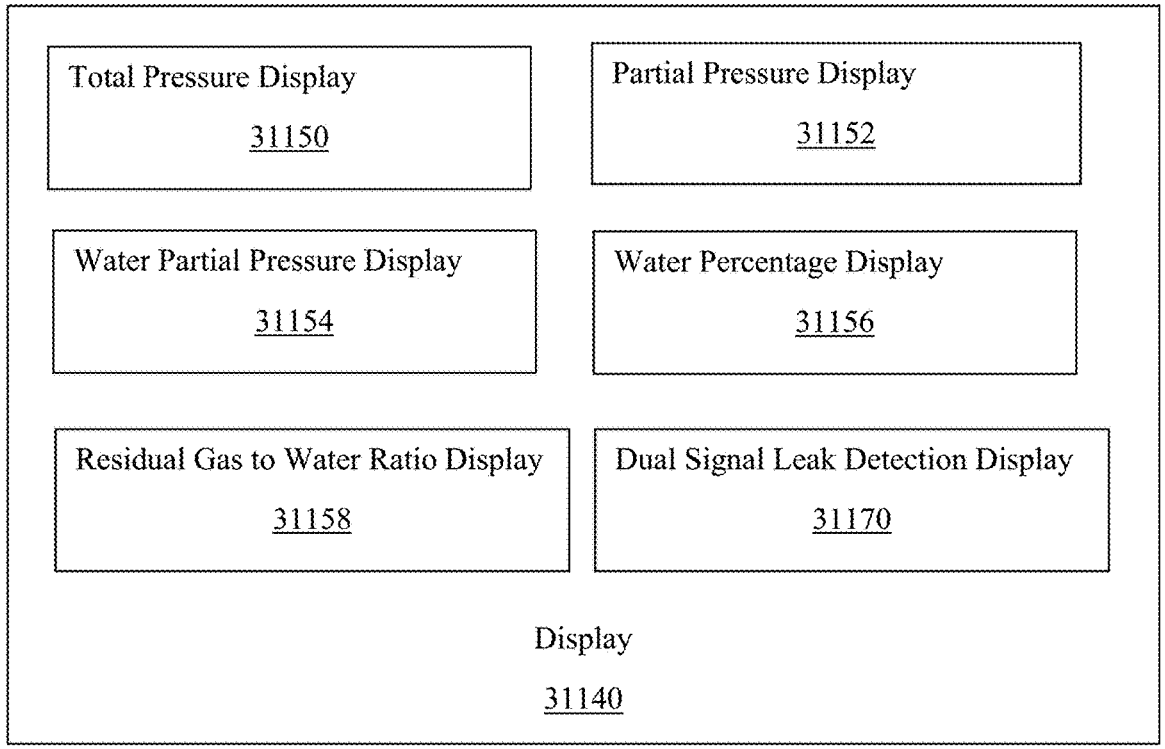
FIG. 31A is a schematic block diagram of a display component, in accordance with an embodiment of the invention.
Figure 31B:
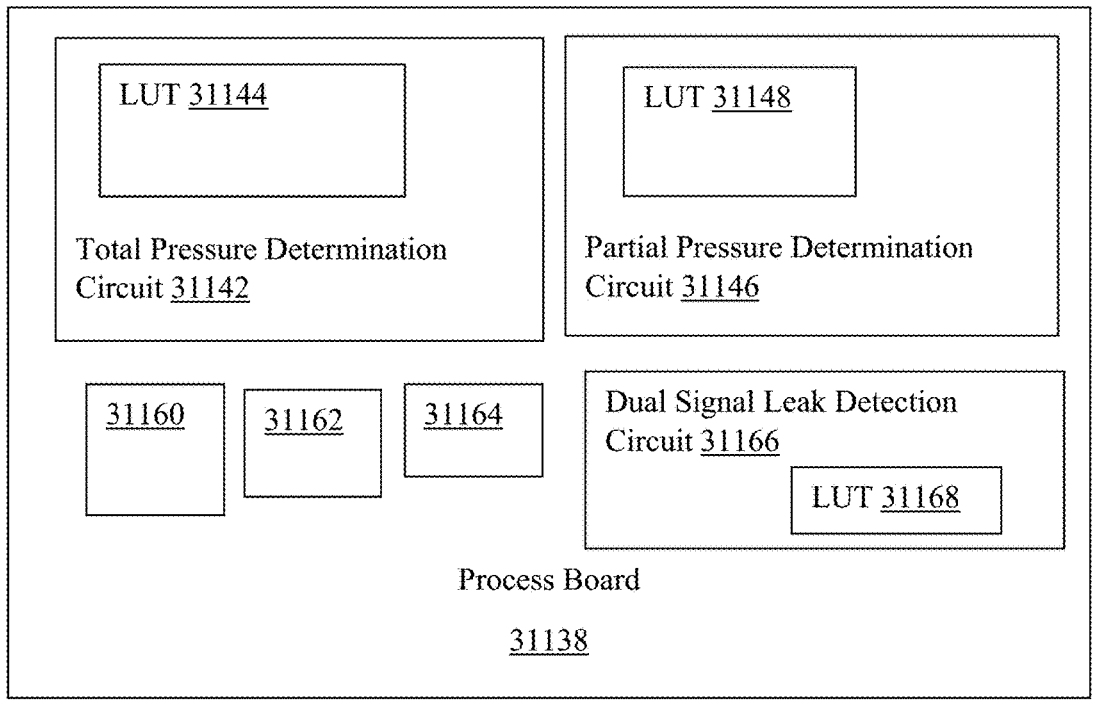
FIG. 31B is a schematic block diagram of a process board, in accordance with an embodiment of the invention.

FIGS. 31A and 31B are schematic block diagrams of a display 31140 and process board 31138, in accordance with an embodiment of the invention. In FIG. 31A, the display includes a total pressure display 31150, which provides an indication of a total pressure of the gas from the monitored chamber; and a partial pressure display 31152, which provides an indication of a partial pressure of a gas from the monitored chamber, which can, for example, be a helium partial pressure. The displays 31150 and 31152 are, indirectly, in electrical connection with the ion current measurement circuitry, for example via the circuitry in FIG. 30. The display 31140 can also include a water partial pressure display 31154, providing an indication of a partial pressure of water in the gas from the monitored chamber; and can include a water percentage display 31156 providing an indication of a water percentage of the gas in the monitored chamber. It will be appreciated that other component partial pressures can be displayed, such as a residual gas partial pressure. The display 31140 can also include a residual gas to water ratio display 31158, providing an indication of a ratio of a partial pressure of water from the monitored chamber to the sum of the partial pressures of all residual gases in the chamber. Further, the display 31140 can include a dual signal leak detection display 31170, providing an indication of a leak, based on a determination made by a dual signal leak detection circuit 31166, as described further below. These displays are likewise, indirectly, in electrical connection with the ion current measurement circuitry, for example via the circuitry in FIG. 30.

In FIG. 31B, the process board 31138 includes a total pressure determination circuit 31142 configured to determine the total pressure of the gas from the monitored chamber based at least on the total current measured by the first current measurement element. For example, the circuit 31142 can include a look up table 31144 implementing a calibration curve that relates measured current to total pressure. The process board 31138 also includes a partial pressure determination circuit 31146 configured to determine the partial pressure of the gas from the monitored chamber based at least on the current measured by the second current measurement element. For example, the circuit 31146 can include a look up table 31148 implementing a calibration curve that relates measured current to partial pressure. A water percentage determination circuit 31160 can be configured to determine the water percentage based at least on: (i) the total current measured by the ion current measurement circuitry, (ii) the partial pressure current measured by the ion current measurement circuitry, and (iii) a ratio of a cross sectional area of the source aperture to a surface area of a portion of the cathode electrode assembly exposed to the ions of the gas (as illustrated relative to FIG. 15). A residual gas to water ratio determination circuit 31162 can be configured to determine the ratio of the partial pressure of water to the partial pressure of residual gases based at least on the partial pressure current measured by the ion current measurement circuitry. A water partial pressure measurement circuit 31164 can be implemented in a similar fashion to partial pressure circuit 31146, for example including a LUT of its own. A dual signal leak detection circuit 31166 can be configured to determine a concurrent occurrence of both: (i) a decrease in the total current, flowing between the anode electrode and the cathode electrode assembly, measured by the ion current measurement circuitry, and (ii) an increase in the current, produced from receipt of the displaced ion component at the detector, measured by the ion current measurement circuitry. In order to do so, the dual leak detection circuit 31166 can, for example, include a LUT 31168 to store data indicating such pressure decreases and increases over time, or results based on combining them.

Figure 32:
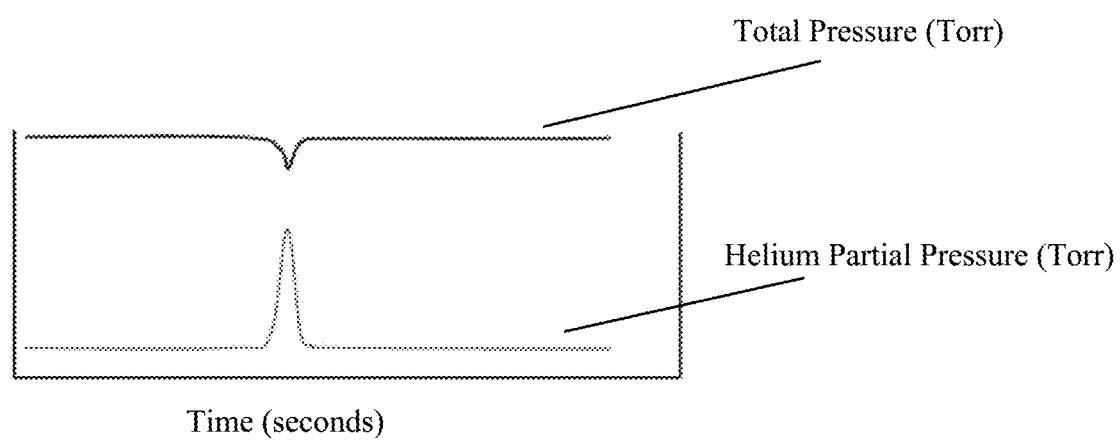
FIG. 32 is a diagram of graphs of total pressure current and partial pressure current illustrating use of a dual signal leak detection circuit, in accordance with an embodiment of the invention.

FIG. 32 is a diagram of graphs of total pressure current and partial pressure current illustrating use of a dual signal leak detection circuit 31166 (of FIG. 31B), in accordance with an embodiment of the invention. The dual signal leak detection circuit 31166 (of FIG. 31B) can, for example, use both the current based on total pressure drop and the current based on partial pressure increase to detect leaks while spraying helium around a vacuum system with a leak. An embodiment according to the invention obtains complementary signals in both total and partial pressure, from a typical vacuum system leak. For example, there is both a drop in total pressure and an increase in partial pressure when helium is sprayed around the leak point. This sort of dual response provides a higher degree of confidence on the detection of a leak, and helps the user to ignore other sources of signal transients that might not be due to actual leaks. Most ionization gauges commercially available do not have the resolution in display required to monitor changes in total pressure during leak detection. Most of such commercially available total pressure sensors have one decimal point of pressure resolution, which is not enough to provide detection of a small leak by only watching the total pressure display. That is, the total pressure gauge does not have enough resolution in the display to detect the generally small difference between large total pressure numbers that occurs when a gas such as helium is sprayed around a small leak point.

With reference to FIG. 32, there is illustrated the concept of dual signal leak detection in accordance with an embodiment of the invention. When, for example, a vacuum system has a leak to air, the air gas comes in through that leak and prevents the system from reaching its ultimate pressure. The integrity of the vacuum system is compromised and ultimate pressure cannot be achieved. When helium is sprayed around the leak, all or part of the air is replaced with helium. Since helium is lighter than air (having a ratio of nitrogen to oxygen of 80% to 20%, that is, $N_2/O_2$:80/20%) the leak of helium is higher than that of replaced air by the ratio of the square root of masses, that is, 2.7 times. However, the helium coming in also ionizes 5.5 times less efficiently than air. This means that as helium replaces air, the total pressure reading from the ionization gauge drops by a factor of: 5.5/2.7 times, that is, by about two times. Consequently, as the air comes in through the leak, gas is replaced (totally or partially) with helium, and one expects the total pressure reading to drop. On the other hand, as helium flows into the system through the same leak, the helium partial pressure signal increases as more helium becomes available in the source. This combination of the drop in total pressure and the increase in partial pressure can be used to indicate unequivocally, or with increased confidence, the presence of a leak in the system. FIG. 32 shows graphs, which illustrate schematically that total pressure (top trace) decreases, while partial pressure (bottom trace) increases, as a leak is sprayed with helium.

In accordance with an embodiment of the invention, the dual signal leak detection circuit 31166 (see FIG. 31B) and a cooperating memory such as LUT 31168, or more than one other processor or circuit taught herein in combination, is used to implement a dual signal detection procedure using instructions encoded in the processor. Such procedures can, for example, include that a leak detection is confirmed when both total and partial pressure signals support its presence. The two signals can also be combined, with a total pressure drop and a partial pressure increase providing a larger leak detection signal with improved signal to noise ratio. In one example, when a user is ready to perform a leak check, the total pressure and partial pressure data measurements are zeroed. Once helium is sprayed on the leak, one channel (total pressure or partial pressure), or both combined, are used to detect the leak. When the two are combined, the difference signal amplitudes can for example be added, and multiplied. Derivatives of these can be analyzed by the processor for sign and amplitude (that is, separate drift from actual leaks). In another example, the signals can be cross correlated, and the cross-correlation signal analyzed by the processor. Since the two signals will be temporarily identical, but with opposite sign, they will correlate very well when there is a leak, whereas, any noise will not pass the correlation test.

There is next provided a derivation, in accordance with an embodiment of the invention, demonstrating that for a vacuum system with an air leak, replacing the air at the point of gas entry with lighter helium gas causes the total pressure in the chamber to increase, but the pressure reported by the ionization to drop due to the reduced ionization efficiency of helium relative to nitrogen/oxygen. It also shows that there is a fixed ratio between the drop in total pressure and the increase in partial pressure. The derivation estimates a 3.3 times ratio between the increase in partial pressure of helium and the corresponding drop in indicated pressure of the ionization gauge. This is for an ionization gauge calibrated for nitrogen gas (same calibration as oxygen gas) and the partial pressure calibrated for helium gas. A conclusion based on the derivation is that there is a predictable relationship between the drop in total pressure and the increase in partial pressure in a system where the air leak is replaced with pure helium leak.

Figure 47:
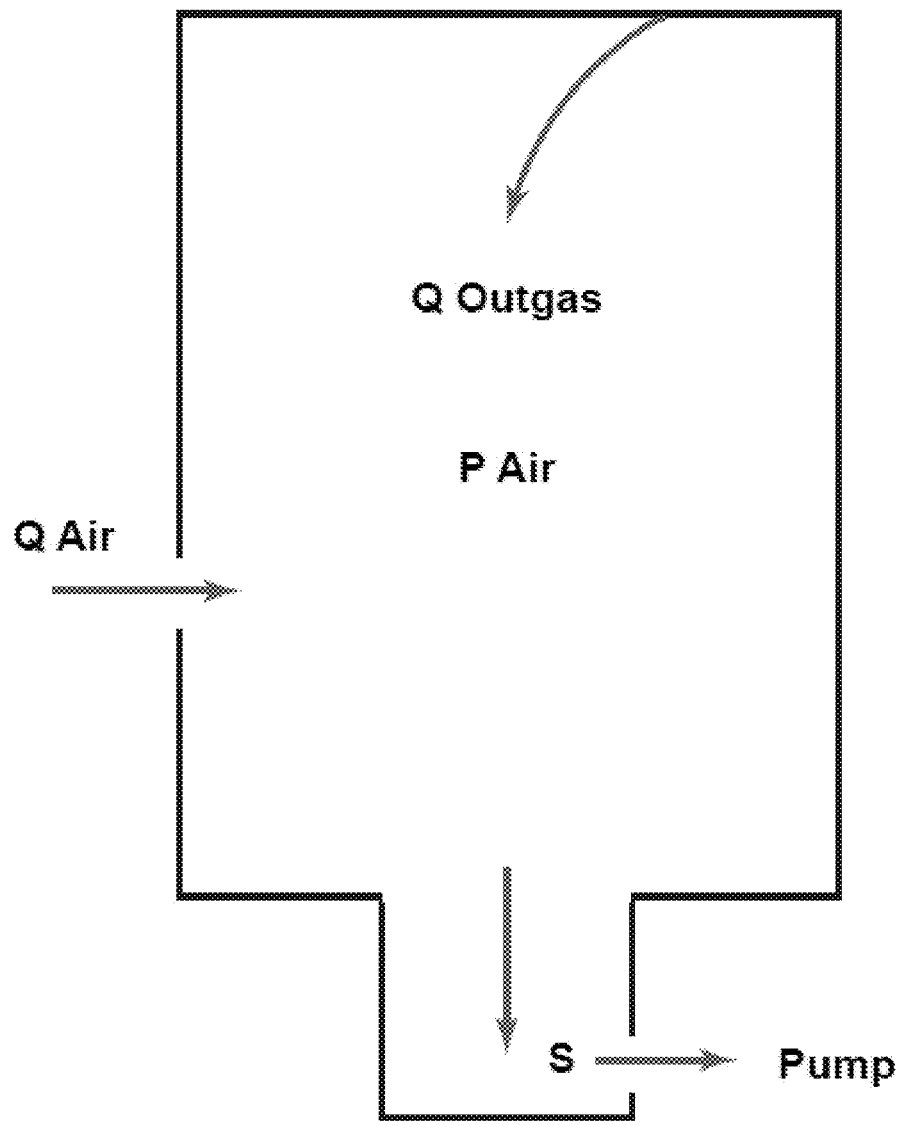
FIGS. 47 and 48 are schematic diagrams of a conceptual vacuum system with an air leak and a conceptual vacuum system with a helium leak, used in a derivation that is a conceptual basis for the use, in accordance with an embodiment of the invention, of a technique of dual signal leak detection.
Figure 48:
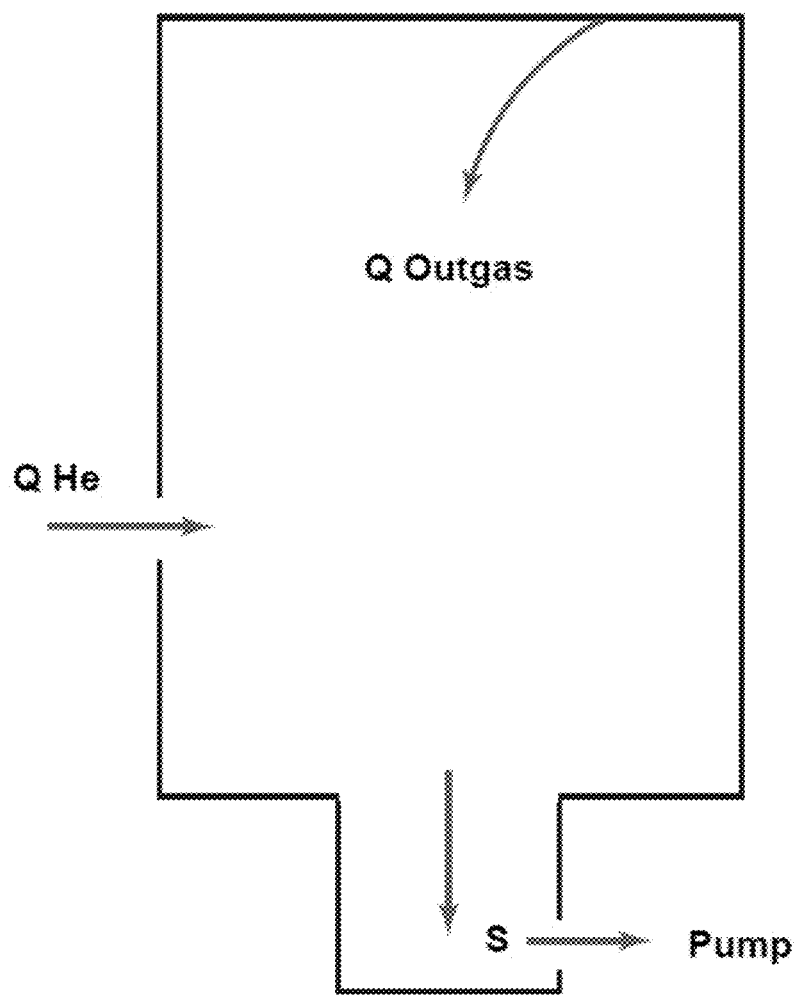

The derivation in accordance with an embodiment of the invention is made with reference to FIGS. 47 and 48.

FIG. 47 shows a vacuum system with an air leak. S is the pumping speed in liters per second. $Q_{outgas}$ is the molecular outgassing rate from the wall of the chamber in Torr Liter/second. $Q_{Air}$ is the molecular flow rate of air into the chamber in Torr Liter/second through the leak point.

The total pressure in the chamber is equal to:

$$PAir = \frac{Qoutgas + QAir}{S} \quad (1)$$

FIG. 48 shows a vacuum system with a helium leak (the same leak). Here, the total pressure in the chamber is equal to:

$$PHe = \frac{Qoutgas + QHe}{S} \quad (2)$$

Where Qoutgas and S remain the same, $$QHe = QAir * \left[\frac{Mair}{MHe}\right]^{1/2} \quad (3)$$

which for masses of air and helium, $M_{air}$ and $M_{He}$ respectively, of 30 and 4 amu respectively, obtains:

$$QHe = 2.7 * QAir \quad (4)$$

And:

$$PHe = \frac{Qoutgas + 2.7\ QAir}{S} \quad (5)$$

The pressure change (actual total pressure) is given by;

$$\Delta P = PHe - PAir = 1.7 * \left(\frac{QAir}{S}\right) \quad (6)$$

The conclusions are that, as air is replaced with helium, the pressure in the chamber increases as helium diffuses faster through the leak. The helium contributes an additional amount of pressure to the chamber given by:

$$\frac{1.7\ Qair}{S} \quad (7)$$

Next there is determined the measured total pressure (ionization gauge). The pressure measured and reported by the ionization gauge is determined by the product of actual gas pressure and the ionization efficiency of the gas (IEG), relative to nitrogen equaling 1. Here, the IEG, Air equals 1, and the IEG, He equals 0.18. There is performed "indirect" pressure measurement.

The measured total pressure, for air (assuming water is the outgassing component), is as follows.

$$Pm, Air = IEG, H20 * PH20 + IEG, Air * Pair \quad (8)$$

$$Pm, Air = \frac{IEG, H20 * Qoutgas}{S} + IEG, Air * \frac{QAir}{S} \quad (9)$$

For helium, assuming no change in outgas levels:

$$Pm, He = \frac{IEG, H20 * Qoutgas}{S} + IEG, He \frac{QHe}{S} \quad (10)$$

$$Pm, He = \frac{IEG, H20 * Qoutgas}{S} + IEG, He * \frac{2.7 * QAir}{S} \quad (11)$$

$$Pm, He = \frac{IEG, H20 * Qoutgas}{S} + (IEG, He * 2.7)\frac{Qair}{S} \quad (12)$$

From which it follows that:

$$\Delta Pm = Pm, He - Pm, Air = [IEG, He * 2.7 - IEG, Air] * \frac{QAir}{S} \quad (13)$$

And given that IEG,He is 0.18 and IEG,Air is 1, it follows that:

$$\Delta Pm = [0.18 - 1] * \frac{Qair}{S} \quad (14)$$

And so the reduction in displayed pressure is given by:

$$\Delta Pm = -0.82 * \frac{Qair}{S} \quad (15)$$

The conclusion that follows is that, even though the total pressure in the chamber increases when helium replaces air, the measured pressure reported by the ionization gauge drops by the expression given in Equation (15), above.

Next we evaluate the measured partial pressure. The increase in partial pressure is a direct report of the partial pressure of helium in the chamber:

$$PPHe = \frac{QHe}{S} \quad (17)$$

$$PPHe = 2.7 * \frac{QAir}{S} \quad (18)$$

The conclusion is that the replacement of air with helium at the leak causes the total pressure to drop and the partial pressure to rise:

$$\frac{\Delta PPHe}{\Delta Pm} = \frac{2.7 * \frac{Qair}{S}}{-0.82 * \frac{QAir}{S}} = 3.3x \quad (19)$$

Thus:

$$\frac{\Delta PPHe}{\Delta Pm} \cong 3.3x \quad (20)$$

This condition of Equation (20) must be met whenever a leak is present in the system and air is replaced with helium.

The general conclusion of the derivation is, then, that we expect a mathematical correlation between the drop in measured total pressure and the increase in partial pressure of helium.

In practice, in accordance with an embodiment of the invention, the following procedure can be followed. If a user is ready to measure a helium leak, the user can, for example, engage a user interface of the vacuum gauge (such as a button or key), which does two things: (i) zeroes the partial pressure signal of helium, and (ii), measures the total pressure. As the user starts spraying helium, the system (such as the dual signal leak detection circuit) now looks at the same time for an increase in partial pressure signal and a decrease in total pressure. For a leak to be a true leak it is expected that there should be a predictable ratio between both changes. The above derivation shows what one would nominally expect. This can, for example, be a minimum starting step to compare both transients as the user does the leak checking around the system. In using this technique, it can for example be considered that one only has a leak if the total pressure drops, the partial pressure increases and the ratio of both changes is what is expected for that system. Depending on how accurate the total and partial calibrations for the system are at the time of measurement, a periodic recalibration of the ratios for a given vacuum gauge can be performed, and a factory calibration before the system is first used should be used for a working implementation of such an embodiment. It is noted that the exact ratio may change depending on how the calibration of total and partial pressure is done, but it is expected, in use of such an embodiment according to the invention, there will be a fixed ratio between the drop and rise of the two measurands.

A dual signal leak detection technique of an embodiment can, for example, have the advantage of distinguishing cases that are not true leaks, but might otherwise appear as such. For example, supposing that a chamber is connected, through a valve, with a separate chamber containing helium. The valve is opened and it allows helium in, but then is closed. As compared before and after the closing of the valve, both the total and partial pressure drop, but the change is not due to a leak. Such a case can be distinguished using a dual signal leak detection technique, taught herein.

In accordance with an embodiment of the invention, the vacuum gauge can be included in a modular unit comprising the vacuum gauge itself, along with any, or all, of the electronics, control and display components of FIGS. 12, 30, 31A and 31B, and 64-67. For example, the modular unit can include one or more of the total pressure display 31150, the partial pressure display 31152 (see FIG. 31A) and the ion current measurement circuitry 12170 (see FIG. 12), and the circuits of FIGS. 64-67.

Figure 33:
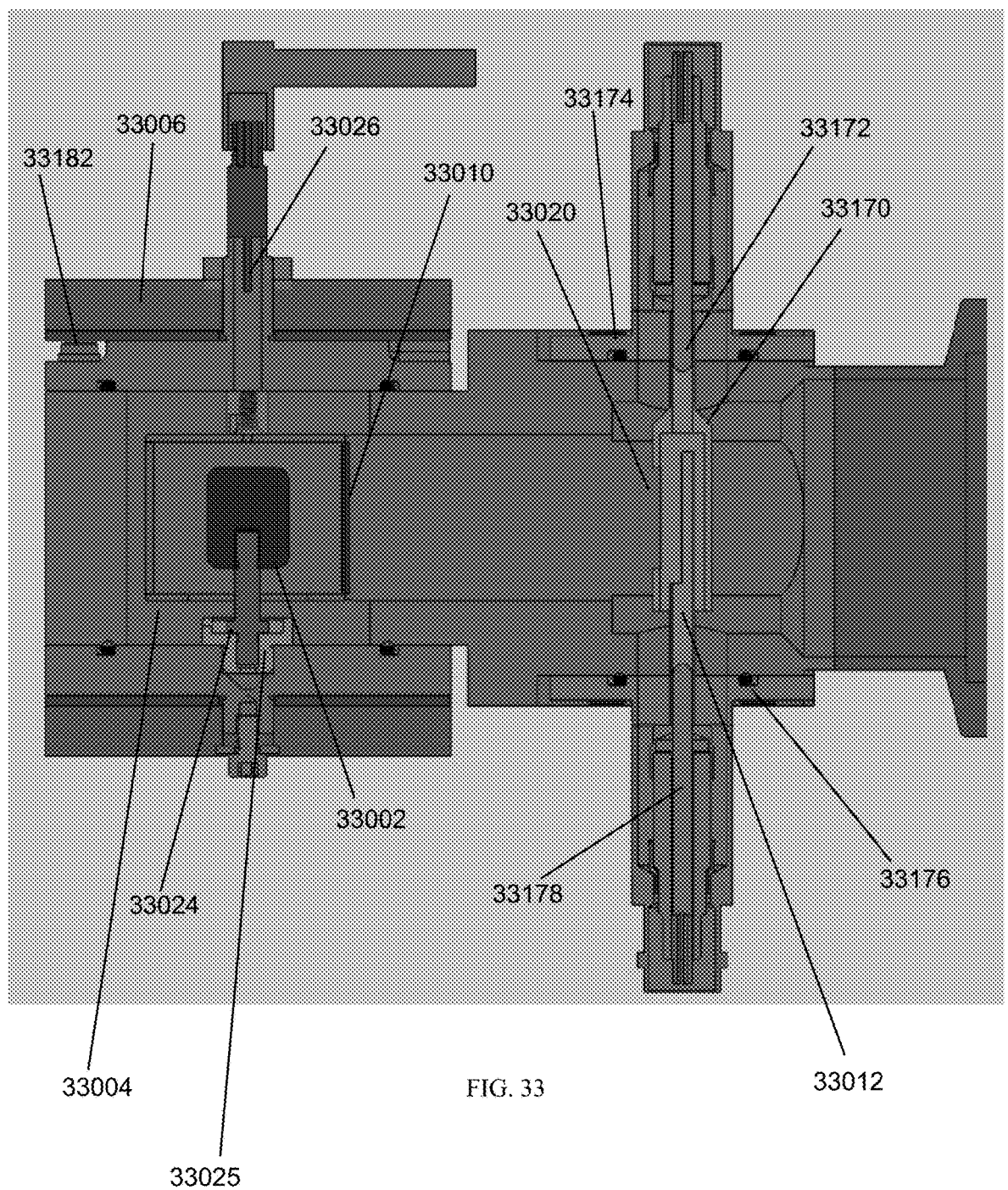
FIG. 33 is a vertical cross-section diagram of an inverted magnetron cold cathode ionization vacuum gauge including a detector shield, in accordance with an embodiment of the invention.

FIG. 33 is a vertical cross-section diagram of an inverted magnetron cold cathode ionization vacuum gauge including a detector shield, in accordance with an embodiment of the invention. This embodiment will also be discussed with reference to the transparent projection view of FIG. 34, the transparent vertical section view of FIG. 35, the horizontal half cross section view of FIG. 36, the horizontal half cross section view of FIG. 37 (in which the half cross section is taken through the anode electrical connection).

In the embodiments illustrated in FIGS. 33 through 37, with reference first to FIG. 33, the inverted magnetron cold cathode ionization vacuum gauge further comprises a detector shield 33170 surrounding a length of the detector 33012. The detector shield 33170 can, for example, be a cylindrical shaped detector shield that surrounds an entire surface of a length of the detector 33012 that will be exposed to ions that are emitted out of the cathode electrode assembly 33004, except for a portion that is exposed to the ions through a detector aperture 33020 formed in the detector shield 33170. The detector shield 33170 can co-axially surround the detector 33012. The detector aperture 33020 can, for example, have a width of about 0.025 inches, although it will be appreciated that a variety of dimensions can be used. The width of the detector aperture 33020 can, for example, be decided based on the required sensitivity and mass resolution. A detector shield electrical connector 33172 can be in electrical connection between the detector shield 33170 and a voltage source (not shown in FIG. 33) applying a bias voltage to the detector shield 33170, so that the detector shield 33170 thereby is a high pass ion energy filter in a similar fashion to that taught elsewhere herein. A detector shield rotation coupling 33174 can be included in a mechanical connection of the detector shield 33170 to the inverted magnetron cold cathode ionization vacuum gauge. For example, in FIG. 33, the detector shield rotation coupling 33174 is mechanically coupled to the detector shield electrical connector 33172. A detector rotation coupling 33176 can be included in a mechanical connection of the detector 33012 to the inverted magnetron cold cathode ionization vacuum gauge. For example, in FIG. 33, the detector rotation coupling 33176 is mechanically coupled to the detector electrical connection 33178 of the detector 33012 to the ion current measurement circuit. The source aperture 33010 can, for example, comprise a width of about 0.010 inches, although it will be appreciated that other dimensions can be used. The detector 33012, of which a length is surrounded by the detector shield 33170, can comprise a Faraday collector. In one embodiment, such a Faraday collector can comprise a Faraday cup, for example by comprising one or more side shields to form a "cup" shape of the Faraday collector detector 33012. Such side shields and a cup shape to the Faraday collector detector 33012 can, for example, help to collect secondary electrons and remove non-linearities in the detected signal. Such a Faraday collector can achieve low leakage current, such as in the Femto-Ampere range, which permits measurement of low helium partial pressure signals. In addition, a magnet rotation coupling 33182 can be included in a mechanical connection of the magnet assembly 33006 to the inverted magnetron cold cathode ionization vacuum gauge. An anode electrical pin 33024 is electrically connected to the anode electrode 30002, and a cathode electrical pin 33026 is electrically connected to the cathode electrode assembly 33004. For example, a conductor (not shown) can lead from cathode electrical pin of feedthrough connector 33026 to the cathode electrode assembly 33004, and a conductor (not shown) can lead from anode electrical pin of feedthrough connector 33024 to an anode electrical connector 34184 (see FIG. 34). An insulator 33025, such as an alumina ceramic or plastic (for example, PEEK) insulator, can for example surround the anode electrical pin 33024. Connections to the cathode feedthrough connector 33026, anode feedthrough connector 33024, and to the detector shield electrical connection 33172 and detector electrical connection 33178 can, for example, be made with BNC connectors (Bayonet Neill-Concelman connectors, which are quick connect/disconnect connectors used for coaxial cable), or with connector pins that go directly into connectors on printed circuit boards fastened to the sensor and surrounded by an external box. In another example, for connection to the cathode feedthrough connector 33026, an SMB (SubMiniature version B) connector can be used. The detector shield electrical connection 33172 can, for example, be made using a medium power high voltage connector (or "MHV" connector) such as those sold by MDC Vacuum Products, LLC of Hayward, Calif., U.S.A. An anode voltage of, for example 1400 V, can be used, and a detector shield bias voltage of, for example, 450 V, so that the detector shield provides high energy filtering. The Faraday collector (or other detector) can, for example, be maintained at ground potential by its electrometer connection.

Figure 34:
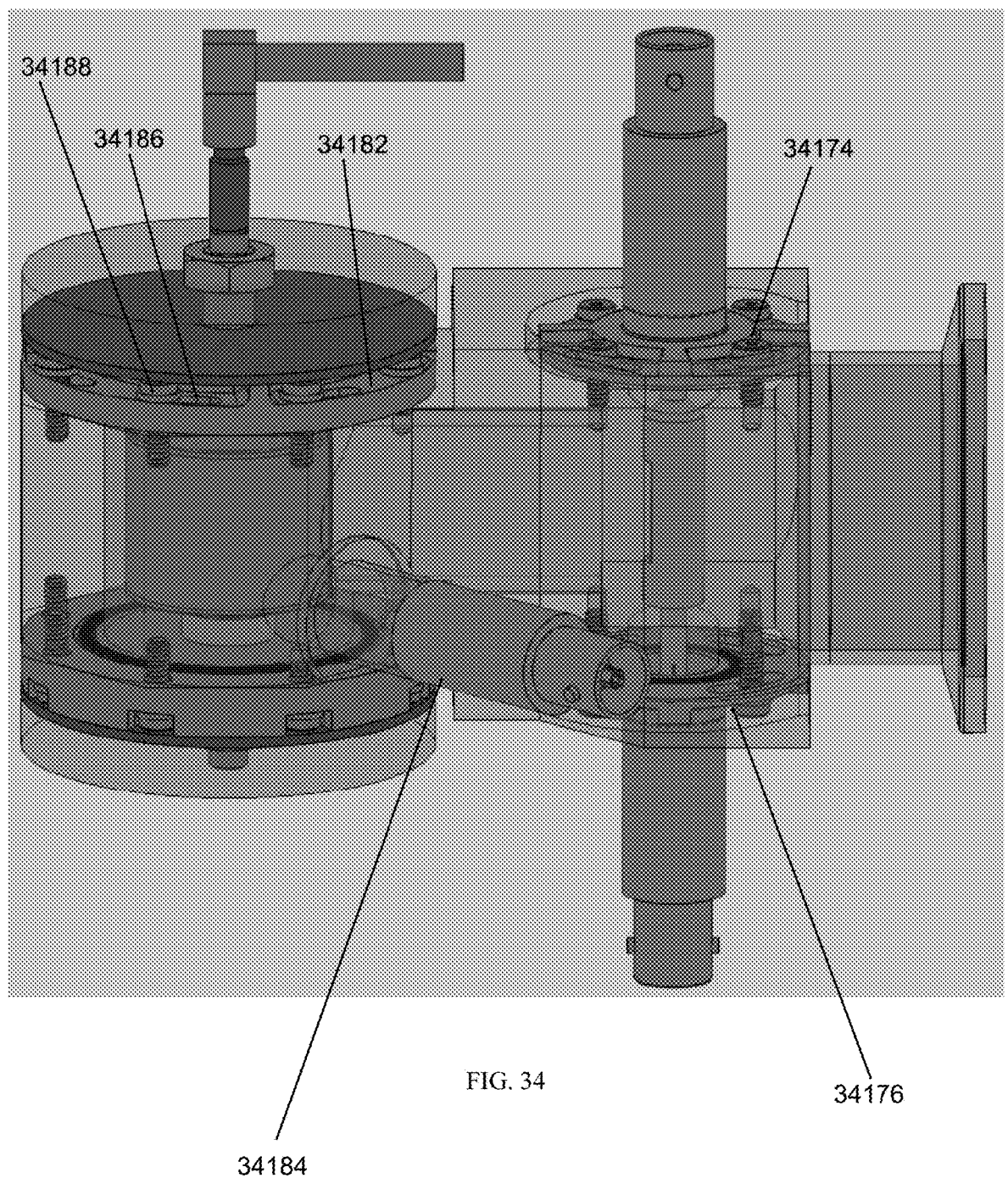
FIG. 34 is a transparent projection view of the vacuum gauge of FIG. 33 including a detector shield, in accordance with an embodiment of the invention.
Figure 35:
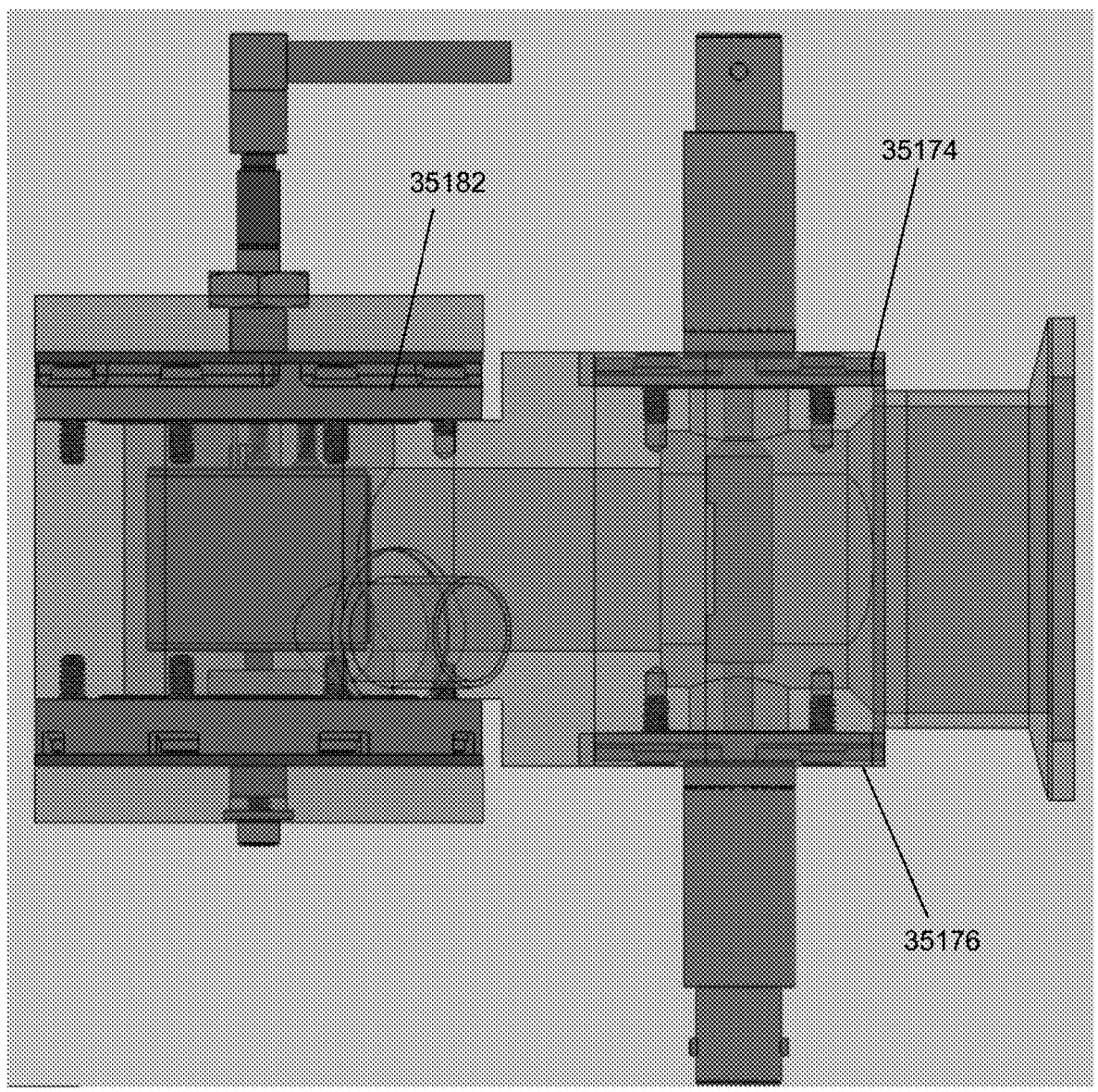
FIG. 35 is a transparent vertical section view of the vacuum gauge of FIGS. 33 and 34 including a detector shield, in accordance with an embodiment of the invention.
Figure 38:
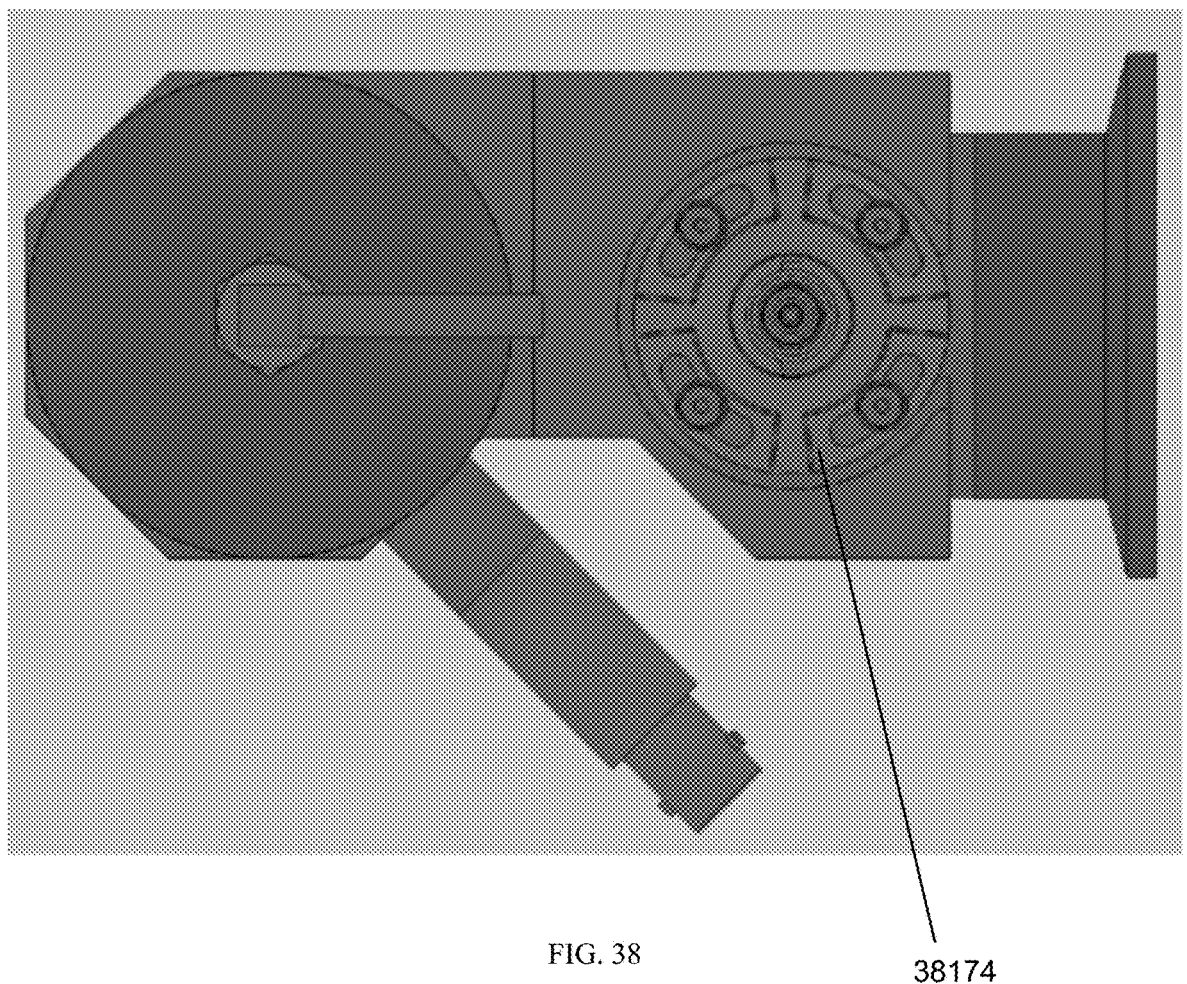
FIG. 38 is a top view.
Figure 39:
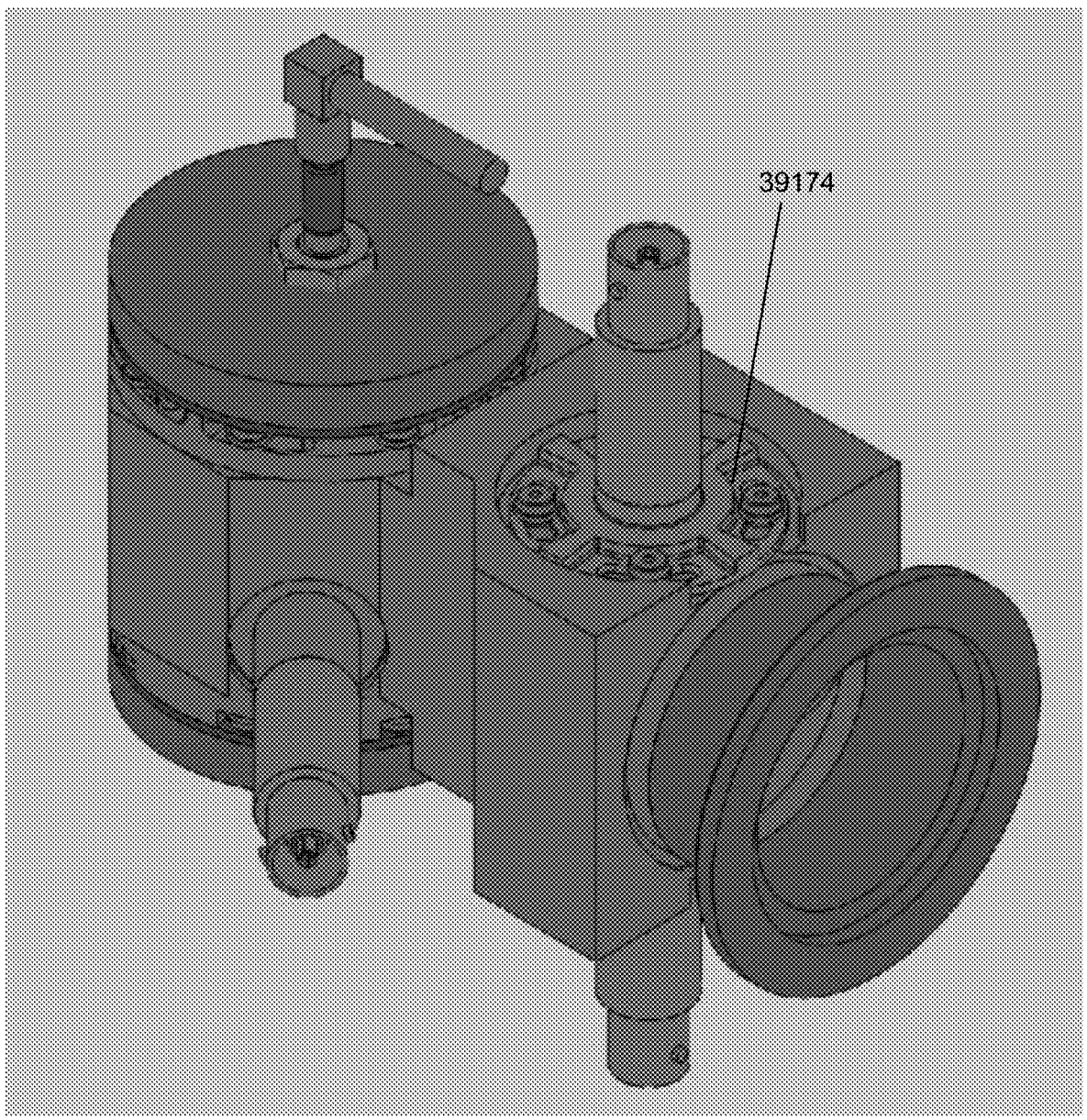
FIG. 39 is a bottom view, of the vacuum gauge of FIGS. 33 through 37, illustrating a rotation coupling of the detector shield, in accordance with an embodiment of the invention.

In the transparent projection view of FIG. 34, and in similarly numbered components 35182, 35174 and 35176 in the vertical transparent section of FIG. 35, there is shown the magnet rotation coupling 34182, the detector shield rotation coupling 34174 and the detector rotation coupling 34176. As shown in FIG. 34, these rotation couplings 34182, 34174 and 34176 can, for example, be formed using slots 34186 through which screws 34188 extend, and in which the screws 34188 are rotated to rotate the respective components coupled to the rotation couplings. An O-ring seal can be used to maintain the vacuum while the plate rotates. FIG. 38 is a top view, and FIG. 39 is a bottom view, of the vacuum gauge of FIGS. 33 through 37, further illustrating the rotation coupling 38174, 39174 of the detector shield. The ability to rotate components permits, for example, phasing of the detector aperture and the detector, by rotating the components relative to each other. A rotation of, for example, up to 20 degrees, such as 16 degrees, can be used for the magnet rotation coupling 34182 to allow for a deflection angle of ion components. For a central field of 1250 Gauss, a helium deflection of 11 degrees was measured, in an embodiment of the invention. Although rotation couplings are taught herein, alternative embodiments can keep one or more of the components that are here shown with a rotation coupling as a fixed-position component, which does not have a rotation coupling.

Figure 36:
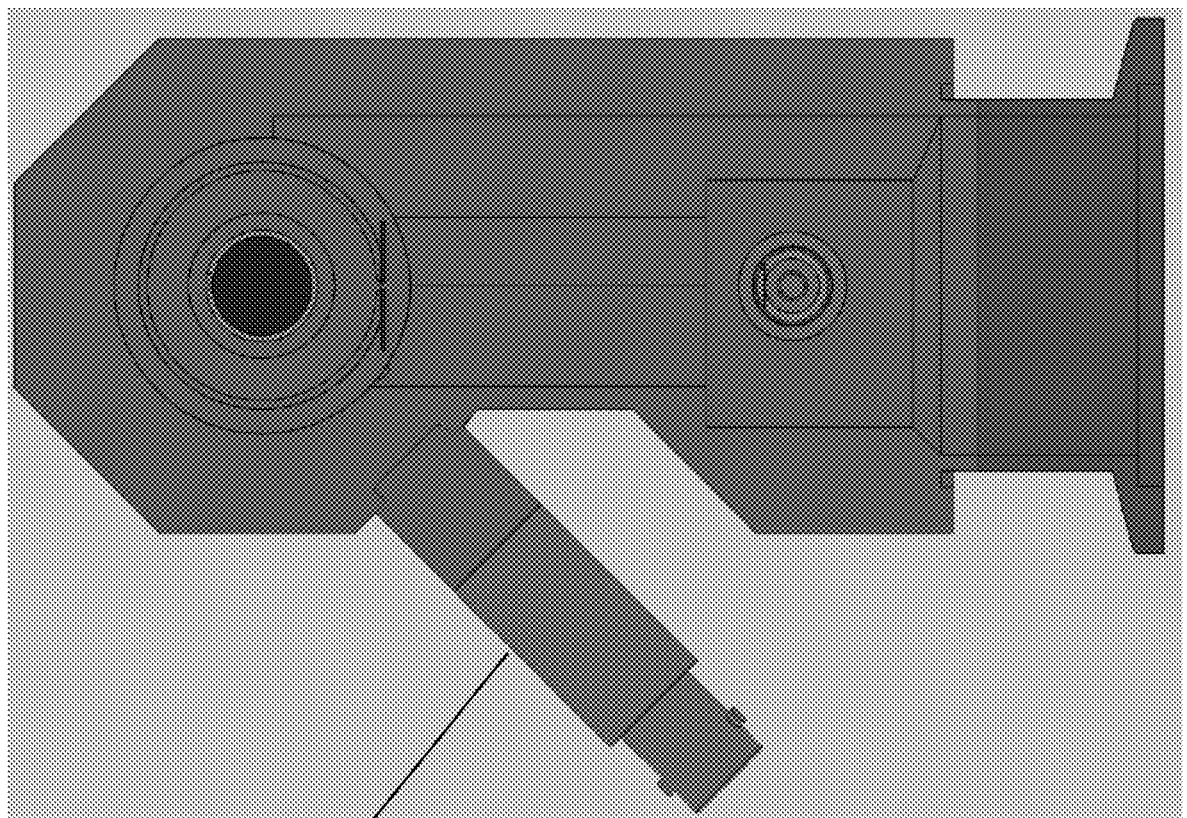
FIG. 36 is a horizontal half cross section view of the vacuum gauge of FIGS. 33 through 35, in accordance with an embodiment of the invention.
Figure 37:
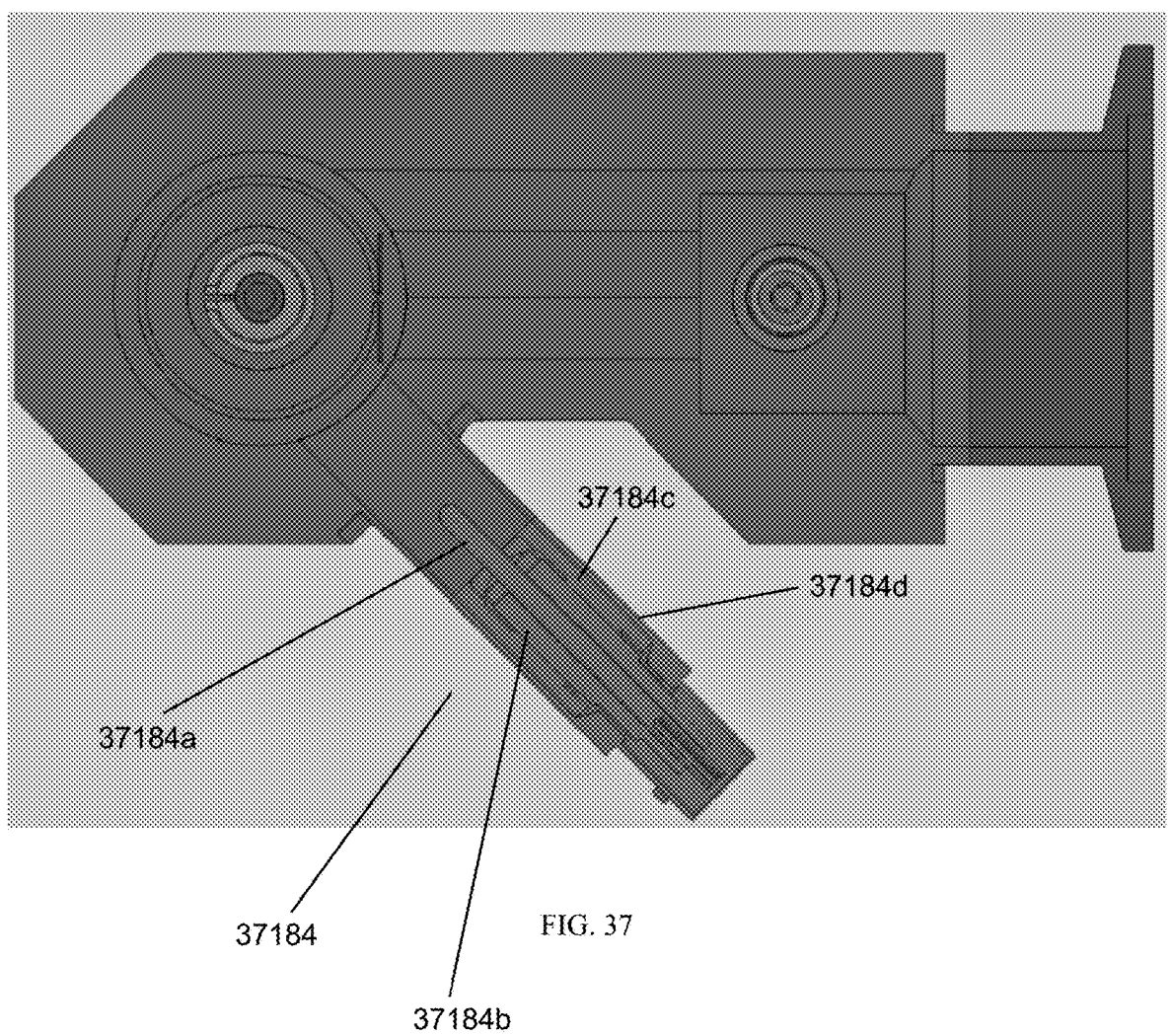
FIG. 37 is a horizontal half cross section view of the vacuum gauge of FIGS. 33 through 36, taken through an anode electrical connection, in accordance with an embodiment of the invention.

The anode electrical connector 36184 is further illustrated in the horizontal half cross section view of FIG. 36, and the horizontal half cross section view of FIG. 37, in which the half cross section is taken through the anode electrical connector 37184. The anode electrical connector 37184 can for example include a high voltage connector pin 37184a (made for example of Kovar®, a trademark of CRS Holdings, Inc. of Delaware, U.S.A.), which is directly electrically connected (for example with a conductor, not shown) to the anode electrode 33002 (see FIG. 33). The high voltage connector pin 37184a is, for example, surrounded by an air gap 37184b, which is in turn surrounded by an insulator 37184c, such as an alumina insulator or ceramic insulator. An envelope 37184d, such as an SS304 envelope, surrounds the exterior of the anode electrical connector 37184, and can for example be TIG welded to a block extending from the vacuum gauge. An example of a suitable anode electrical connector 37184 is a medium power high voltage connector (or "MHV" connector) such as those sold by MDC Vacuum Products, LLC of Hayward, Calif., U.S.A.

Although various forms of electrical connection are discussed herein, it will be appreciated that others can be used than those illustrated. For example, anode and cathode connections can be made from the same side of the vacuum gauge, rather than opposite to each other. In another example, for production, a signal electronics board can be on one side of the vacuum gauge, with a high voltage electronics board on another side of the vacuum gauge.

Figure 45:
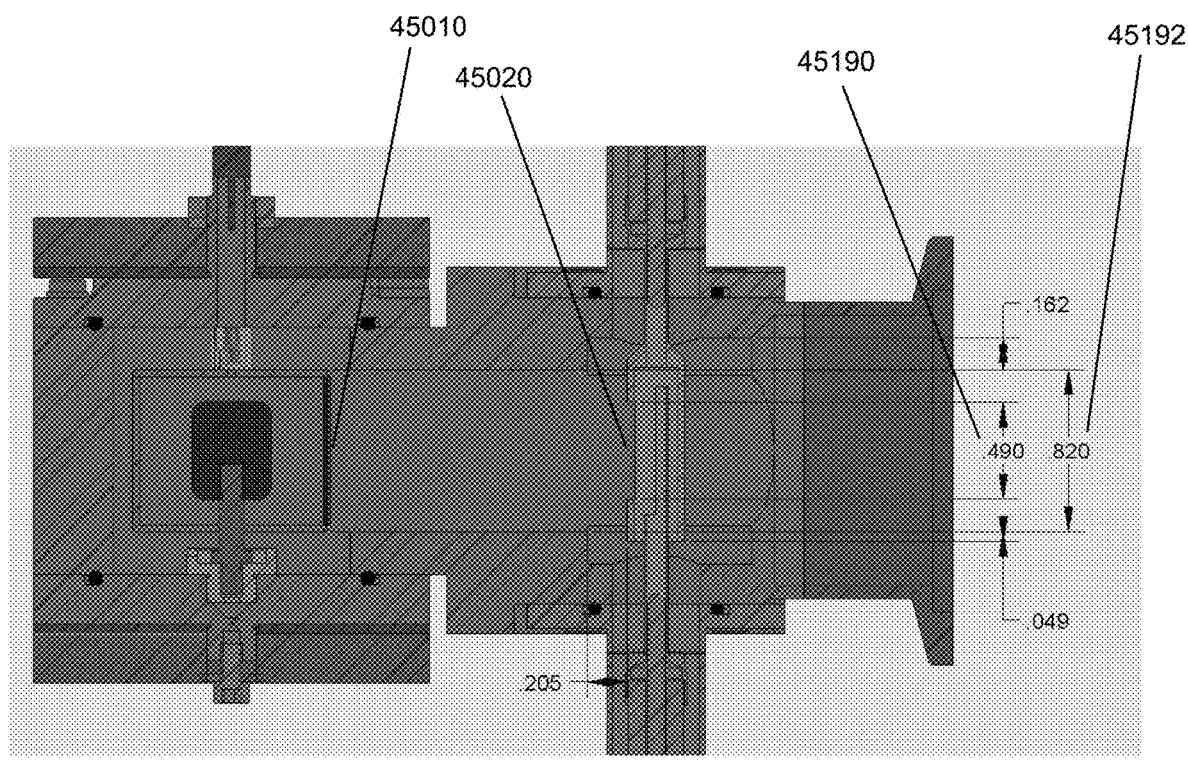
FIG. 45 is a vertical cross section diagram showing example dimensions of components of a vacuum gauge in accordance with an embodiment of the invention.

With reference to FIG. 45, that figure is a vertical cross section diagram showing example dimensions of components of a vacuum gauge in accordance with an embodiment of the invention. These dimensions include a height 45190 (here, for example, of about 0.490 inches) of the detector aperture 45020, and a height 45192 (here, for example, of about 0.820 inches) of the source aperture 45010. However, it will be appreciated that other dimensions can be used. For example, unless there are exposed dielectric surfaces within the vacuum gauge, a larger length for the detector aperture 45020 will typically be used than the length of the source aperture 45010, because the ion component beam diverges as it leaves the source. For example, in the embodiment of FIG. 60 (below), the source aperture can be about 0.350 inches in length and the detector aperture can be about 0.400 inches in length.

Figure 46:
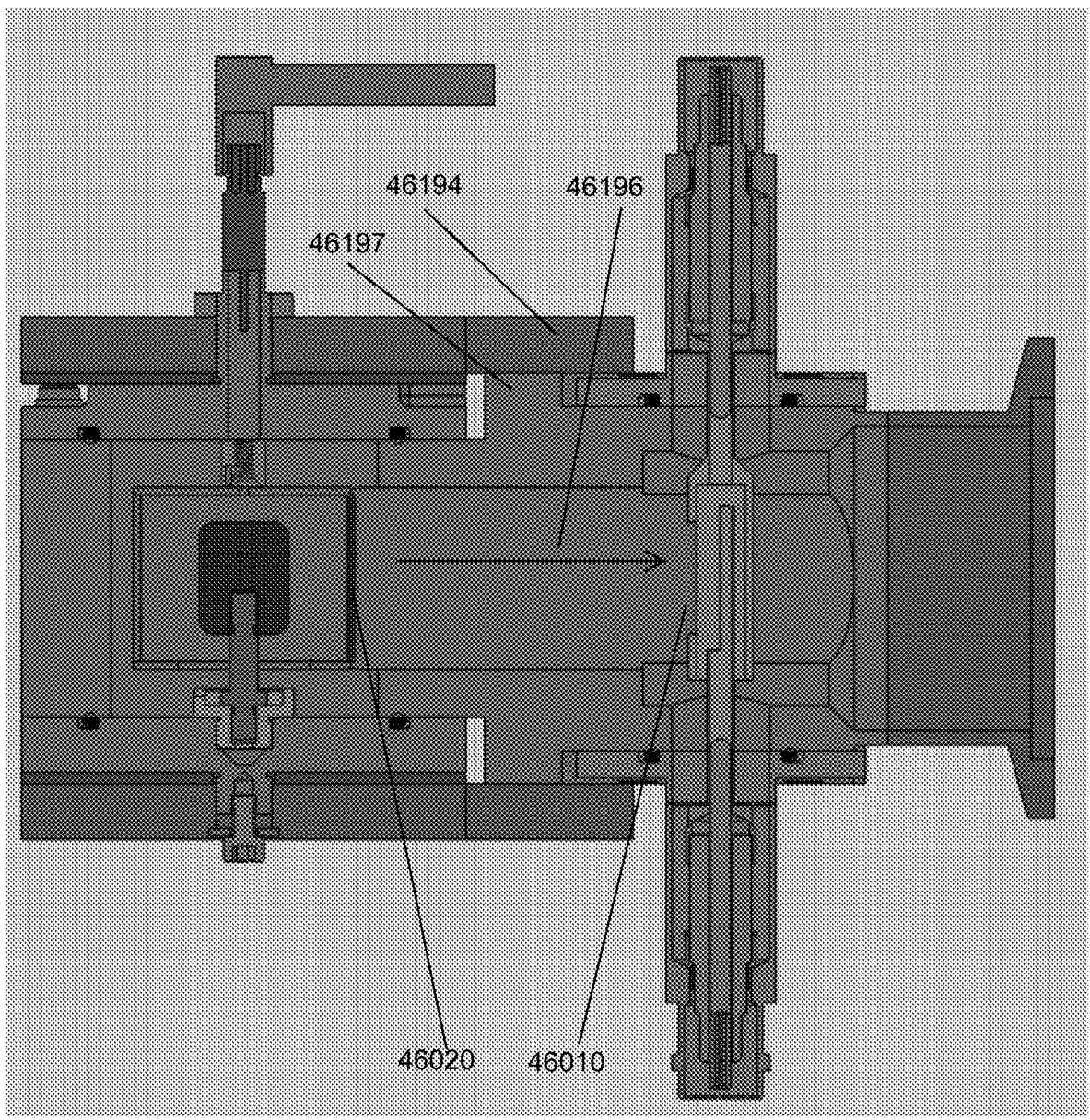
FIG. 46 is a vertical cross section diagram showing a magnetic field extension assembly positioned to extend the magnetic field in a direction extending longitudinally from the source aperture towards the detector, in accordance with an embodiment of the invention.

FIG. 46 is a vertical cross section diagram showing a magnetic field extension assembly 46194 positioned to extend the magnetic field in a direction (indicated by arrow 46196) extending longitudinally from the source aperture 46020 towards the detector 46010, in accordance with an embodiment of the invention. In this embodiment, the magnetic field extension assembly 46194 can, for example, provide additional separation of ion components traveling towards the detector 46010, for example to provide additional ability to resolve one or more ion components, such as helium and residual gases. In this example, the magnetic field extension assembly includes permanent magnets 46194 attached to a magnet deck 46197. In one implementation the permanent magnets 46194 were rectangular magnets, neodymium material, N45 grade, with dimension of 1.5 inches in length, by 0.75 inches in width, by 0.125 inches to 0.25 inches in height, although it will be appreciated that a variety of different arrangements can be used.

Returning to FIGS. 40 and 41, those figures are graphs showing separation of water from other residual gases using a vacuum gauge in accordance with an embodiment of the invention. In these figures, all of the residual gases with molecular weights higher than water are included in the largest peaks (although in FIG. 40 the shorthand label "N2" is used for that peak, since that is a major component of the residual gases). An angle, in degrees, of the source aperture is shown on the horizontal axis, relative to a central axis of a gas inlet passage, and a detected partial pressure current in volts, provided by a linear pico-ammeter, is shown on the vertical axis. In order to provide additional separation of water, one can, in an embodiment, increase the magnetic field in the total pressure gauge, or add magnetic field extensions to help to separate water, or both. An example of such magnetic field extensions is described relative to FIG. 46. If the magnetic field is increased too much, undesirable discontinuities can result, and hence the embodiment of FIG. 46 can be useful to assist with separation of water, for example. A large amount of separation of the helium peak from the other peaks, with baseline signal on each side of the helium peak, permits automatic zeroing of the helium signal, which provides advantages for automated helium sensing and helium leak detection.

Figure 40:
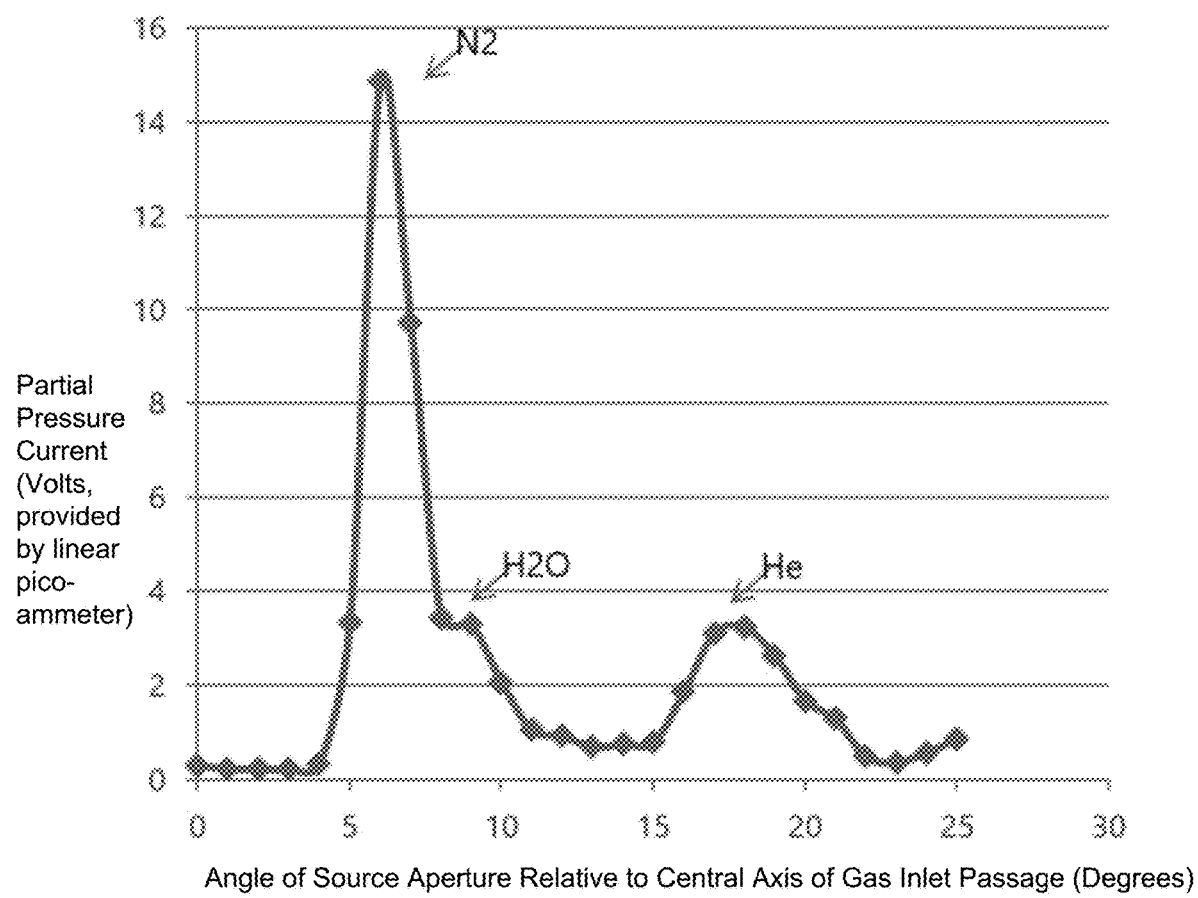
FIG. 40 is and 41 are graphs showing separation of water from other residual gases using a vacuum gauge in accordance with an embodiment of the invention.

For the graph of FIG. 40, the magnet assembly used two two-inch diameter magnets, of a thickness of 0.375 inches with a 0.25 inch center hole. The internal field at the cold cathode gauge was 1250 Gauss. The water ion component is seen ("H2O") to be starting to be clearly separated from the rest of the residual gases. The voltage of the anode was 1200 V, and the bias voltage of the detector was 225 V.

Figure 41:
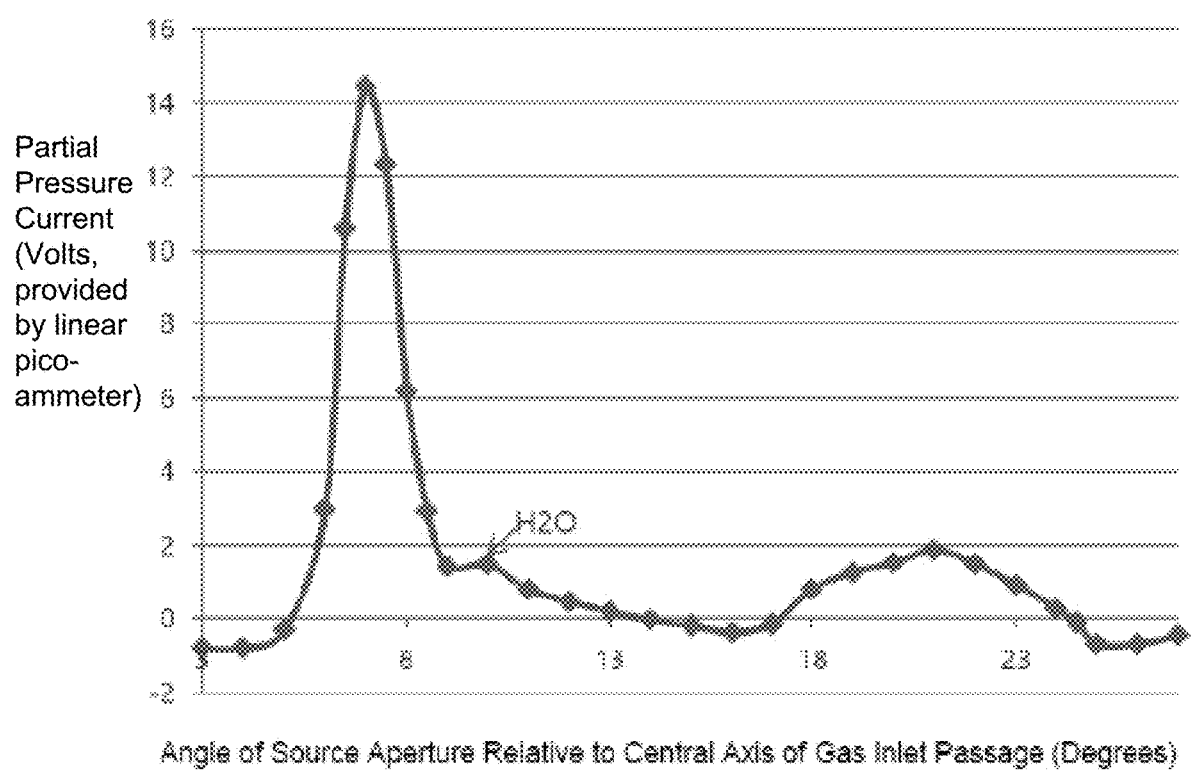

The graph of FIG. 41 shows a similar graph of a water resolving spectrum achieved by an embodiment according to the invention. The vacuum system was at $2\times10^{-4}$ Torr residual gas base pressure. $1\times10^{-5}$ Torr of helium was added. The voltage of the anode was 1200 V, and the bias voltage of the detector was 225 V. Water is beginning to be separated from other residual gases. Helium is clearly resolved from the rest of the residual gases. The peak to the left of water is all residual gases with masses larger than water.

Figure 42:
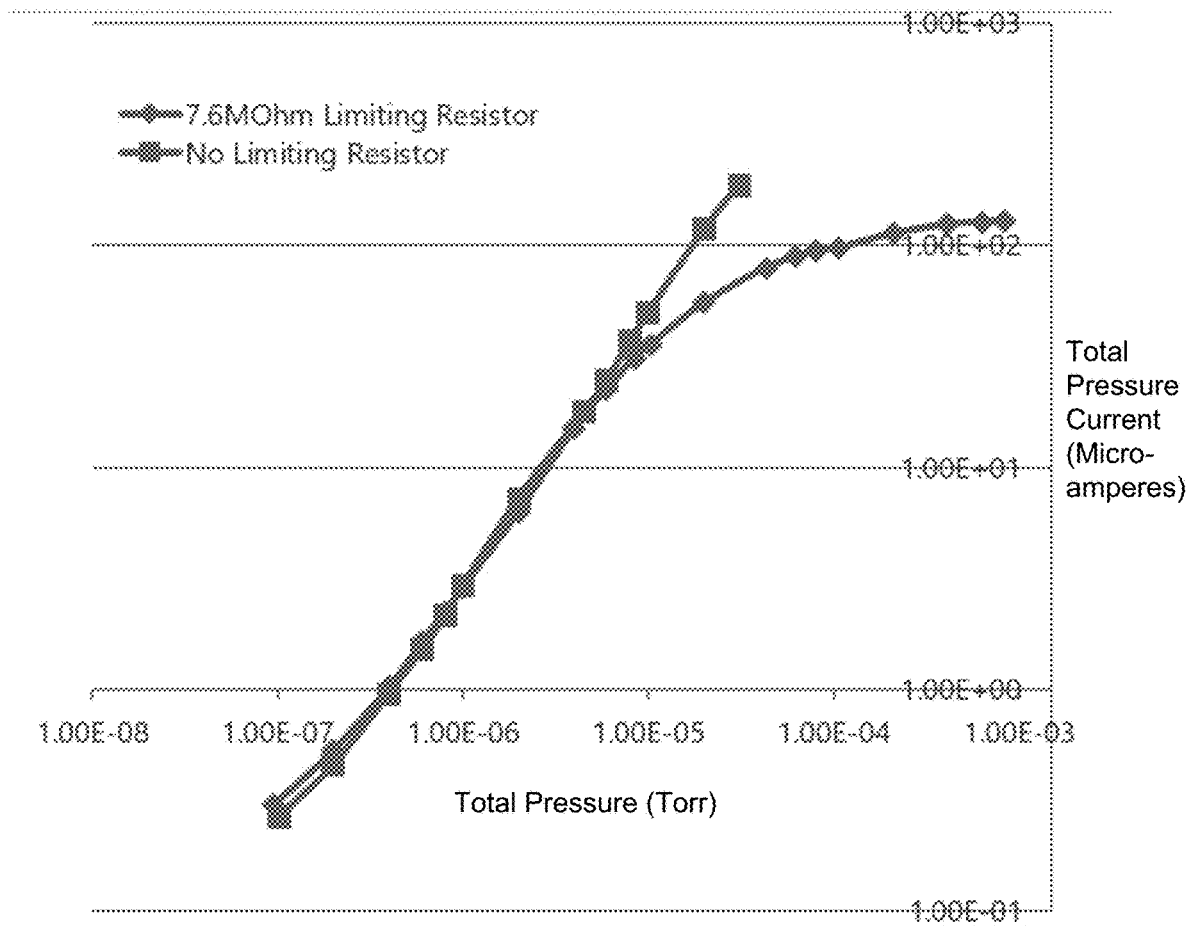
FIGS. 42 and 43 are graphs showing total pressure sensitivity of a vacuum gauge in accordance with an embodiment of the invention.
Figure 43:
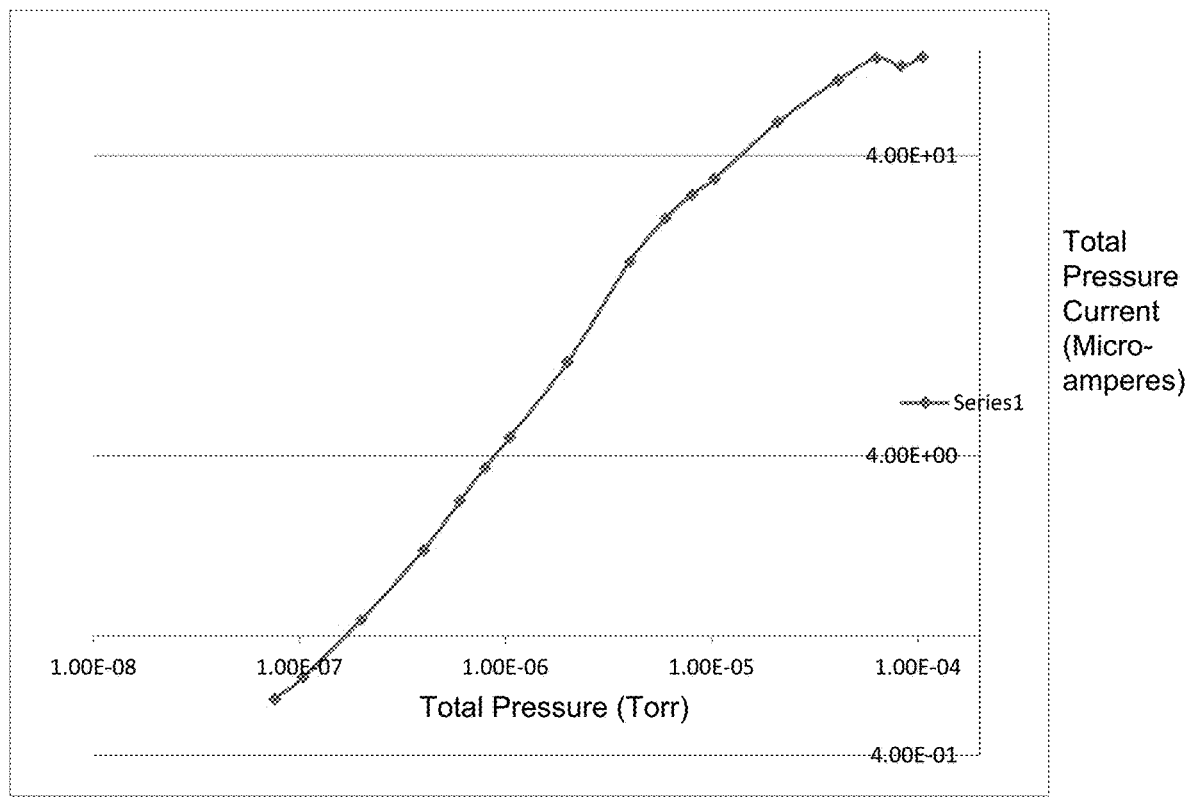

FIGS. 42 and 43 are graphs showing total pressure sensitivity of a vacuum gauge in accordance with an embodiment of the invention. Pressure in Torr is on the horizontal axis, with current in micro Amperes on the vertical axis. In FIG. 42, two curves are shown, one with a 7.6 M-Ohm limiting resistor, and one with no limiting resistor. A magnetic field of 950 Gauss was achieved using two-inch diameter magnets with 0.25 inch thickness. The anode voltage was 1400 V, and the detector bias voltage was 470 V. The total pressure sensitivity achieved was 3.5 A/Torr. A maximum current of 130 micro-Amps was used with the 7.6 M-Ohm limiting resistor. The graph shows no discontinuities in total pressure sensitivity. In FIG. 43, a magnetic field of 1450 Gauss, with two-inch diameter, 0.375 inch thick magnets was used. The anode voltage was 1400 V, and the detector bias voltage was 470 V. A maximum current of 130 micro-Amps with a 7.6 M-Ohm current limiting resistor was used. A total pressure sensitivity of 5.5 Amperes per Torr was found, although there was a discontinuity at $8\times10^{-5}$ Torr.

In experiments with an embodiment of the invention, a partial pressure current noise of $1\times10^{-10}$ Torr standard deviation has been obtained. A leak detection limit, assuming a 100 Liter per second pump, of $1\times10^{-8}$ Torr Liter/second is obtained. Experiments using 0.25 inch thick magnets have achieved no discontinuities in the pressure curve, and good magnetics compatible with standard cold cathode gauges. Experiments using 0.375 inch thick magnets provide increased partial pressure sensitivity, with one discontinuity noted above.

Figure 44:
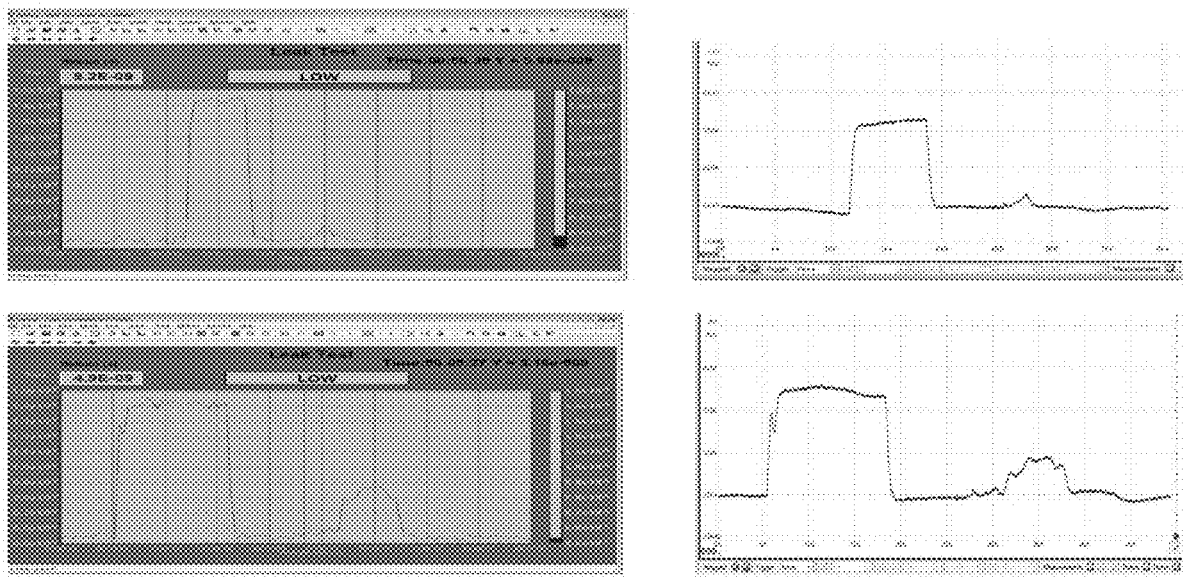
FIG. 44 is a diagram of graphs showing a comparison of leak detection using a Residual Gas Analyzer (RGA) and a vacuum gauge in accordance with an embodiment of the invention.

FIG. 44 is a diagram of graphs showing a comparison of leak detection using a Residual Gas Analyzer (RGA) and a vacuum gauge in accordance with an embodiment of the invention. The graphs in the two left panels were obtained using an RGA, whereas, the graphs in the right panels were obtained using an embodiment according to the invention, with a $1\times10^{-8}$ Torr leak. The similar shapes of the curves (of pressure in Torr on the vertical axis versus time on the horizontal axis) show than an embodiment of the invention has similar performance to an RGA. In other experiments, similar performance, with rapid and accurate detection of leaks, was obtained by an embodiment of the invention as compared with a current RGA used in production, for a leak of $1\times10^{-10}$ Torr.

Figure 49:
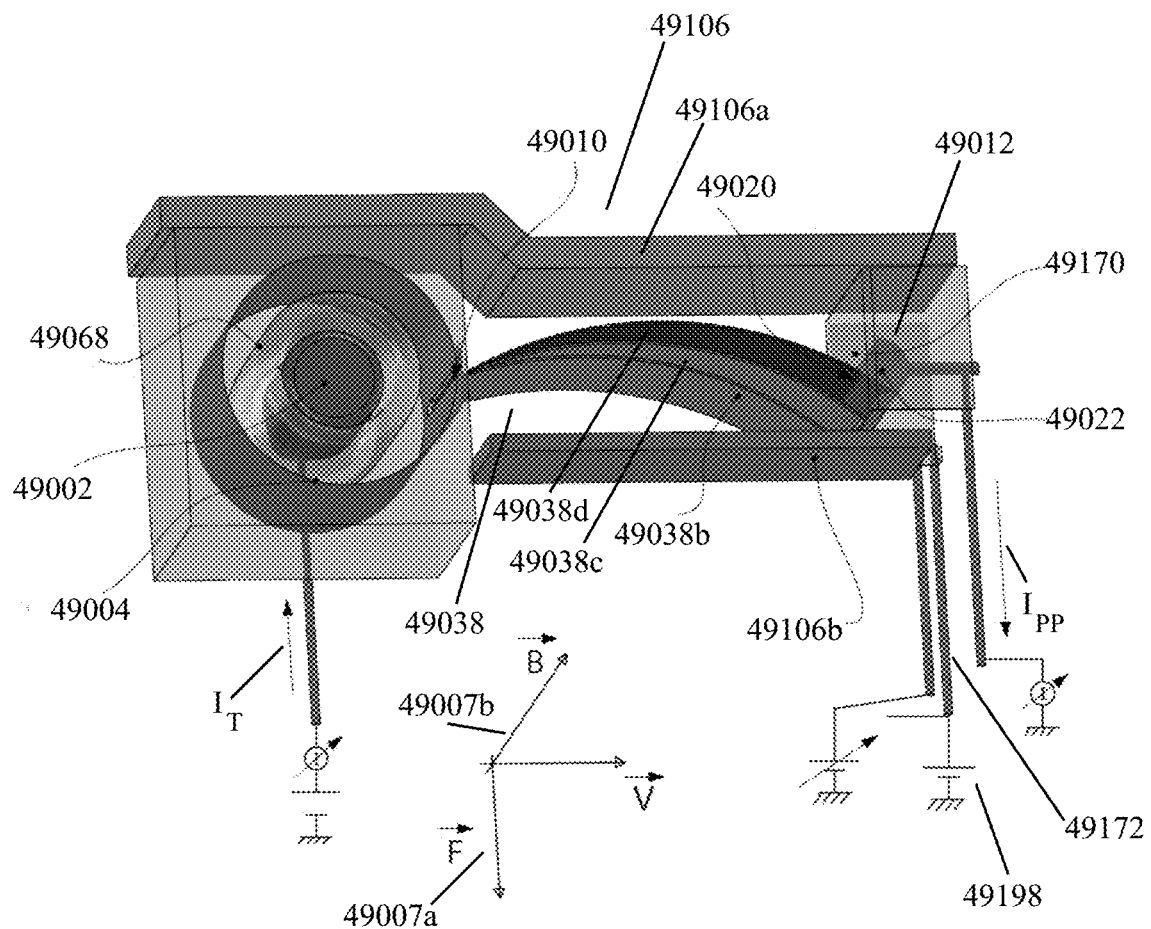
FIG. 49 is a schematic projection view diagram of a vacuum gauge that uses an ion beam deflector to deflect ion components to be detected by the detector, in accordance with an embodiment of the invention.

FIG. 49 is a schematic projection view diagram of a vacuum gauge that uses an ion beam deflector 49106 to deflect ion components to be detected by the detector, in accordance with an embodiment of the invention. The ion beam deflector 49106, such as a pair of parallel plates 49106a and 49106b, or a pair of curved plates, is positioned between the source aperture 49010 and the detector 49012. Such an ion beam deflector 49106 can be used to deflect ion components, and to perform energy focusing, as will be discussed further below.

As with previous embodiments herein, displaced ion components 49038 are separated into different ion components, which diverge increasingly from each other as they travel further from the source aperture 49010. In the inverted magnetron cold cathode discharge electrode configuration, the cathode electrode assembly 49004 surrounds the anode electrode 49002. An axial magnetic field (created using a magnet assembly, not shown in FIG. 49) is centered on the anode electrode 49002, and a radial electric field is established by applying a high voltage potential, $V_{anode}$, to the anode electrode 49002. With the cross-field arrangement of the electric field and magnetic field (indicated by direction 49007a of the electric field and 49007b of the magnetic field), a pure electron plasma 49068 is established surrounding the anode electrode 49002. Gas molecules entering the pure electron plasma 49068 are ionized by the precessing electrons and form ions that are immediately accelerated towards the cathode electrode assembly 49004 by the radial electric field. The magnetic field inside the source is high enough (for example, 1 kGauss) to make electrons precess in tight circular trajectories, but has less influence on the heavier ions, producing a slight mass dependent magnetic deflection of their trajectories as they fly towards the cathode electrode assembly 49004. The source aperture 49010, such as a vertical slit located on the cathode wall, allows a thin sliver of ion components 49038 to exit the source. Using additional magnets (not shown in FIG. 49), the magnetic field is extended to the flight region between the source aperture 49010 and the detector 49012, thereby increasing mass dependent deflection of the ions into separate ion components 49038*b-d*. Lighter ions are deflected more than heavier ions. For example, a displaced ion component 49038*b* is made of helium ions, 49038*c* is made of water ions, and 49038*d* is made of residual gases, such as nitrogen and oxygen. Such increased deflection of the ion components using additional magnets can, for example, allow the separation of water ions from the rest of the residual gas ions 49038*d*. The detector 49012 includes a metallic Faraday collector half cylinder 49022 that produces an ion current proportional to the ion flux reaching the detector 49012 through the detector aperture 49020. This ion current is the partial pressure current, $I_{PP}$, of the ion component 49038*d* that reaches the detector. Also shown in FIG. 49 is the total pressure current, $I_T$.

Figure 50:
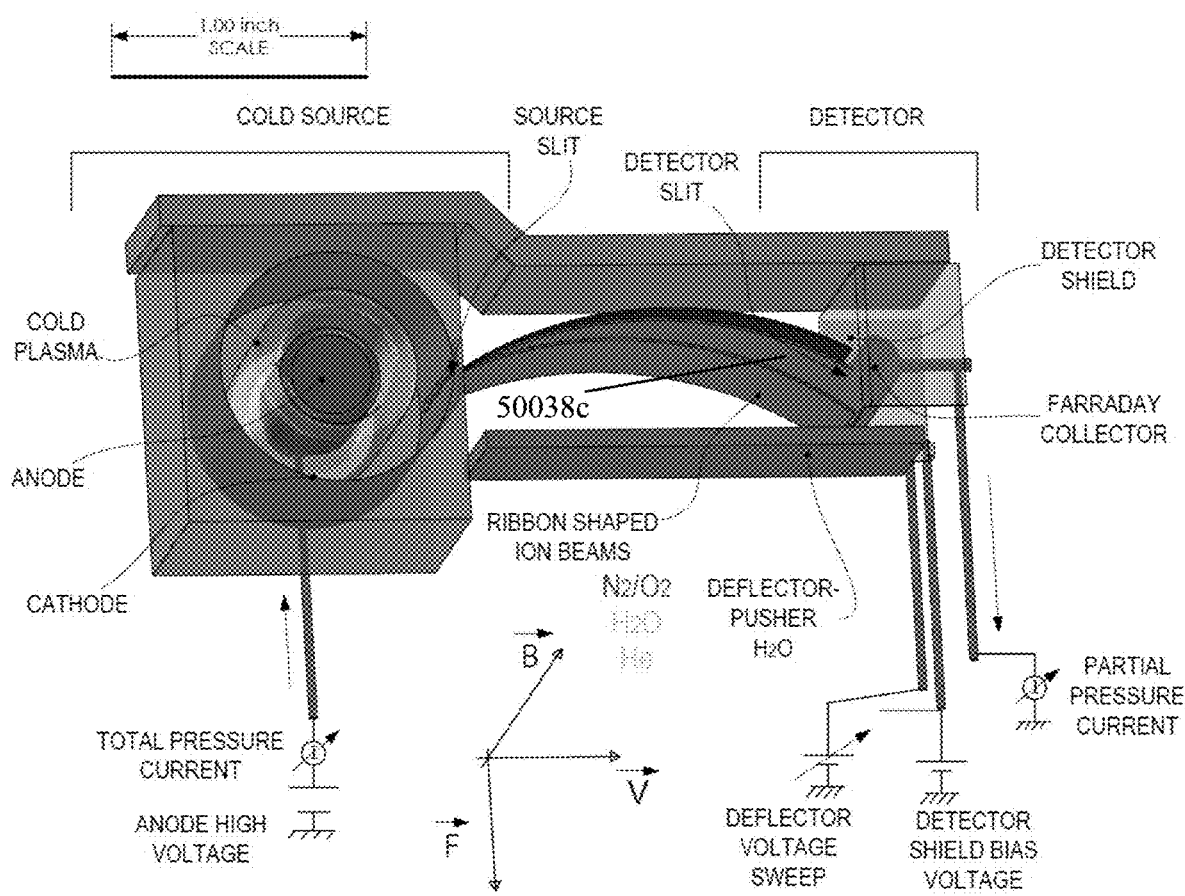
FIG. 50 is a schematic projection view diagram of the vacuum gauge of FIG. 49, deflecting a different ion component to the detector, in accordance with an embodiment of the invention.
Figure 51:
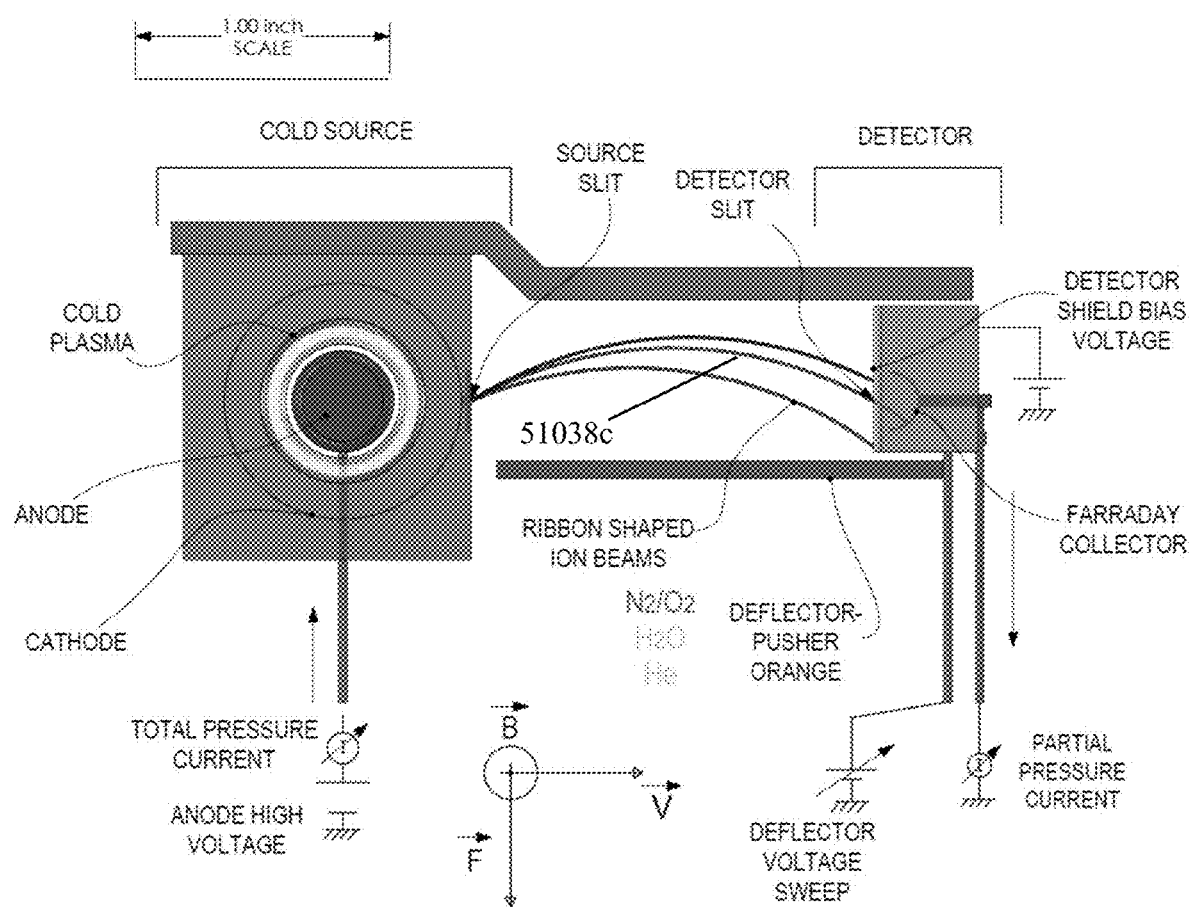
FIG. 51 is top view of the vacuum gauge of FIG. 50, in accordance with an embodiment of the invention.

In addition, in the embodiment of FIG. 49, the ion beam deflector 49106 is used to steer the ion components 49038*b*, 49038*c* and 49038*d* into the detector aperture 49020. Whereas, the magnetic field curves the trajectories of the ion components downwards (with reference to the top view of FIG. 51), the electric field between the deflector plates 49106*a* and 49106*b* electrostatically steers the ion component trajectories upward, with reference to FIG. 51, assuming a "pusher" arrangement in which deflector plate 49106*b* is positively biased relative to a grounded deflector plate 49106*a*. In FIG. 49, for example, a voltage difference between the deflector plates 49106*a* and 49106*b* is set such that the residual gas component 49038*d* is detected. With both deflector plates 49106*a* and 49106*b* at ground, all ions would miss the detector aperture 49020, based on the angle of the source aperture and the amount of deflection of the ion components from the magnetic field. But as a voltage of one of the deflector plates, here, a pusher deflector plate 49106*b*, is changed (here, increased in a positive direction) relative to the other deflector plate 49106*a*, which in this example is grounded, the ion components 49038*b*, 49038*c* and 49038*d* are steered up (or down depending on the voltage change), allowing different ion components to clear the detector aperture 49020. In FIG. 49, the pusher deflector plate 49106*b* is set to a voltage such that the residual gas ion component 49038*d* reaches the detector aperture 49020. By contrast, in FIG. 50 and FIG. 51 (top view), the voltage on the deflector plate 49106*b* is increased so that a different ion component is made available to the detector 49020, in this case, the water ion component 50038*c* (in FIG. 50) and 51038*c* (in FIG. 51). With a further increase of the voltage on the deflector plate 49106*b*, the helium ion component 49038*b* would reach the detector aperture 49020 and produce a signal. Thus, the deflector 49106 permits ion component steering, so that multiple ion component species can be brought sequentially to a detector 49012. In the example of FIGS. 49-51, the deflector plate 49106*b* is a pusher deflector plate, which is swept with a positive voltage relative to the grounded deflector plate 49106*a*. Other arrangements can be used; for example, one plate can be at a negative voltage relative to the other plate, which is grounded; or both plates can be biased at different voltages. In the example of FIGS. 49-51, for a pusher deflector plate, ion components can, for example, emerge out of the source aperture 49010 and fly towards the pusher deflector plate 49106*b*, based on the deflection caused by the magnetic field. In this example, with the deflector plates 49106*a*, 49106*b* turned off, no ion components reach the detector aperture 49020. When the pusher deflector plate 49106*b* voltage is swept with a positive voltage, ion components start to get pushed to the detector aperture 49020. Heavier ions enter the detector aperture 49020 first, while lighter ion components require higher voltages to sweep the ion components in order for the lighter ion components to reach the detector aperture 49020.

Figure 52:
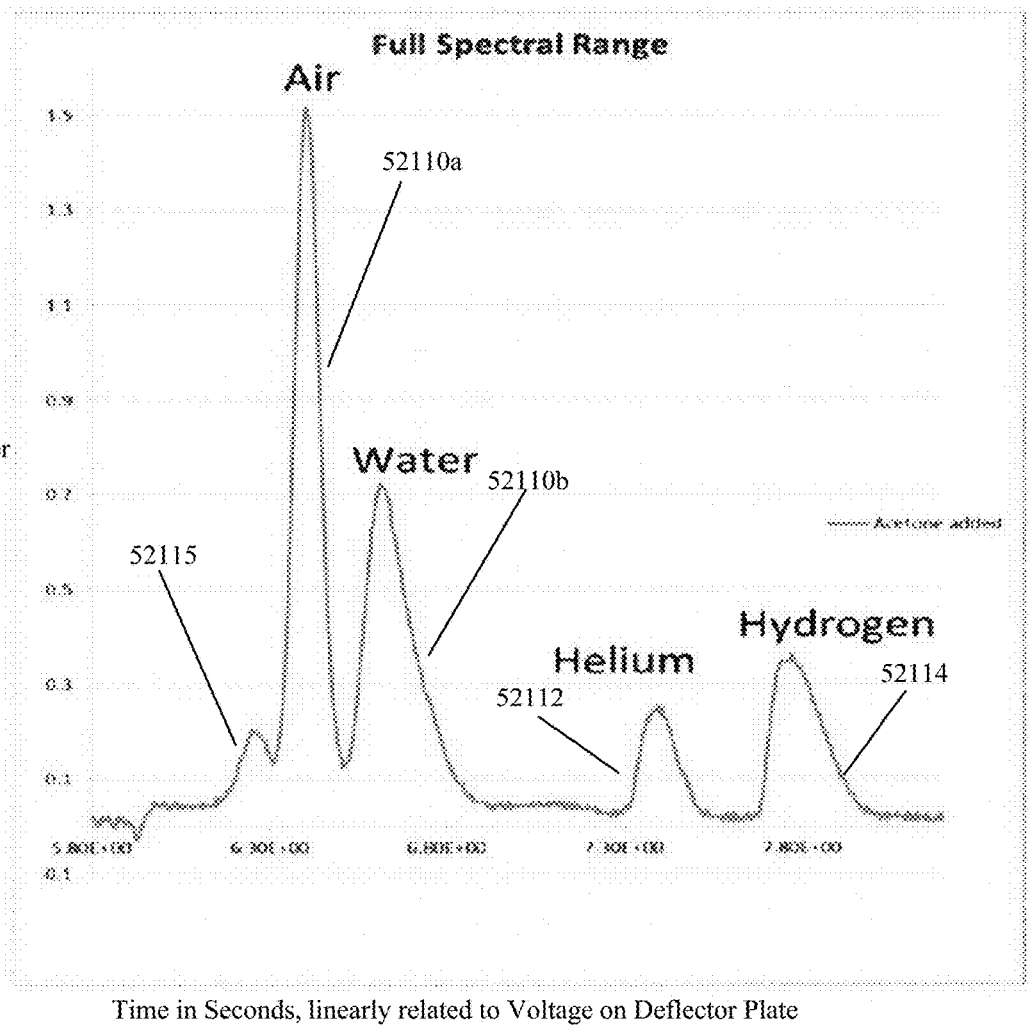
FIG. 52 is a graph of a full spectral range generated by scanning a voltage on a deflector plate in a vacuum gauge in accordance with an embodiment of the invention.

Scanning a voltage on one or both of the deflector plates, such as by scanning a voltage on a pusher deflector plate 49106*b*, and plotting the ion component signal (such as a partial pressure current) versus the voltage on the deflector plate, allows the generation of a real time mass spectrum, as shown in FIG. 52. FIG. 52 is a graph of a full spectral range generated by scanning a voltage on a deflector plate in a vacuum gauge in accordance with an embodiment of the invention. A detected partial pressure current in volts, provided by a pico-ammeter current to voltage converter, is shown on the vertical axis, and time in seconds, which is linearly related to the voltage on the deflector plate (because the deflector voltage is swept with a sawtooth waveform), is shown on the horizontal axis. In this example, acetone was added to a monitored chamber and analyzed using the vacuum gauge. Separate ion component peaks of air 52110*a*, water 52110*b*, helium 52112, hydrogen 52114 and acetone 52115 were generated in the real time mass spectrum.

Returning to FIG. 49, a detector shield electrical connector 49172 is in electrical connection between a detector shield 49170 and a voltage source 49198 applying a detector shield bias voltage to the detector shield 49170, so that the detector shield 49170 thereby is a high pass ion energy filter. Using the high pass ion energy filter, only ions with energies above the detector shield bias voltage can cross the plane of the detector aperture 49020, and the rest get turned around. Increasing the detector shield bias voltage narrows the energy distribution or spread of ions that can reach the detector 49012 during a deflector voltage sweep, resulting in narrower mass peaks as the voltage increases.

Figure 53:
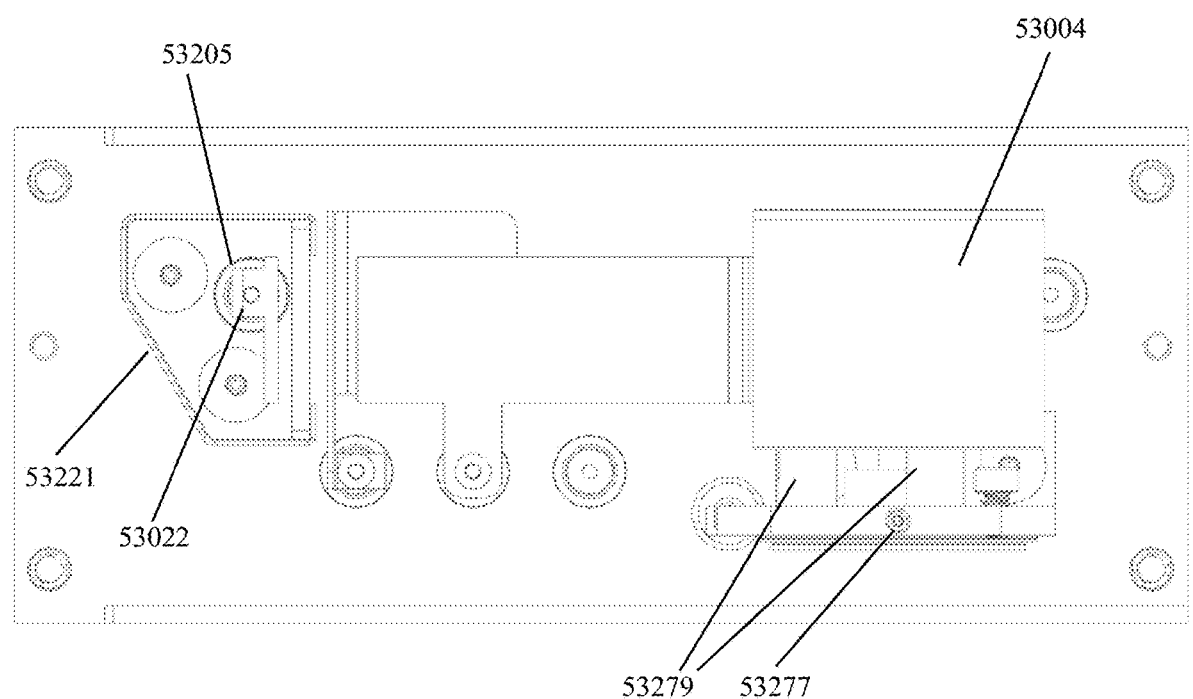
FIG. 53 is a side view of a vacuum gauge using a deflector, in accordance with an embodiment of the invention.
Figure 54:
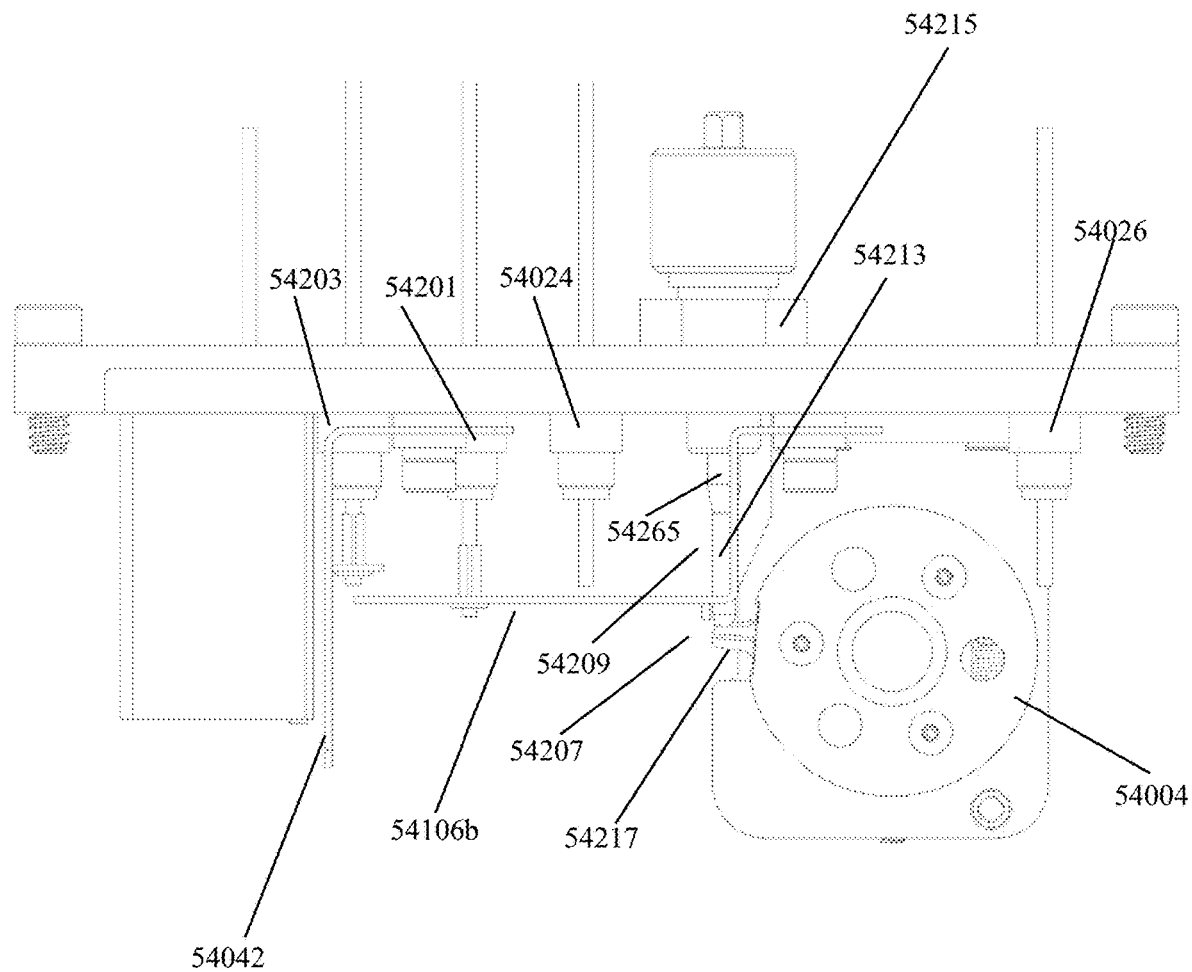
FIG. 54 is a top view of a vacuum gauge using a deflector, in accordance with an embodiment of the invention.
Figure 55:
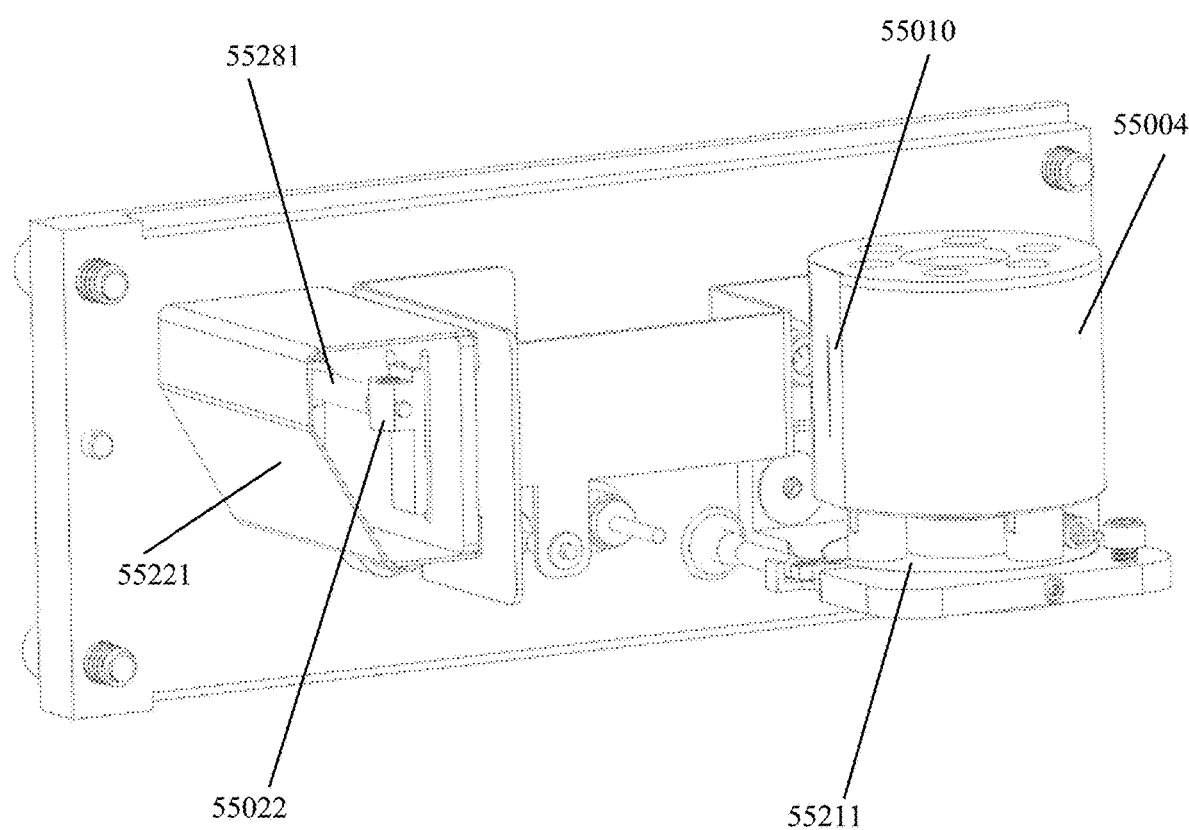
FIG. 55 is a projection view of a vacuum gauge using a deflector, in accordance with an embodiment of the invention.
Figure 56:
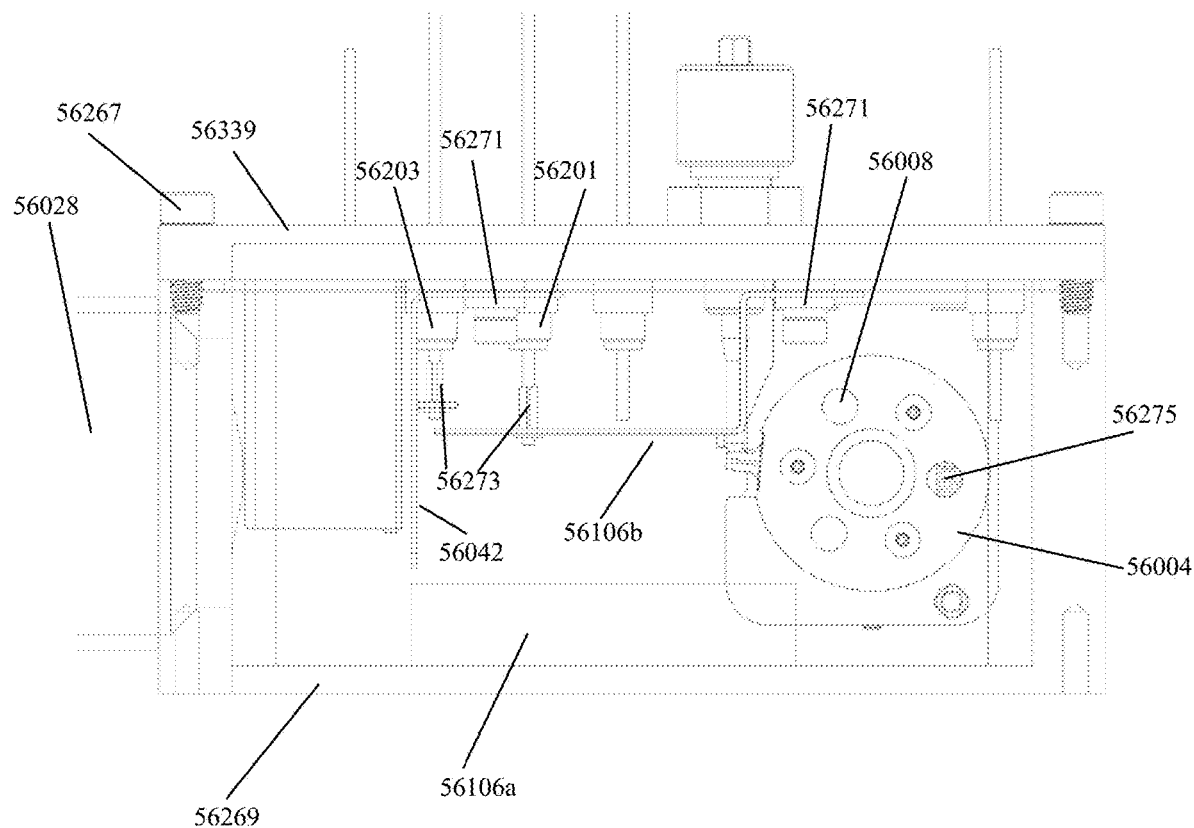
FIG. 56 is a top view of a vacuum gauge using a deflector, in accordance with an embodiment of the invention.
Figure 57:
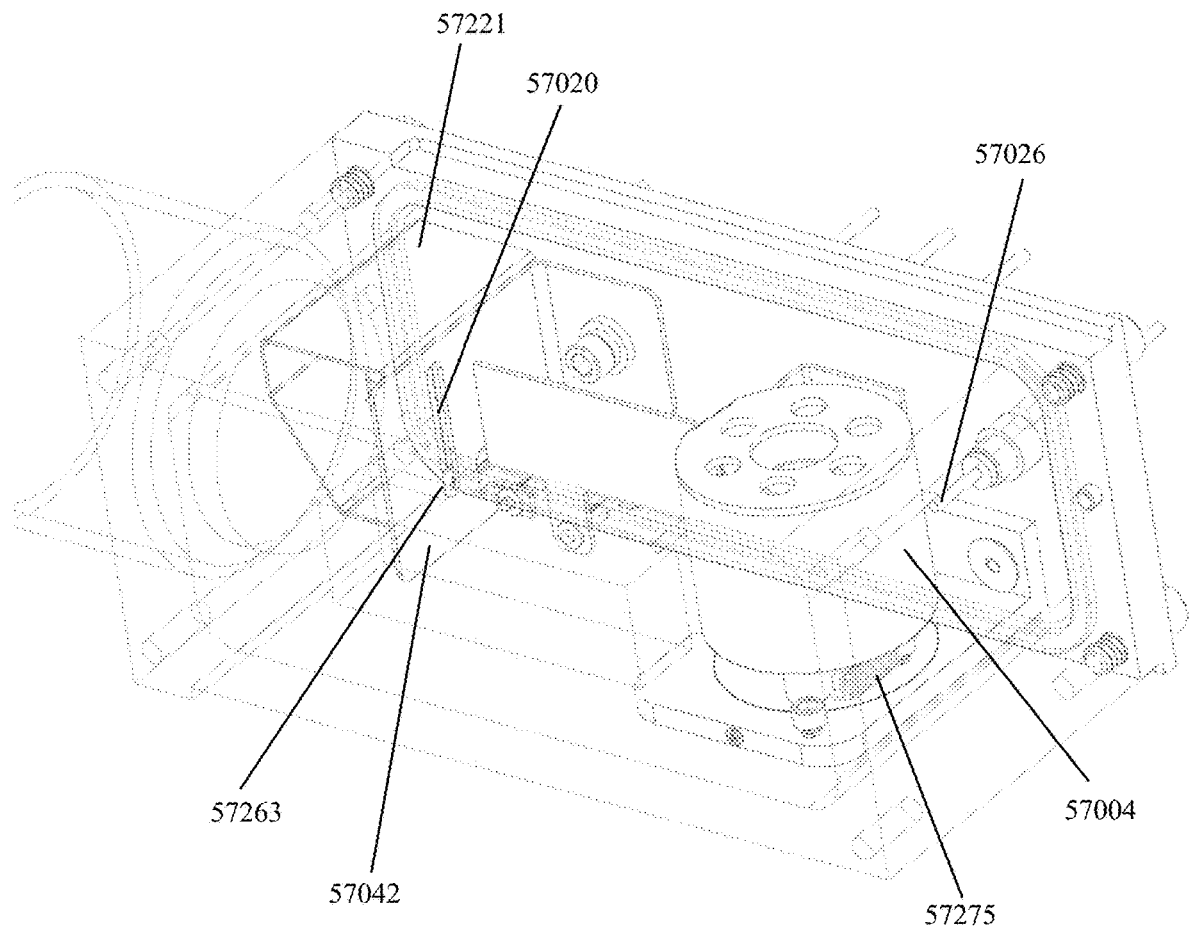
FIG. 57 is a projection view of a vacuum gauge using a deflector, in accordance with an embodiment of the invention.
Figure 58:
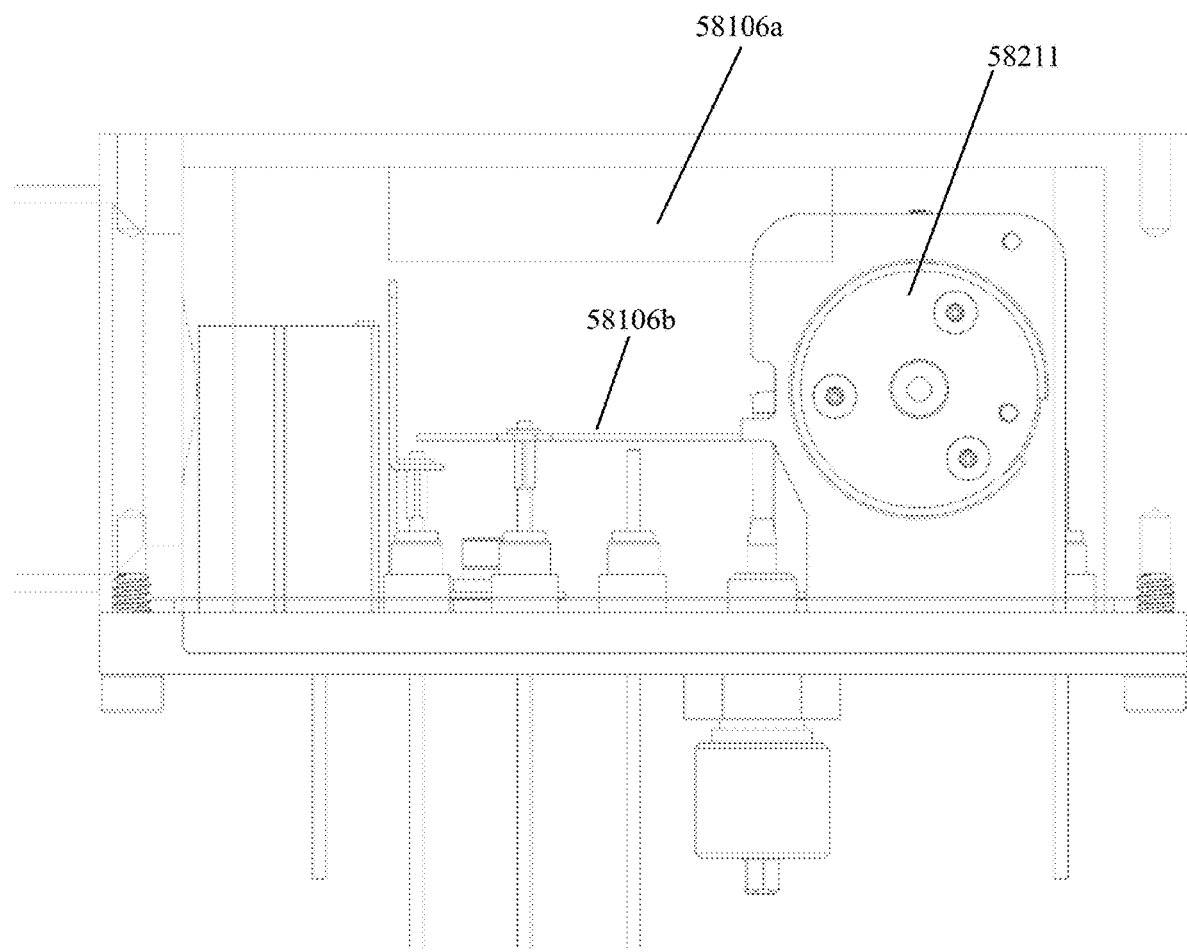
FIG. 58 is a top view of a vacuum gauge using a deflector, in accordance with an embodiment of the invention.

There are now discussed components of a vacuum gauge using a deflector, in accordance with an embodiment of the invention, with reference to the side view of FIG. 53, the top views of FIGS. 54, 56 and 58, and the projection views of FIGS. 55 and 57. Vacuum feedthroughs 54024, 54026, 54201, 54023 (see FIG. 54) and 53205 (see FIG. 53) provide both electrical connections and structural support for the electrode assembly of the vacuum gauge. The vacuum feedthroughs can be made using standard vacuum components, for example, those sold by MDC Vacuum Products, LLC of Hayward, Calif., U.S.A. The vacuum feedthroughs include an anode feedthrough 54024, a cathode feedthrough 54026, a deflector plate feedthrough 54201, a detector filter feedthrough 54203, and a detector current feedthrough 53205 (see FIG. 53). While one deflector plate 54106*b* is biased by electrical connection via the deflector plate feedthrough 54201, the other deflector plate 58106*a* (see FIG. 58) is grounded. Here, it is noted that the deflector plate 58106*a* (or the other deflector plate 58106*b* of FIG. 58) need not have the geometry of a thin plate as shown at 58106*b*, but can instead have the geometry of a block, as at 58106*a*. The deflector plates or blocks 58106*a* and 58106*b* should be made of a material (for example, stainless steel) that does not easily become coated with dielectric coatings, which could cause erratic drift; for example, aluminum could be unsuitable if oxide passivation layers cause erratic drift. The detector filter feedthrough 54203 (see FIG. 54) connects to the detector high energy filter 54042, which is here implemented as a filter plate. The vacuum gauge also includes a grounded detector shield 53221 (see FIG. 53) that surrounds at least part of the Faraday collector 53022. The grounded detector shield 57221 (see FIG. 57) includes the detector aperture 57020, which the ion components reach through an aperture 57263 in the detector high energy filter 57042. In alternative arrangements, it will be appreciated that the detector aperture 57020 can be either in a detector behind the detector high energy filter 57042, or can itself be the aperture 57263 in the detector high energy filter 57042. An energy filter grid (not shown) can surround or cover the detector aperture 57020. In addition, the vacuum gauge can include a cathode rotation coupling 54207 (FIG. 54), which can be coupled to an electronically controlled actuator 54209, or to a manually controlled actuator. The actuator 54209 is configured to rotate the cathode electrode assembly 54004 using the cathode rotation coupling 54207, which gives the ability to adjust the rotational angle of the source aperture 55010 (see FIG. 55). The cathode rotation coupling 54207 (FIG. 54) can, for example, include a rotational table 55211 (see FIG. 55) (also shown as 58211 in FIG. 58), on which the cathode electrode assembly 55004 is mounted. The actuator 54209 (see FIG. 54) includes a rod 54213, which turns the rotational table 55211 (FIG. 55) to adjust the rotational angle of the source aperture 55010 (FIG. 55). The rod 54213 (see FIG. 54) rotates within an O-ring seal 54215 that preserves vacuum as the cathode rotation is adjusted. In FIG. 54, the rod 54213 is shown going through the O-ring seal 54215, and pushing a flange 54217 that actuates the rotational table 55211 (FIG. 55). As a threaded end 54265 of the rod 54213 is rotated, the result is a linear translation of the end of the rod 54213 which pushes the flange 54217 to cause rotation of the rotational table 55211 (FIG. 55). The rotational table 55211 is under spring tension from spring 56275 (FIG. 56) to return when the rod 54213 is retracted.

With reference to FIG. 56, a gas inlet passage 56028 is shown, by which gas from a monitored chamber is inlet into the vacuum gauge. A surface of the grounded detector shield 55221 (see FIG. 55) can be tilted or otherwise shaped to provide a more open gas conductance path to the incoming gas coming through gas inlet passage 56028 (FIG. 56). Also shown in FIG. 56 are plate fastenings 56267, and the envelope 56269 of the gauge, to which the grounded deflector plate 56106a can be attached, for example as part of the envelope 56269. A mounting plate 56339 can be used to mount most of the components of the vacuum gauge other than the deflector plate 56106a, including the anode electrode, cathode electrode assembly, vacuum feedthroughs, and detector components. The mounting plate 56339 can, for example, be sealed with rubber O-rings, a metal gasket for Ultrahigh Vacuum, or even welded in place. Having the components mounted on the mounting plate 56339 provides the ability to fix problems during testing and manufacturing, and provides users the ability to maintain the vacuum gauge in the field. The mounting plate 56339 and envelope 56269 can, for example, be made of stainless steel, with the lowest possible magnetic permeability. Electrical insulators 56271 are shown, which provide electrical insulation of the pusher deflector plate 56106b and the detector high energy filter 56042. Spot welded push-on connectors 56273 are shown on the ends of the deflector plate feedthrough 56201 and the detector filter feedthrough 56203. The push-on connectors 56273 provide alignment of the plates, in addition to electrical connection. Openings 56008 in the top of the cathode electrode assembly 56004 let the gas into the interior of the cathode electrode assembly 56004. A spring 56275 is attached to the cathode rotation table 55211 (FIG. 55), as shown further in FIG. 57 (see spring 57275). The spring 56275 provides a force pulling on the cathode rotation table 55211, in opposition to the pushing force of the actuator 54209 (FIG. 54). With reference to FIG. 53, a set screw 53277 permits locking of the rotation table to fix the rotational angle. The cathode rotation table can also be spot welded to fix its position. Insulation posts 53279 provide electrical insulation of the cathode electrode assembly 53004, and can be used when the anode to cathode current is measured at the cathode electrode assembly. Alternatively, insulation posts 53279 can be omitted, for example when the anode to cathode current is measured at the anode electrode.

With reference to FIG. 55, an insulator sleeve 55281 provides mechanical support to the Faraday collector 55022. In fashioning the insulator sleeve 55281 and Faraday collector 55022, it is desirable to eliminate vibration of the Faraday collector 55022 by providing sufficient mechanical support to the collector, and by making the collector be of a light weight. This reduces the occurrence of high frequency AC current components in the currents measured by the collector. The source aperture 55010 can, for example, have dimensions of about 0.005 inches width by 0.350 inches height. The width of the source 55010 affects the ultimate mass resolution of the vacuum gauge. The source aperture 55010 can, for example, be manufactured on 0.0005 inch thick sheet metal by chemical etching.

With reference to FIG. 57, an electrical connection (such as a wire, not shown) can extend from the end of the cathode feedthrough 57026 to the cathode electrode assembly 57004 to complete the electrical connection to the cathode electrode assembly 57004. The wire can be coiled to accommodate rotation of the cathode electrode assembly 57004.

Figure 59:
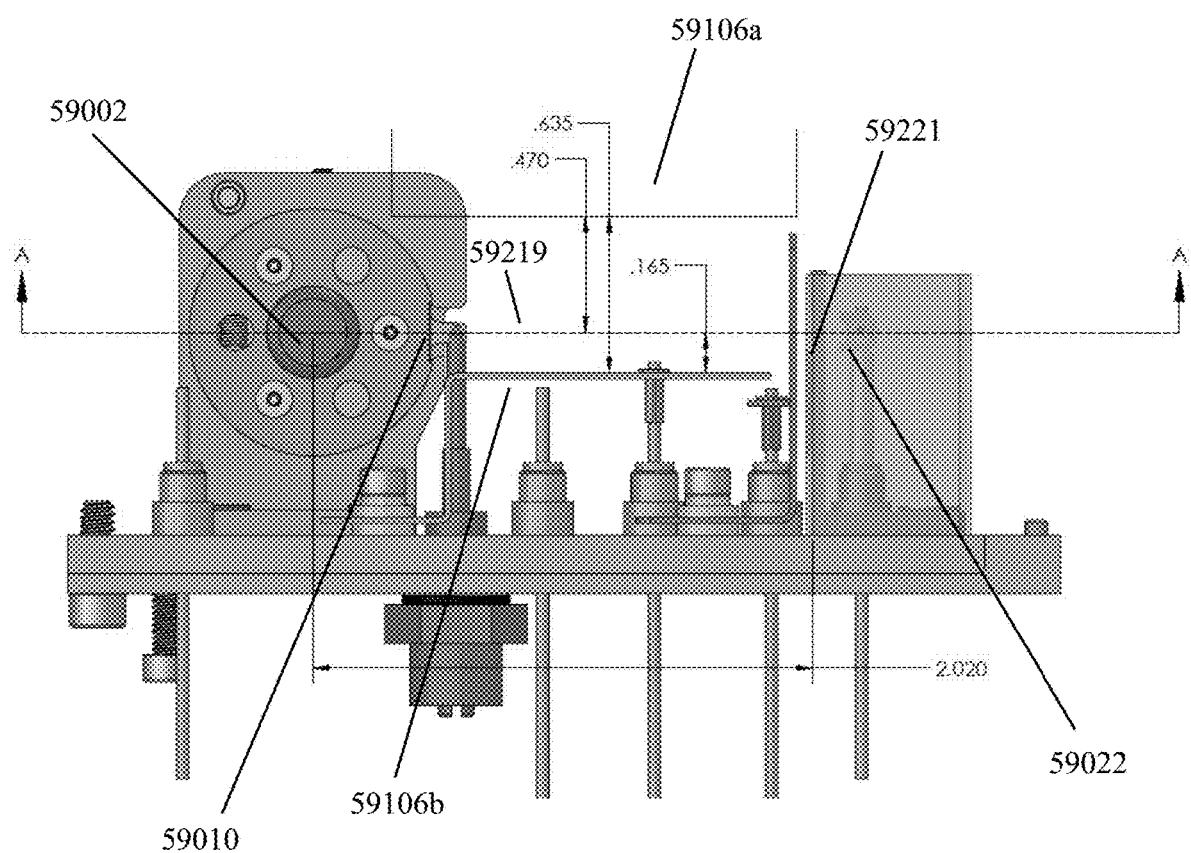
FIG. 59 is a schematic diagram of components of a vacuum gauge.
Figure 60:
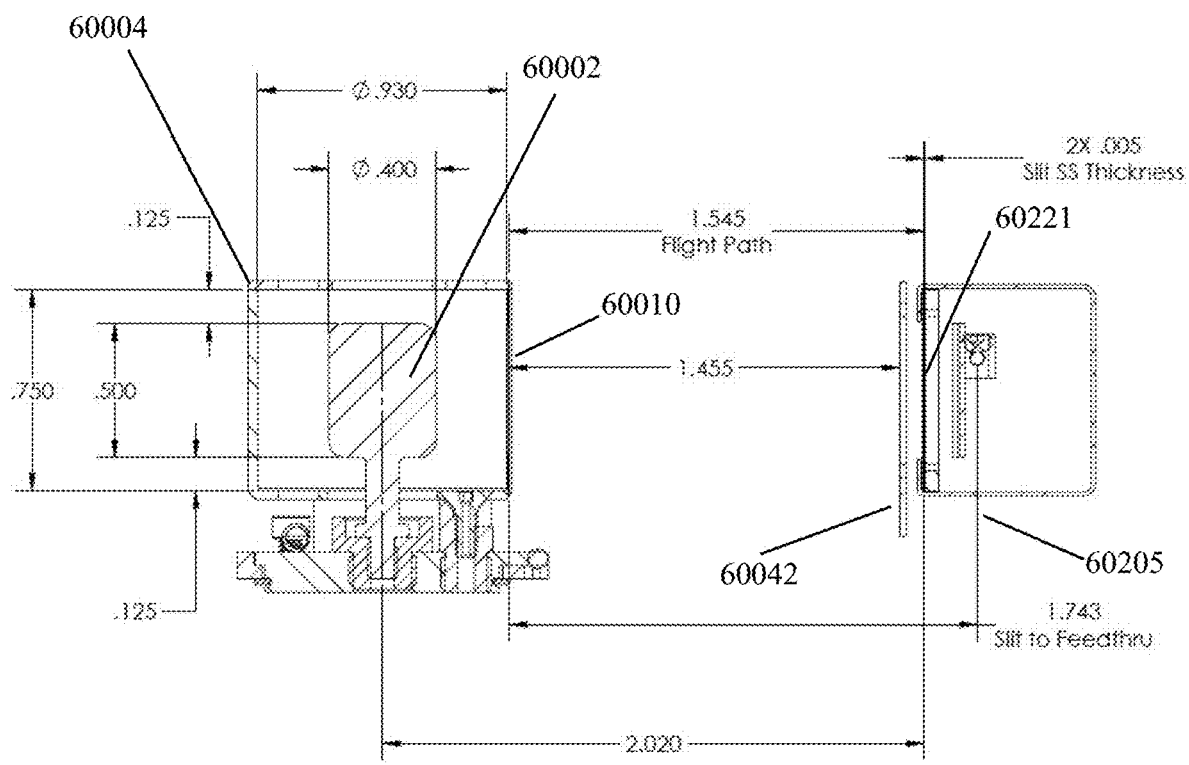
FIG. 60 is a cross-sectional view, showing example dimensions, in accordance with an embodiment of the invention.

FIG. 59 is a schematic diagram of components of a vacuum gauge, and FIG. 60 is a cross-sectional view, showing some example dimensions, in accordance with an embodiment of the invention. FIG. 60 is a cross-sectional view of the vacuum gauge of FIG. 59, along the line A-A of FIG. 59. With reference to FIG. 59, some examples of dimensions are as follows: a length between the anode electrode 59002 and the grounded detector shield 59221 is about 2.020 inches; a distance between the deflector plates 59106a and 59106b is about 0.635 inches; a distance between a grounded deflector plate 59106a and a central axis 59219 extending from the source aperture 59010 to the Faraday collector 59022 is about 0.470 inches; and a distance between the central axis 59219 and the pusher deflector plate 59106b is about 0.165 inches. With reference to FIG. 60, some example dimensions are as follows: a height of the cathode electrode assembly 60004 is about 0.750 inches; a height of the anode electrode 60002 is about 0.500 inches; a clearance height between each of the top and bottom of the anode electrode 60002 and the cathode electrode assembly 60004 is about 0.125 inches; an inside diameter of the cathode electrode assembly 60004 is about 0.930 inches; an outside diameter of the anode electrode 60002 is about 0.400 inches; a length between the anode electrode 60002 and the grounded detector shield 60221 is about 2.020 inches; a length of a flight path between the source aperture 60010 and the grounded detector shield 60221 is about 1.545 inches; a length between the source aperture 60010 and a high energy filter 60042 is about 1.455 inches; a thickness of the detector aperture is about 0.005 inches; and a distance from the source aperture 60010 to the detector current feedthrough 60205 is about 1.743 inches. Some further example dimensions are: a detector aperture 57020 (see FIG. 53) can be about 0.010 inches in width and 0.400 inches in height; and a source aperture 60010 can be about 0.005 inches in width and 0.350 inches in height. It will be appreciated that the foregoing are example dimensions, and that other dimensions can be used.

There are next discussed arrangements for a magnetic field extension assembly, in accordance with embodiments of the invention. As discussed above with reference to FIG.

46, a magnetic field extension assembly, such as one or more magnets 46194, can be used, in addition to the magnet assembly over the cathode electrode assembly, to extend the magnetic field in a direction 46196 extending longitudinally from the source aperture 46020 towards the detector 46010. The magnetic field extension assembly 46194 can be positioned to increase a magnetic field between the magnet assembly and the detector 46010. This can, for example, permit separation of water from the rest of the residual gases in the vacuum system. Without the magnetic field extension assembly 46194, with only fringing magnetic fields from the source extending into the ion component flight path, the vacuum gauge may only be able to separate light gases, such as helium and hydrogen, from the rest of the residual gases in the system. With the magnetic field extension assembly 46194, in one example, the magnetic field can be about 1000 Gauss in the region of the source (the anode electrode and cathode electrode assembly) and about 1300 Gauss closer to the detector 46010.

Figure 61:
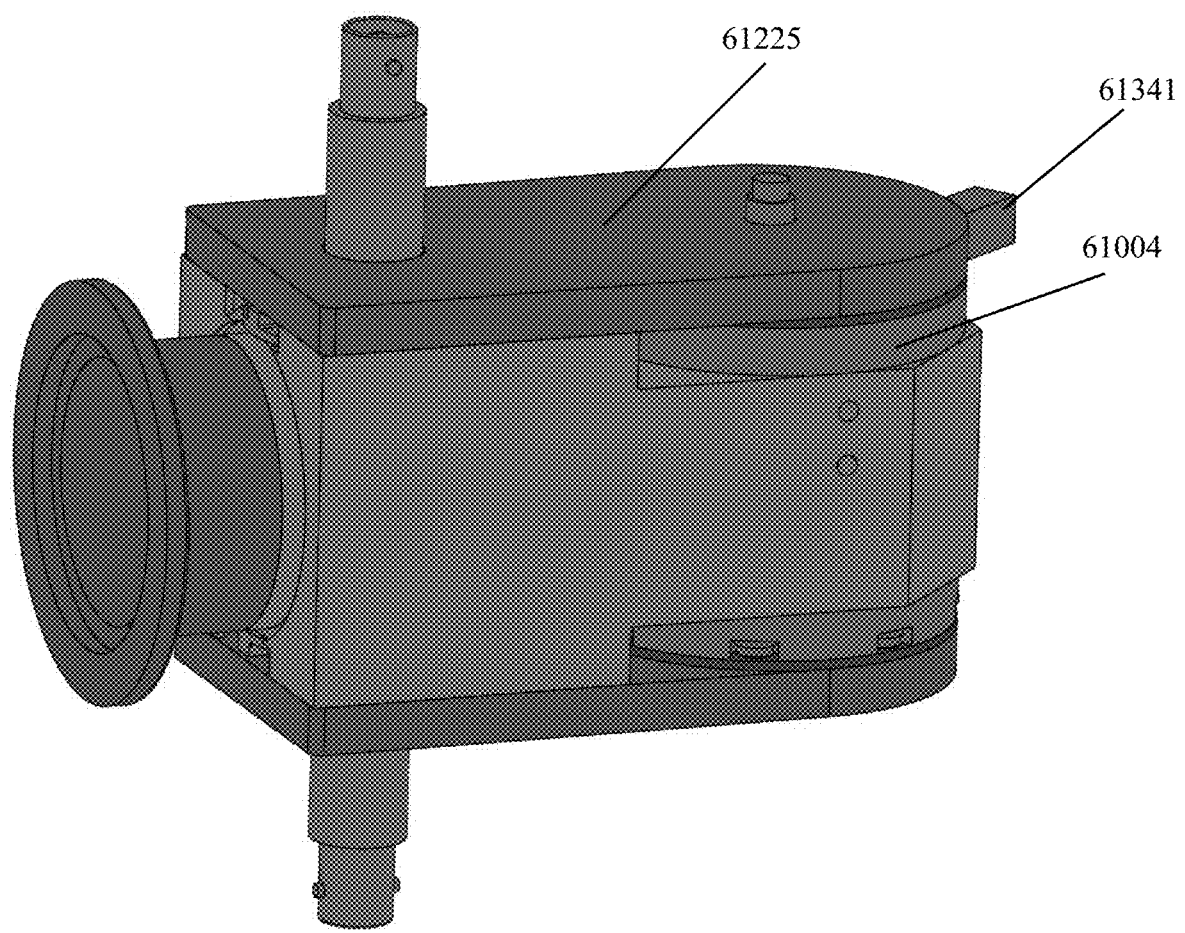
FIG. 61 is a projection of a vacuum gauge including a monolithic magnet that extends over the cathode electrode assembly and extends in a direction extending longitudinally from the source aperture towards the detector, in accordance with an embodiment of the invention.
Figure 62:
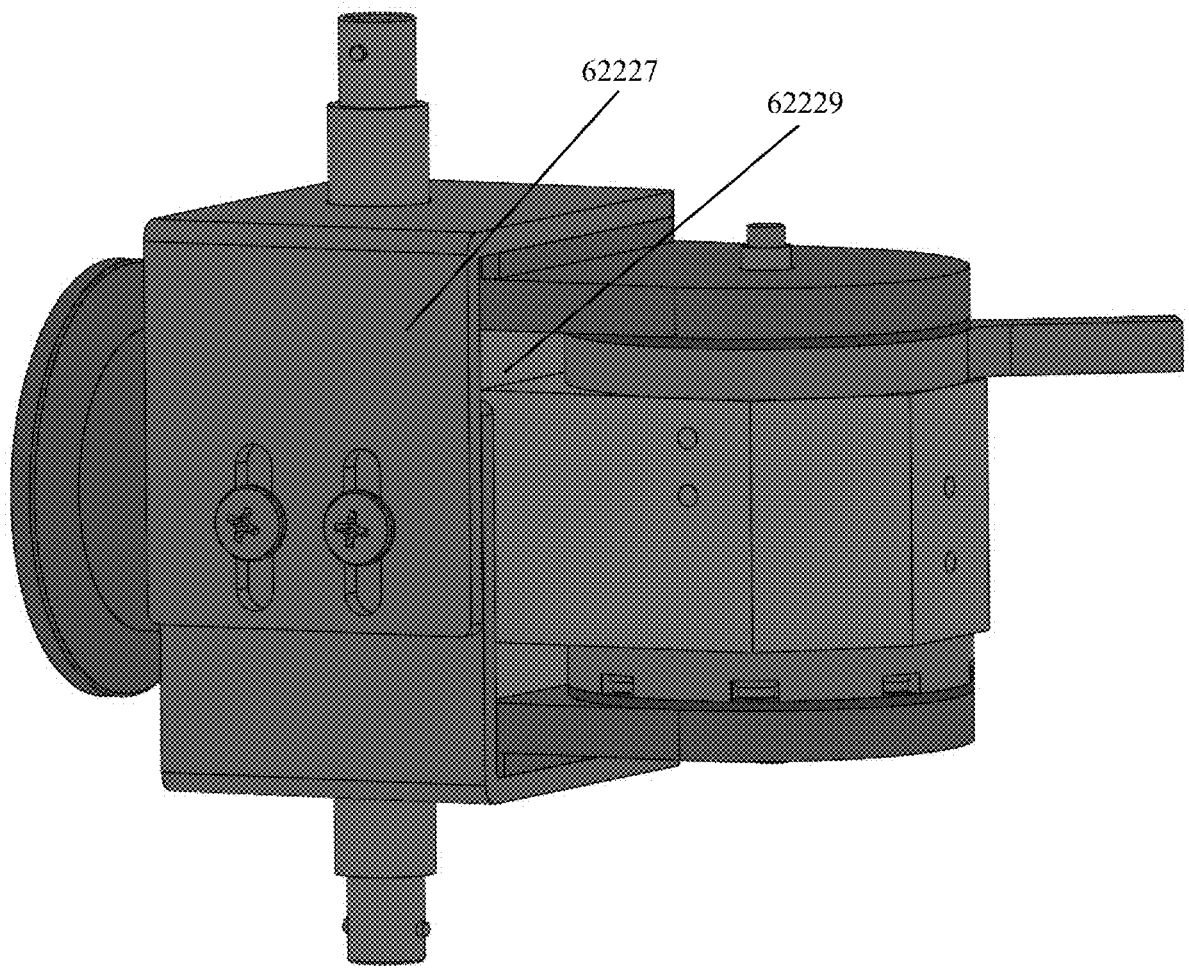
FIG. 62 is a schematic diagram illustrating use of a magnetic yoke with a vacuum gauge in accordance with an embodiment of the invention.

In another embodiment, shown in FIG. 61, the magnet assembly can include a monolithic magnet 61225 that extends over the cathode electrode assembly 61004 and extends in a direction extending longitudinally from the source aperture towards the detector (see direction 46196 of FIG. 46). The magnetic field of the monolithic magnet 61225 can, for example, be 1 kGauss throughout, and can provide enough separation of the ion components to see water separate from other residual gases. Further magnetic strength in the flight path, for additional mass separation, can be obtained with the addition of another magnet in the flight path, as in FIG. 46, or a magnetic yoke, as shown in FIG. 62, or both. In FIG. 61, there is also shown a cathode handle 61341, which can be actuated (for example, using a micrometer) to rotate the cathode electrode assembly 61004.

FIG. 62 is a schematic diagram illustrating use of a magnetic yoke 62227 with a vacuum gauge in accordance with an embodiment of the invention. The magnetic yoke 62227 surrounds at least part of an outside of a passage 62229 that extends between the source aperture and the detector. The magnetic yoke 62227 can increase the number of flux lines that run throughout the flight path of the ion components, thereby increasing the magnetic strength at the flight path, which assists with mass separation. In addition, the magnetic yoke 62227 can decrease the external field around the vacuum gauge, which can be useful in not interfering with a user's other equipment or processes.

Figure 63:
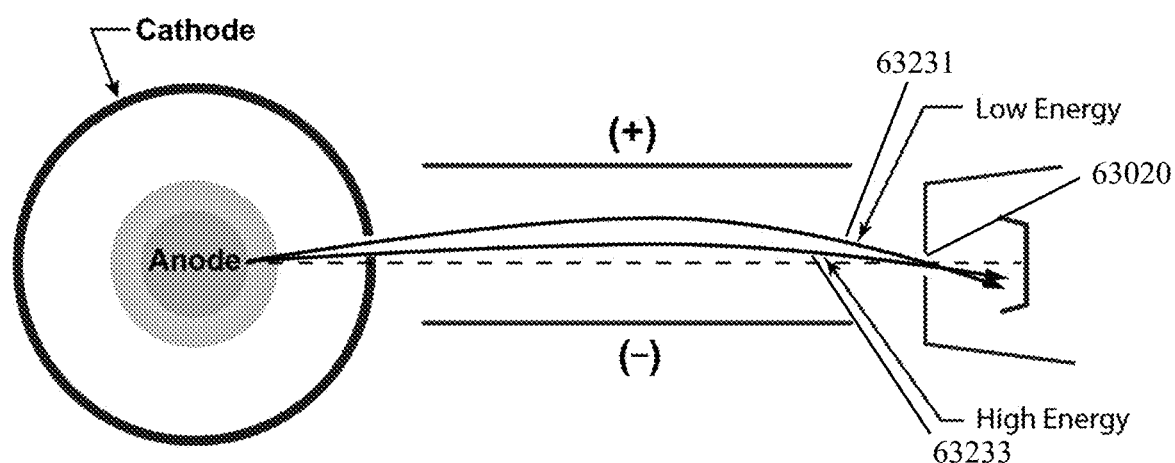
FIG. 63 is a schematic diagram illustrating energy focusing of ion components using a deflector in a vacuum gauge in accordance with an embodiment of the invention.

FIG. 63 is a schematic diagram illustrating energy focusing capabilities of ion components using an electrostatic deflector in a vacuum gauge in accordance with an embodiment of the invention. In energy focusing, ion components having different energies and a common ion component mass are focused through a detector aperture 63020 of the detector. For example, low energy ions 63231 and high energy ions 63233 of a common ion component, such as low energy water ions and high energy water ions, can be focused through the detector aperture 63020. In another example, low energy residual gas ions and high energy residual gas ions can be focused through the detector aperture 63020. In order to perform such energy focusing, a deflector control circuit (see 65241 in FIG. 65) is configured to control the voltage of the deflector power supply (see 64235 in FIG. 64) to cause the ion beam deflector to direct the ion components 63231 and 63233 having different energies and a common ion component mass to be focused through the detector aperture 63020. The vacuum gauge can include a cathode rotation coupling (see 54207 in FIG. 54), and an actuator 54209 configured to rotate the cathode electrode assembly so that the ion components of different energies are directed to the detector aperture 63020 at the voltage of the deflector power supply (64235 in FIG. 64) that causes the ion components of different energies to be focused through the detector aperture 63020. Rotating the source aperture using the cathode rotation coupling 54207 permits turning of mass spectra to include energy focusing for the residual gas peaks, for example at between 25 amu and 35 amu. In one technique of energy focusing, the source aperture is rotated using the cathode rotation coupling 54207, while looking at the residual gas signal, for example in a mass spectrum as in FIG. 52. When the right rotation is reached, the residual gas peak gets narrower and taller, which should occur when there is energy focusing. For each ion component mass, there is a specific voltage of the deflector power supply that provides energy focusing. The cathode rotation coupling 54207 can be used to rotate the cathode electrode assembly such that the ion beam of the ion component of interest reaches the detector aperture at the voltage of the deflector power supply at which the ion component of interest is also being energy focused. In one example, the cathode rotation coupling 54207 may be used during manufacturing of the vacuum gauge, and then set at a desired rotation, for example a rotation that provides energy focusing for one or more of water and residual gases.

Figure 64:
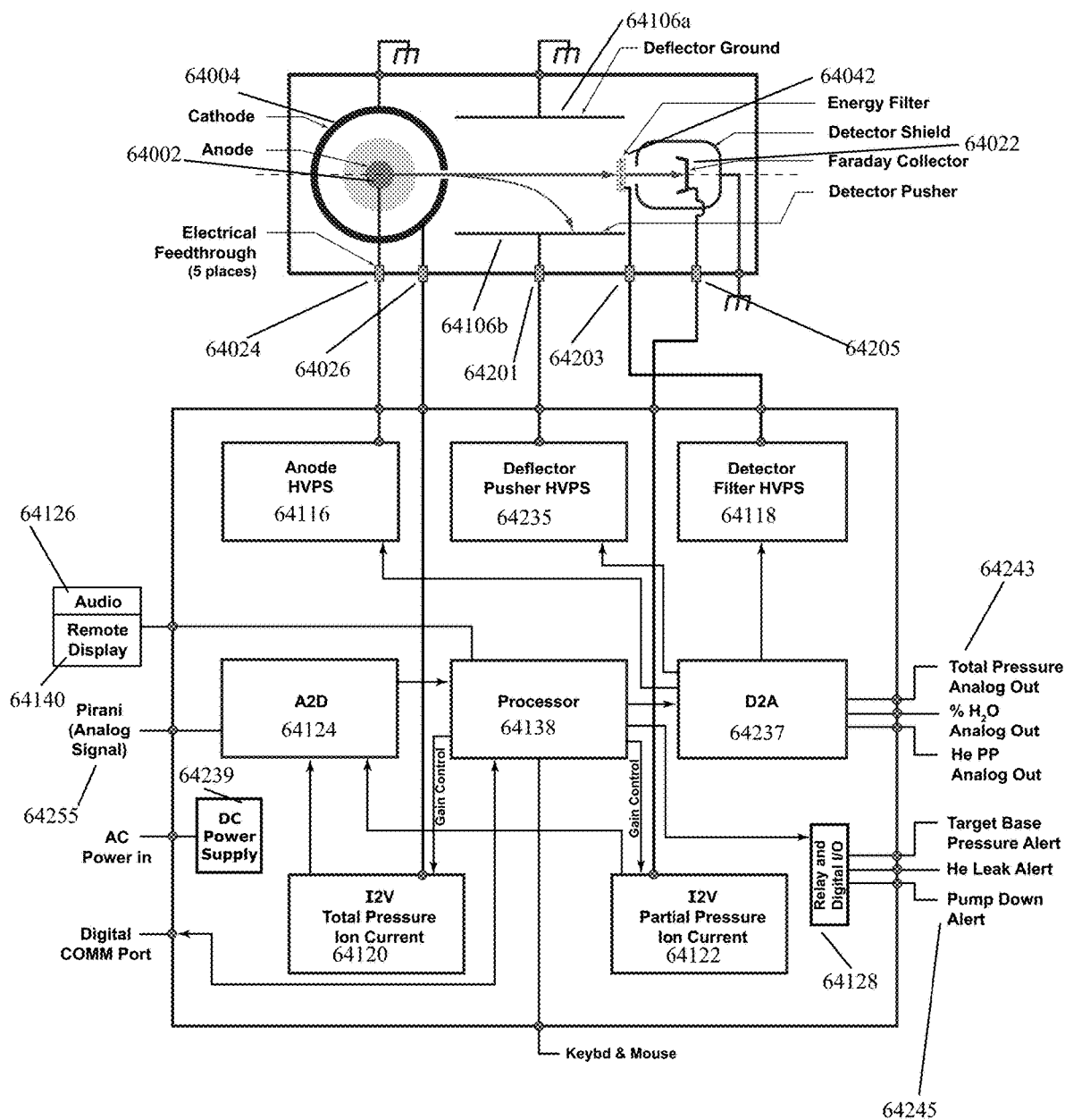
FIG. 64 is a schematic diagram of an electrical control circuit, in accordance with an embodiment of the invention.

FIG. 64 is a schematic diagram of an electrical control circuit, in accordance with an embodiment of the invention. The electrical control circuit includes an anode high voltage power supply 64116, a deflector power supply 64235 (such as a deflector pusher high voltage power supply), a detector high energy filter power supply 64118, an analog to digital converter 64124, a processor 64138, a digital to analog converter 64237, a DC power supply 64239, a current to voltage converter for total pressure ion current 64120, a current to voltage converter for partial pressure ion current 64122, and a relay and digital input/output unit 64128. The anode high voltage power supply 64116 is connected to the anode electrode 64002 via the anode feedthrough 64024. The current to voltage converter for total pressure ion current 64120 is connected to the cathode electrode assembly 64004 via the cathode feedthrough 64026. The deflector power supply 64235 is connected to a deflector plate 64106*b* (here, the pusher deflector plate) via the deflector plate feedthrough 64201. The detector high energy filter power supply 64118 is connected to the detector high energy filter 64042 via the detector filter feedthrough 64203. The current to voltage converter for partial pressure ion current 64122 is connected to the Faraday collector 64022 via the detector current feedthrough 64205. While one deflector plate 64106*b* is biased by electrical connection to the deflector power supply 64235 via the deflector plate feedthrough 64201, the other deflector plate 64106*a* is grounded. The processor 64138 includes a deflector control circuit 65241 (see FIG. 65), which controls operation of the deflector power supply 64235 via digital deflector control signals that it supplies to the digital to analog converter 64237, and which the digital to analog converter 64237 in turn uses to provide analog control to the deflector power supply 64235. The processor 64138 also provides digital signal processing of signals received from the other components to provide digital signals to the digital to analog converter 64237, which are used to provide analog outputs 64243, which can, for example, include a total pressure analog output, a percent water analog output, and a helium (or other component) partial pressure analog output. The processor 64138 also performs digital signal processing of signals received from the other components to provide the digital input/output unit

64128 digital alerts 64245, such as a target base pressure alert, a helium leak alert, and a pumpdown alert. A remote display 64140 and an audio output 64126 are provided, in connection with the processor 64138. The analog to digital converter 64124 can also be connected to receive an analog signal 64255 from a high pressure gauge, such as a Pirani or Pirani Piezo gauge, as described for the combination gauge of FIG. 69.

The deflector power supply 64235 is electrically connected to create an electrostatic field between the deflector plates 64106*a* and 64106*b* of the ion beam deflector. Although a pusher deflector plate 64106*b* is shown in FIG. 64, it will be appreciated that the following arrangements can be used: (i) the deflector power supply 64235 can provide a positive deflector bias voltage to a first deflector plate 64106*b* relative to a ground voltage of a second deflector plate 64106*a*, or (ii) provide a negative deflector bias voltage to the first deflector plate 64106*a* relative to the ground voltage of the second deflector plate 64106*b*, or (iii) provide a first deflector bias voltage to the first deflector plate 64106*b* and a second deflector bias voltage to the second deflector plate 64106*a*.

The deflector control circuit 65241 (FIG. 65) can be configured to vary a voltage of the deflector power supply 64235 to cause the deflector 64106*a/b* to vary a deflection of an ion component. The deflector control circuit 65241 (FIG. 65) can be configured to vary the voltage of the deflector power supply 64235 based on (i) a triangular sawtooth variation of the voltage with time, or (ii) a voltage waveform to control a peak width and temporal position, relative to other ion components, of the displaced ion component. It will be appreciated that other variations of the deflector power supply 64235 can be used; for example, linear or nonlinear variations can be used. The deflector voltage can also be varied with pressure, to eliminate peak movement versus time. The deflector control circuit 65241 (FIG. 65) can be configured to scan a voltage of the deflector power supply 64235 to cause the deflector 64106*a/b* to deflect plural ion components to be detected by the detector in succession as the voltage of the deflector power supply 64235 is scanned. The deflector control circuit 65241 (FIG. 65) can be configured to scan the voltage of the deflector power supply 64235 to permit detection of a mass spectrum of the plural ion components (as, for example, in FIG. 52). The deflector control circuit 65241 (FIG. 65) can be configured to vary a voltage of the deflector power supply 64235, as a voltage of the anode electrode 64002 changes, to cause the deflector 64106*a/b* to direct an ion component to the detector without changing a time position of the ion component at the detector relative to other ion components as the voltage of the anode electrode changes. In this regard, as the anode voltage decreases, the energy of the ion components decreases, and their radius of curvature for magnetic deflection increases; thus, the electric field at which the ion components reach the detector changes. Thus, by adjusting the voltage time dependence of the deflector power supply 64235, using deflector control circuit 65241 (FIG. 65), the deflector can make the ion components arrive at the detector at the same time position, relative to other ion components, independent of the anode voltage. In addition, as the anode voltage drops, and hence the energy of the ion components decreases, the voltage of the detector high energy filter power supply 64118 needs to be adjusted, using detector high energy filter control circuit 65295 (see FIG. 65).

The detector high energy filter power supply 64118 can be configured to vary a bias voltage of the detector high energy filter 64042 based on a voltage of the anode electrode 64002. For example, a detector high energy filter control circuit 65295 (see FIG. 65) of the processor can generate digital signals, processed by the digital to analog converter 64237, which in turn provides analog control signals to the detector high energy filter power supply 64118, to vary the bias voltage of the detector high energy filter 64042. For example, as the voltage of the anode falls, the bias voltage of the high energy filter 64042 can be reduced to maintain consistent signals for the ion components.

Figure 65:
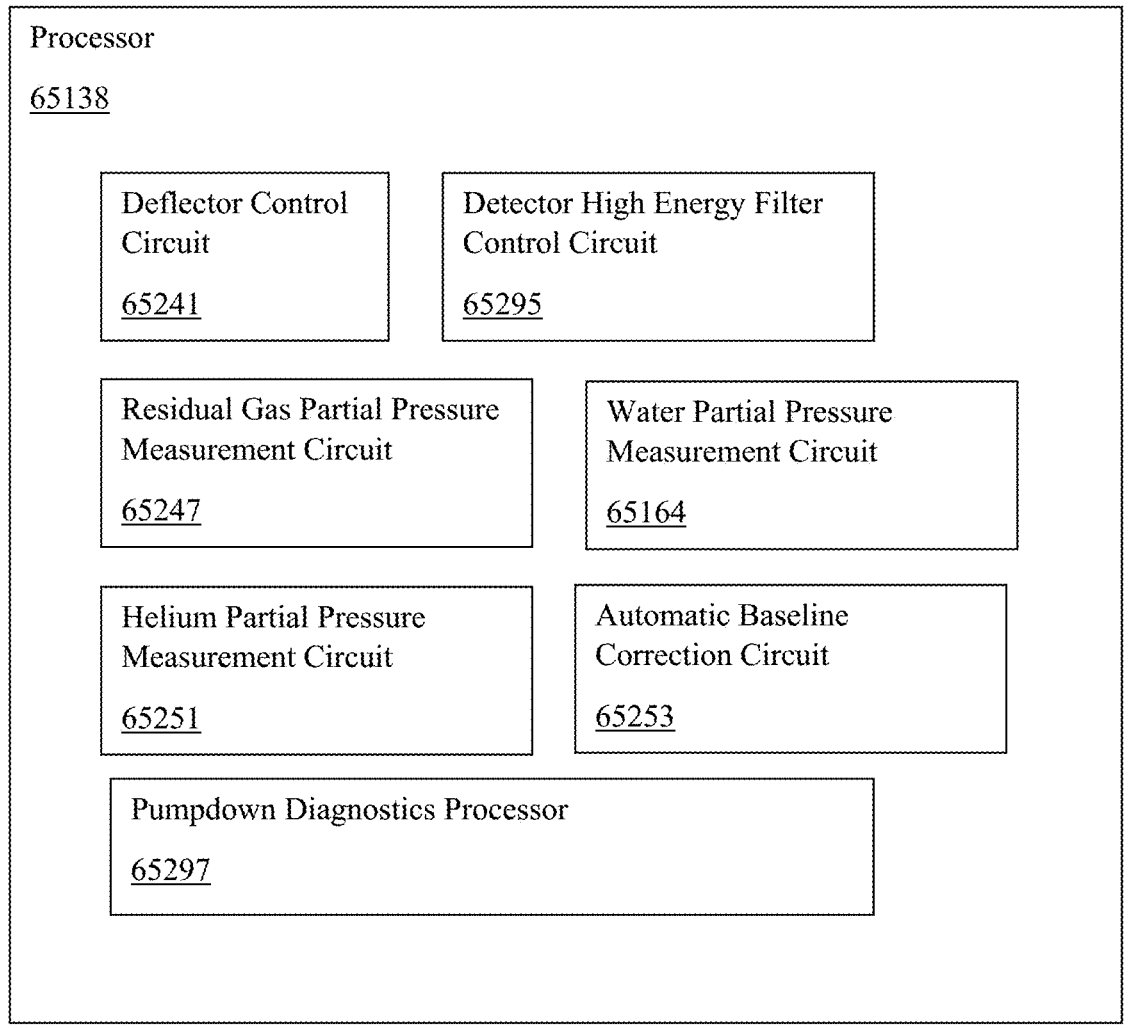
FIG. 65 is a schematic block diagram of a processor used in the electrical control circuit of FIG. 64, in accordance with an embodiment of the invention.

FIG. 65 is a schematic block diagram of a processor 65138 used in the electrical control circuit of FIG. 64, in accordance with an embodiment of the invention. The processor 65138 includes the deflector control circuit 65241, a detector high energy filter control circuit 65295, a residual gas partial pressure measurement circuit 65247 configured to determine a residual gas partial pressure based on a current produced by the detector; a water partial pressure measurement circuit 65164 configured to determine a water partial pressure based on a current produced by the detector; a helium partial pressure measurement circuit 65251 configured to determine a helium partial pressure based on a current produced by detection of the helium by the detector; an automatic baseline correction circuit 65253 configured to perform a baseline correction of the helium partial pressure; and a pumpdown diagnostics processor 65297, the operation of which is described with reference to FIG. 68. The residual gas partial pressure measurement circuit 65247, the water partial pressure measurement circuit 65164, and the helium partial pressure measurement circuit 65251 can, for example, be implemented in a similar fashion to partial pressure circuit 31146 (see FIG. 31), for example including look up tables (LUT's) as for partial pressure circuit 31146. The automatic baseline correction circuit 65253 can, for example, be used to subtract a baseline from the helium peak of the mass spectrum (see FIG. 52), before the helium partial pressure is determined by the helium partial pressure measurement circuit 65251.

FIG. 66 is a schematic block diagram of a deflector control circuit 66241, in accordance with an embodiment of the invention. The deflector control circuit 66241 can, for example, include a sawtooth voltage processor 66283, which produces a triangular sawtooth variation of the deflector voltage with time. Alternatively, or in addition, the deflector control circuit 66241 can include a peak width control processor 66285, which produces a voltage waveform to control a peak width and temporal position, relative to other ion components, of a displaced ion component. Alternatively, or in addition, the deflector control circuit 66241 can include a deflector voltage scanning processor 66287, which scans the voltage of the deflector power supply to deflect plural ion components to be detected by the detector in succession, for example to permit detection of a mass spectrum of the plural ion components. Alternatively, or in addition, the deflector control circuit 66241 can include an anode voltage deflector control processor 66289, which varies the voltage of the deflector power supply as a voltage of the anode changes, for example by varying linearly with the anode voltage.

In another embodiment, the anode voltage control circuit (see 29164 of FIG. 29) can be configured to vary a voltage of the anode electrode 29002 based on the total current, $I_T$, flowing between the anode electrode and the cathode electrode assembly. For this purpose, the anode voltage control circuit 67164 of FIG. 67 includes a low voltage setting circuit 67291 and a high voltage setting circuit 67293. These can be used when, as total pressure is increased, the anode voltage starts to drop, which occurs when a current limiting resistor is used. In one example, anode high voltage power supply 64116 (see FIG. 64) can operate at two different voltage settings based on signals from the anode voltage control circuit 67164, which can, for example, include components that receive control signals from the low voltage setting circuit 67291 and the high voltage setting circuit 67293 of the anode voltage control circuit 67164. Here, the two voltage settings are a low voltage setting for a total current, $I_T$, that corresponds to a total pressure less than an electronically stored threshold pressure, such as $10^{-5}$ Torr, and a high voltage setting for pressures greater than the electronically stored threshold pressure. For example, the low voltage can be 1400 V, while the high voltage setting can be 2000 V or 2500 V. In another version, the anode high voltage supply bias can be adjusted before leak detection starts to provide an anode voltage identical to the one selected for low pressure operation.

Figure 68:
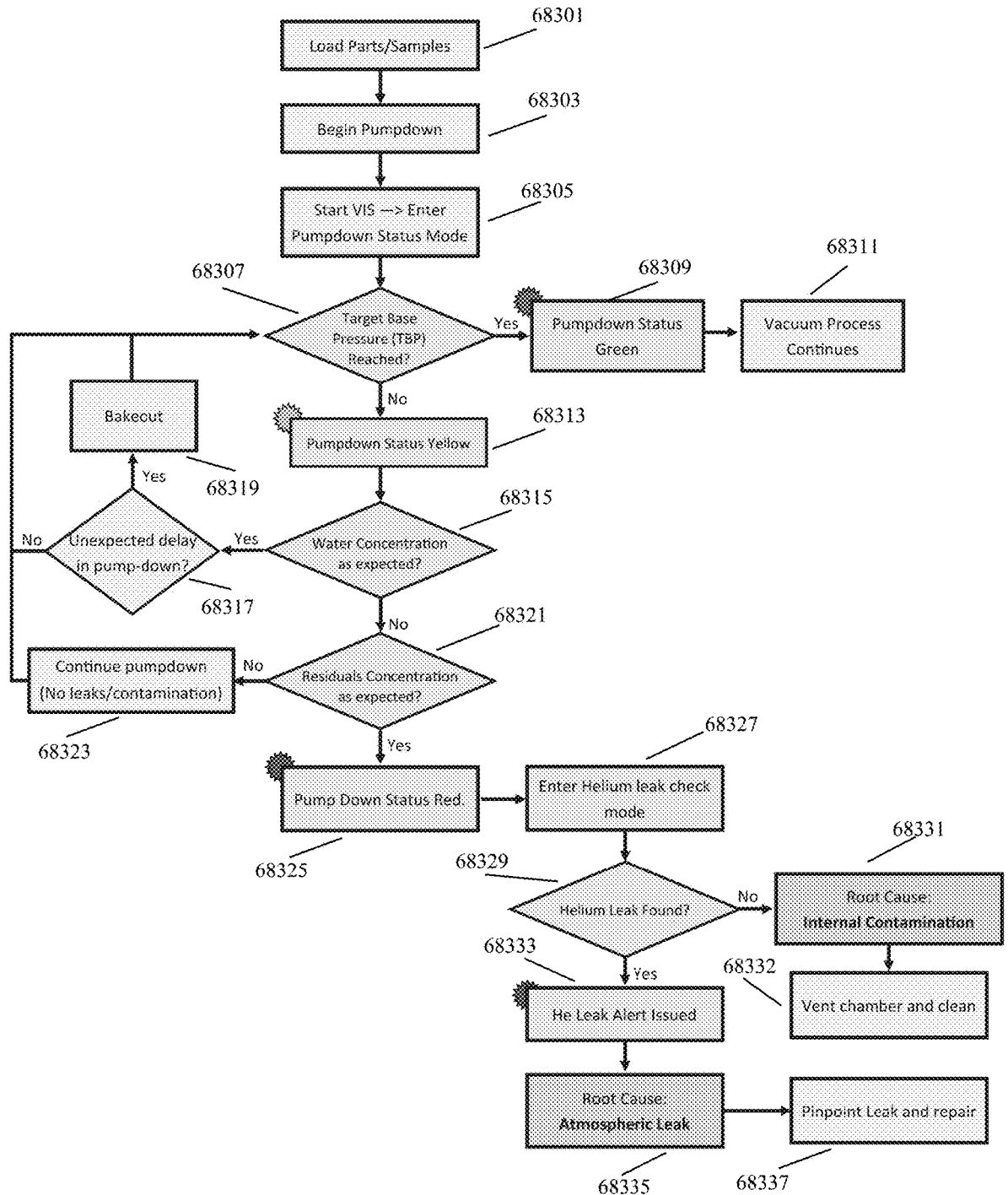
FIG. 68 is a schematic diagram of an example of a process flow implemented by a pumpdown diagnostics processor, in accordance with an embodiment of the invention.

FIG. 68 is a schematic diagram of an example of a process flow implemented by a pumpdown diagnostics processor 65297 (FIG. 65), in accordance with an embodiment of the invention. In the process flow, a user loads parts or samples 68301 into a monitored chamber, and pumpdown is begun 68303. The vacuum gauge (here indicated as VIS, vacuum integrity system) is started, and the processor 65297 enters pumpdown status mode, 68305. In 68307, the processor 65297 determines whether a target base pressure has been reached. If yes, at 68309, a pumpdown status indicator can be provided to indicate this to the user (for example, with a green or other color indicator via remote display 64140 of FIG. 64), and the vacuum process continues 68311. If not, then a pumpdown status indicator can likewise indicate a caution to the user (for example, with a yellow or other color indicator via remote display 64140 of FIG. 64) at 68313. The processor 65297 determines if the water concentration is as expected, at 68315. If not, then at 68317 it is determined whether there is an unexpected delay in pumpdown. If yes, then at 68319 a bakeout procedure is performed. If not, then it is again determined at 68307 whether a target base pressure is reached. If the water concentration was as expected, at 68315, then the processor 65297 determines whether a residuals concentration is as expected, at 68321. If yes, then at 68323 the pumpdown is continued and the process returns to step 68307. If not, then a pumpdown status indicator can be set to an alert status (for example, with a red or other color indicator via remote display 64140 of FIG. 64) at 68325. The processor 65297 then enters a helium leak check mode at 68327. If a helium leak is not found, at 68329, then a root cause diagnosis of internal contamination 68331 is made by the processor 65297, and the user vents the chamber and cleans it 68332. If a helium leak is found, at 68333 a helium leak alert is issued, for example using alert indicator 64245 (see FIG. 64) or via the remote display 64140. Next, at 68335, a root cause diagnosis of atmospheric leak is made by the processor 65297, and the user pinpoints the leak and repairs it at 68337. In one example, as a rule of thumb, a helium leak can be diagnosed by setting a helium leak detection alarm threshold at about 27% of the targeted base pressure of the monitored chamber. It will be appreciated that other alarm thresholds can be set by the processor 65297. In the process flow of FIG. 68, user definable values include: target base pressure; percent water threshold; residuals partial pressure threshold (pumpdown status mode); and helium partial pressure threshold (helium detection mode).

There is next discussed the relationship between pressure, anode voltage, detector aperture voltage, and peak positions, in accordance with an embodiment of the invention.

Anode voltage affects the sensitivity of the device directly. For the same pressure, given that the discharge impedance varies little with anode voltage, there is a higher total pressure current ($I_T$) when the anode voltage increases. Sensitivity increases with an increase in anode voltage. However, this increase in sensitivity comes at the expense of resolution. An increase in anode voltage results in a decrease in resolution. In one example, the anode voltage is Va=1500V. This is a voltage that can be controlled with standard electronics, does not require extreme insulation and clearances and uses lower cost insulators. The anode voltage can, for example, be as high as 2500V. As noted above, during operation of the instrument, the anode voltage does not remain constant, but rather drops as the pressure increases due to the current limiting resistor. This means that the energy of the ions will change with pressure. Thus, the detector energy filtering needs to be adjusted to make sure that the ions still reach the Faraday collector, for example using detector high energy filter control circuit 65295 (FIG. 65).

The deflector voltage can be swept to provide a low resolution spectrum, using deflector control circuit 66241 (FIG. 66), or can be set to a fixed value for single ion monitoring. In one example, the scan conditions can be 0 V to 700V with shorter deflector plates (for example, 1" long) and 0 V to 500V for longer deflector plates (for example, 1.5" long). The deflector voltage decreases as the deflector plates are positioned closer together, or are longer. The mass spectra generated (as, for example, in FIG. 52) can, for example, show partial pressure current readings ($I_{PP}$) plotted vs. deflector voltage, $V_d$. For a standard scan rate of 2.5 seconds, for example, typical peak widths are 100 msec (water and impurities) to 300 msec (helium and hydrogen). As the anode voltage changes with pressure in a unit with a current limiting resistor, the ion energies will change and the deflector voltage required to detect a specific mass will also need to change. However, it has been found that the effect is not so large that the ions are lost from the scan as the anode voltage value drops. As the anode voltage drops, the ions do move and they do change both position and width, but the effect is predictable and does not seriously affect resolution.

In one example, the deflector plates are scanned, using deflector control circuit 66241 (FIG. 66), between 0 V and 500V in 2.5 seconds. The rotational orientation of the source aperture is carefully optimized to make sure that for water and residual gases (such as in the 30 amu range), the deflectors not only provide mass separation, but also additional energy focusing, for example using the cathode rotation coupling 54207 (FIG. 54). In other words, the rotation of the source aperture is carefully adjusted so that water and residual gases reach the detector at a deflector voltage that also provides electrostatic energy focusing for those ions. For parallel plates, not all ion masses will experience energy focusing during a single sweep. Where there is a higher resolution requirement for water, the source aperture orientation can be chosen so that water is energy focused, even if helium and hydrogen are not as well energy focused. An example procedure is as follows: the scan is started and the system is pressurized with equal amounts of nitrogen and water. The rotational orientation of the source aperture is changed using the cathode rotation coupling 54207 (FIG. 54) until an optimum valley separation is seen between the nitrogen peak (28 amu) and the water peak (18 amu). As the ideal energy focusing rotational angle is reached, the peaks become sharper, the valley between peaks lower and the amplitude higher.

Detector high energy filter 64042 (see FIG. 64) can be used to improve resolution. In one example, different detector high energy filter voltages can be used for different species. For the resolution of water and residual gases, for an anode voltage of 1500 V, the detector high energy filter 64042 can have a bias voltage of, for example, between 850 V and 1100V. This provides a significant amount of energy filtering as needed to support the required resolving power needed to separate water from residuals. However, this means that as the anode voltage drops with increasing pressure, the high energy filter voltage must be adjusted to make sure that there is adequate sensitivity. As the anode voltage changes with pressure, the high energy filter voltage value can, for example, be adjusted with a linear relationship to the anode voltage, using detector high energy filter control circuit 65295. In one example, the high energy filter voltage can be reduced, using detector high energy filter control circuit 65295, to be reduced in proportion to the anode voltage. The anode voltage at any pressure can, for example, be calculated by the high energy filter control circuit 65295 to be the voltage of the anode high voltage power supply 64116 minus the voltage drop across the current limiting resistor. For example, if the voltage of the anode high voltage power supply is 1500 V, and the detector filter high voltage power supply 64118 starts at 800 V at high vacuum, then the detector filter high voltage power supply 64118 voltage is adjusted as: $VF=(800/1500)*(1500-R_I*I_T)$ where $V_F$ is the voltage of the detector high voltage power supply 64118, $R_I$ is the resistance of the current limiting resistor, and $I_T$ is the total current through the current limiting resistor.

Figure 69:
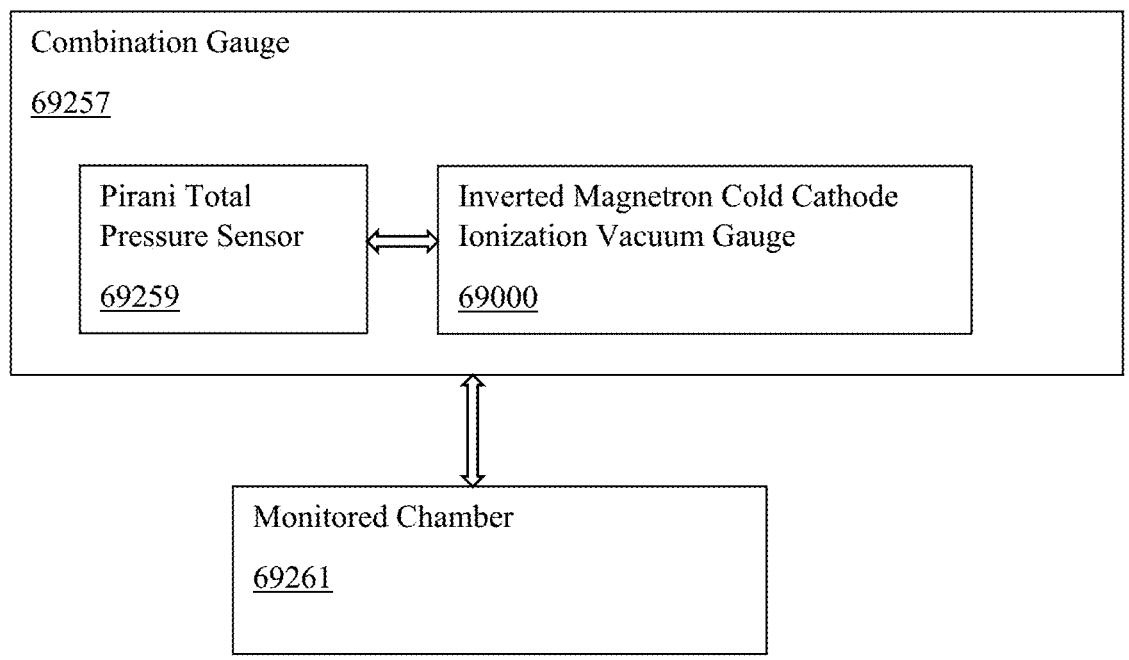
FIG. 69 is schematic block diagram of a system in which the inverted magnetron cold cathode ionization vacuum gauge is a portion of a combination gauge, in accordance with an embodiment of the invention.

FIG. 69 is schematic block diagram of a system in which the inverted magnetron cold cathode ionization vacuum gauge is a portion of a combination gauge 69257, in accordance with an embodiment of the invention. The combination gauge 69257 includes a high pressure total pressure sensor 69259 connected to measure a total pressure of the gas from a monitored chamber 69261 when the total pressure is greater than a threshold total pressure, such as about $10^{-4}$ Torr or about $10^{-5}$ Torr, and the inverted magnetron cold cathode ionization vacuum gauge 69000 connected to measure the total pressure of the gas from the monitored chamber 69261 when the total pressure is less than the threshold pressure of the high pressure total pressure sensor. The high pressure total pressure sensor can, for example, comprise a Pirani total pressure sensor, or a combination of a Pirani gauge and a Piezo differential pressure sensor, and the threshold total pressure can, for example, be one of about $10^{-4}$ Torr or about $10^{-5}$ Torr. In one example, a combination Pirani Piezo sensor can be a Series 901P MicroPirani™/Piezo Load Lock Transducer, sold by MKS Instruments, Inc., of Andover, Mass., U.S.A. An analog signal 64255 from the high pressure total pressure sensor can be received by the analog to digital converter 64124 of FIG. 64. Use of a Pirani or combination Pirani Piezo total pressure sensor 69259 in such a combination gauge can, for example, allow operation of the vacuum gauge 69000 to follow a pumpdown from atmospheric pressure. A control logic circuit of the combination gauge 69257 can be used to turn on the vacuum gauge 69000 when the pressure of the monitored chamber 69261 is safe for the vacuum gauge 69000 to turn on, which can be less than a threshold total pressure. The Pirani or other high pressure total pressure sensor 69259 can also provide overpressure protection of the vacuum gauge. For systems with large leaks, the Pirani or other high pressure total pressure sensor 69259 can be used to perform helium leak detection, based on the idea that the thermal conductivity of helium gas is much larger than that of common residual gases such as air or contaminants.

In another embodiment according to the invention, an inverted magnetron cold cathode ionization vacuum gauge as taught herein is used without determining a total pressure based on a total current between an anode electrode and the cathode electrode assembly. Instead, the vacuum gauge is used for partial pressure determination, such as a partial pressure of helium, for example for helium leak detection. In such an embodiment, it is advantageous to use a gas inlet passage that is positioned to flow the gas from the monitored chamber to the opening in the cathode electrode assembly, wherein the emitted portion of the ions travel in a direction counter to the flow of the gas from the monitored chamber in the gas inlet passage, as shown for example in the embodiment of FIG. 3.

In another embodiment according to the invention, total pressure is determined using the impedance of the discharge as the measure of pressure (while still being based at least in part on the total current flowing between the anode electrode and the cathode assembly). In this case, the anode voltage is measured, as well as the current from the anode to the cathode, and the impedance is determined using Ohm's law. Using the impedance can, for example, provide the advantage that it is not dependent on the anode voltage, which can change with pressure due to a limiting resistor.

In use of an embodiment according to the invention, the vacuum gauge can be used to assist with troubleshooting of a high vacuum system. The standard workflow for operation of a high vacuum system starts with a pumpdown. During the pumpdown procedure, the system is sealed (i.e. all input valves closed) and the pressure is monitored over time, while the system is pumped, looking to achieve a target base pressure within a specified amount of time. If the target pressure is indeed achieved in the expected amount of time, the integrity of the vacuum system is verified and the process or experiment can start. On the other hand, if the target pressure is not achieved after the expected amount of time, the integrity of the vacuum system comes under scrutiny. This situation provides a scenario in which an embodiment according to the invention can, for example, be used. A vacuum gauge in accordance with an embodiment of the invention allows a vacuum system owner to immediately diagnose possible root cause for the vacuum integrity issues prompted by the lower than usual pumpdown. Using a vacuum gauge in accordance with an embodiment of the invention, a user can immediately diagnose if a slow pumpdown is caused by an air leak in the system or by water outgassing (if the drydown option is available). If the problem is indeed a leak, the vacuum gauge in accordance with an embodiment of the invention can now be used to pinpoint the source of the leak. If no leak is detected, the vacuum user is directed towards the identification of contamination sources and reduction of outgassing via bakeouts. A vacuum gauge in accordance with an embodiment of the invention, therefore, can be used to assist to remove guess work during vacuum system integrity diagnostics.

By contrast with prior work, a total pressure measurement embodiment—in addition to measuring partial pressure—permits the measurement of total pressure in a monitored chamber over a full range of pressures between about $10^{-9}$ and about $10^{-2}$ Torr, such as between about $10^{-8}$ and about $10^{-3}$ Torr total pressure, whereas, previous gauges encountered unpredictable sensitivity changes above $10^{-6}$ Torr, which is an important pressure range for high vacuum systems In order to have accurate pressure measurement over the entire pressure range, the pure electron plasma (see 13068 in FIG. 13A) should not change electron density and/or shape during operation. Changes in shape lead to abrupt changes in the ion signal, known as discontinuities. Discontinuities limit the ability to measure total pressure over large pressure ranges when present in a design. In order to reduce or prevent discontinuities, a number of techniques can be used. For example, high quality magnets with uniform magnetization throughout their volume can be used. The magnetic field can be kept less than or equal to about 1 kilogauss in magnetic field strength. The magnet rotation can be adjusted or tuned to minimize discontinuities. The anode voltage can be controlled (for example, using anode voltage control circuit 29164 of FIG. 29) to avoid discontinuity points. In addition, use of a symmetric magnet assembly, such as a radially symmetric magnet assembly, helps to reduce or avoid discontinuities to permit an embodiment to be used a sensor to measure total pressure over a full range of pressures.

Embodiments according to the invention can be used in a high vacuum system. As used herein, a "high vacuum system" is one in which a gas in a monitored chamber comprises a pressure between about $10^{-9}$ Torr and about $10^{-4}$ Torr.

As used herein, a numerical quantity indicated as being "about" a given numerical value can, for example, be within about 10% of the given numerical value, such as within about 5% of the given numerical value, for example within about 1% of the given numerical value, or may be equal to the given numerical value.

Portions of the above-described methods and systems can be implemented using one or more computer systems, for example to permit automated implementation of diagnostics and control techniques discussed herein. For example, techniques can be implemented using hardware, software or a combination thereof. When implemented in software, the software code can be executed on any suitable processor or collection of processors, whether provided in a single computer or distributed among multiple computers.

Although example embodiments have been particularly shown and described, it will be understood by those skilled in the art that features of example embodiments herein can be combined, in accordance with the teachings herein and the appended claims.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An inverted magnetron cold cathode ionization vacuum gauge comprising:
an anode electrode;
a cathode electrode assembly surrounding a length of the anode electrode and positioned to create an electric field in a discharge space between the cathode electrode assembly and the anode electrode;
a magnet assembly positioned to define a magnetic field across the electric field;
an opening in the cathode electrode assembly positioned to permit entry of a gas from a monitored chamber into the discharge space such that ions of the gas are formed in the discharge space to be accelerated by the electric field in a direction towards the cathode electrode assembly;
a source aperture in the cathode electrode assembly positioned to emit a portion of the ions of the gas out of the cathode electrode assembly;
the magnet assembly positioned to angularly displace the emitted portion of the ions based on a mass to charge ratio of ions of the gas;
a detector positioned to detect a displaced ion component of the emitted portion of the ions; and
ion current measurement circuitry electrically connected to measure a total current flowing between the anode electrode and the cathode electrode assembly, and electrically connected to measure a current produced from receipt of the displaced ion component at the detector.

2. The inverted magnetron cold cathode ionization vacuum gauge of claim 1, further comprising:
a total pressure display, in electrical connection with the ion current measurement circuitry, comprising an indication of a total pressure of the gas from the monitored chamber; and
a partial pressure display, in electrical connection with the ion current measurement circuitry, comprising an indication of a partial pressure of a gas from the monitored chamber.

3. The inverted magnetron cold cathode ionization vacuum gauge of claim 1, further comprising a gas inlet passage positioned to flow the gas from the monitored chamber to the opening in the cathode electrode assembly, wherein the emitted portion of the ions travel in a direction counter to the flow of the gas from the monitored chamber in the gas inlet passage.

4. The inverted magnetron cold cathode ionization vacuum gauge of claim 1, further comprising an electrostatic shield grid positioned between the source aperture and the detector.

5. The inverted magnetron cold cathode ionization vacuum gauge of claim 1, further comprising an energy filter grid positioned between the source aperture and the detector.

6. The inverted magnetron cold cathode ionization vacuum gauge of claim 5, wherein the detector comprises:
an ion shield;
a detector aperture; and
a Faraday collector.

7. The inverted magnetron cold cathode ionization vacuum gauge of claim 5, wherein the detector comprises an electron multiplier.

8. The inverted magnetron cold cathode ionization vacuum gauge of claim 5, further comprising:
a power supply; and
a current limiting circuit electrically connected between the power supply and the anode electrode.

9. The inverted magnetron cold cathode ionization vacuum gauge of claim 5, comprising an anode voltage control circuit configured to maintain a constant voltage of the anode electrode independent of the total current flowing between the anode electrode and the cathode electrode assembly.

10. The magnetron cold cathode ionization vacuum gauge of claim 5, comprising an anode voltage control circuit configured to vary a voltage of the anode electrode based on the total current flowing between the anode electrode and the cathode electrode assembly.

11. The inverted magnetron cold cathode ionization vacuum gauge of claim 5, further comprising a magnetic field extension assembly positioned to extend the magnetic field outside the cathode electrode assembly.

12. The inverted magnetron cold cathode ionization vacuum gauge of claim 5, further comprising a high pass ion energy filter configured to permit only ions that have energies higher than a desired threshold energy to be detected.

13. The inverted magnetron cold cathode ionization vacuum gauge of claim 12, wherein the high pass ion energy filter comprises a voltage source applying a bias voltage to the detector.

14. The inverted magnetron cold cathode ionization vacuum gauge of claim 12, further comprising a voltage source configured to vary a bias voltage of the high pass ion energy filter based on a voltage of the anode electrode.

15. The inverted magnetron cold cathode ionization vacuum gauge of claim 5, further comprising a low pass ion energy filter configured to permit only ions that have energies lower than a desired threshold energy to be detected.

16. The inverted magnetron cold cathode ionization vacuum gauge of claim 15, wherein the low pass ion energy filter comprises:
a voltage-biased deflector plate; and
a collector plate of the detector.

17. The inverted magnetron cold cathode ionization vacuum gauge of claim 5, wherein the magnet assembly comprises a flat plate magnet positioned to define both the magnetic field across the electric field and an external magnetic field outside the cathode electrode assembly.

18. The inverted magnetron cold cathode ionization vacuum gauge of claim 5, further comprising a total pressure determination circuit configured to determine a total pressure of the gas from the monitored chamber based at least on a total current flowing between the anode electrode and the cathode electrode assembly.

19. The inverted magnetron cold cathode ionization vacuum gauge of claim 5, further comprising a quadrupole mass filter positioned between the source aperture and the detector.

20. The inverted magnetron cold cathode ionization vacuum gauge of claim 5, wherein the displaced ion components comprise at least one of: helium ions, hydrogen ions, water ions, and residual gas ions.

21. The inverted magnetron cold cathode ionization vacuum gauge of claim 20, wherein the displaced ion components comprise helium ions separated from other components of the gas from the monitored chamber.

22. The inverted magnetron cold cathode ionization vacuum gauge of claim 20, wherein the displaced ion components comprise water ions separated from other components of the gas from the monitored chamber.

23. The inverted magnetron cold cathode ionization vacuum gauge of claim 20, wherein the displaced ion components comprise both displaced helium ions and displaced water ions, each separated from each other and from other components of the gas from the monitored chamber.

24. The inverted magnetron cold cathode ionization vacuum gauge of claim 5, further comprising a cathode rotation coupling.

25. The inverted magnetron cold cathode ionization vacuum gauge of claim 5, further comprising an ion beam deflector positioned between the source aperture and the detector.

26. The inverted magnetron cold cathode ionization vacuum gauge of claim 25, wherein the ion beam deflector comprises a pair of parallel plates.

27. The inverted magnetron cold cathode ionization vacuum gauge of claim 25, wherein the ion beam deflector comprises a pair of curved plates.

28. The inverted magnetron cold cathode ionization vacuum gauge of claim 25, further comprising a deflector power supply electrically connected to the ion beam deflector to create an electrostatic field between a pair of deflector plates of the ion beam deflector.

29. The inverted magnetron cold cathode ionization vacuum gauge of claim 28, wherein the deflector power supply is electrically connected to (i) provide a positive deflector bias voltage to a first deflector plate of the ion beam deflector relative to a ground voltage of a second deflector plate of the ion beam deflector, or (ii) provide a negative deflector bias voltage to the first deflector plate relative to the ground voltage of the second deflector plate, or (iii) provide a first deflector bias voltage to the first deflector plate and a second deflector bias voltage to the second deflector plate.

30. The inverted magnetron cold cathode ionization vacuum gauge of claim 28, further comprising a deflector control circuit configured to supply a deflector control signal to the deflector power supply.

31. The inverted magnetron cold cathode ionization vacuum gauge of claim 30, wherein the deflector control circuit is configured to vary a voltage of the deflector power supply to cause the ion beam deflector to vary a deflection of the displaced ion component of the emitted portion of the ions.

32. The inverted magnetron cold cathode ionization vacuum gauge of claim 31, wherein the deflector control circuit is configured to vary the voltage of the deflector power supply based on (i) a triangular sawtooth variation of the voltage with time, or (ii) a voltage waveform to control a peak width and temporal position, relative to other ion components, of the displaced ion component.

33. The inverted magnetron cold cathode ionization vacuum gauge of claim 31, wherein the deflector control circuit is configured to scan a voltage of the deflector power supply to cause the ion beam deflector to deflect plural ion components to be detected by the detector in succession as the voltage of the deflector power supply is scanned.

34. The inverted magnetron cold cathode ionization vacuum gauge of claim 33, wherein the deflector control circuit is configured to scan the voltage of the deflector power supply to permit detection of a mass spectrum of the plural ion components.

35. The inverted magnetron cold cathode ionization vacuum gauge of claim 33, wherein one of the ion components is a residual gas.

36. The inverted magnetron cold cathode ionization vacuum gauge of claim 1, further comprising an automatic baseline correction circuit configured to perform a baseline correction of a helium partial pressure.

37. The inverted magnetron cold cathode ionization vacuum gauge of claim 30, wherein the deflector control circuit is configured to control a voltage of the deflector power supply to cause the ion beam deflector to direct displaced ion components having different energies and a common ion component mass to be focused through a detector aperture of the detector.

38. The inverted magnetron cold cathode ionization vacuum gauge of claim 37, further comprising:
a cathode rotation coupling; and
an actuator configured to rotate the cathode electrode assembly using the cathode rotation coupling so that the displaced ion components having different energies are directed to the detector at the voltage of the deflector power supply that causes the displaced ion components having different energies to be focused through the detector aperture of the detector.

39. The inverted magnetron cold cathode ionization vacuum gauge of claim 30, wherein the deflector control circuit is configured to vary a voltage of the deflector power supply, as a voltage of the anode electrode changes, to cause the ion beam deflector to direct the displaced ion component to the detector without changing a time position of the displaced ion component at the detector relative to other ion components as the voltage of the anode electrode changes.

40. The inverted magnetron cold cathode ionization vacuum gauge of claim 25, further comprising a cathode rotation coupling.

41. The inverted magnetron cold cathode ionization vacuum gauge of claim 25, further comprising a high pass ion energy filter configured to permit only ions that have energies higher than a desired threshold energy to be detected.

42. The inverted magnetron cold cathode ionization vacuum gauge of claim 41, further comprising a high energy filter control circuit configured to reduce a bias voltage of the high pass ion energy filter in proportion to a voltage of the anode electrode.

43. The inverted magnetron cold cathode ionization vacuum gauge of claim 5, further comprising:
a partial pressure display, in electrical connection with the ion current measurement circuitry, comprising an indication of a partial pressure of a gas from the monitored chamber; and
a partial pressure determination circuit configured to determine the partial pressure of the gas from the monitored chamber based at least on the current, produced from receipt of the displaced ion component at the detector, measured by the ion current measurement circuitry.

44. The inverted magnetron cold cathode ionization vacuum gauge of claim 5, wherein the inverted magnetron cold cathode ionization vacuum gauge is included in a modular unit comprising:
a total pressure display, in electrical connection with the ion current measurement circuitry, comprising an indication of a total pressure of the gas from the monitored chamber;
a partial pressure display, in electrical connection with the ion current measurement circuitry, comprising an indication of a partial pressure of a gas from the monitored chamber; and
the ion current measurement circuitry.

45. The inverted magnetron cold cathode ionization vacuum gauge of claim 5, wherein the ion current measurement circuitry comprises a first ion current measurement circuit electrically connected to measure the total current flowing between the anode electrode and the cathode electrode assembly, and a second ion current measurement circuit electrically connected to measure the current produced from receipt of the displaced ion component at the detector.

46. The inverted magnetron cold cathode ionization vacuum gauge of claim 5, further comprising a dual signal leak detection circuit configured to determine a concurrent occurrence of both: (i) a decrease in the total current, flowing between the anode electrode and the cathode electrode assembly, measured by the ion current measurement circuitry, and (ii) an increase in the current, produced from receipt of the displaced ion component at the detector, measured by the ion current measurement circuitry.

47. The inverted magnetron cold cathode ionization vacuum gauge of claim 46, further comprising a dual signal leak detection display comprising an indication of pressure data for a leak based on the concurrent occurrence determined by the dual signal leak detection circuit.

48. The inverted magnetron cold cathode ionization vacuum gauge of claim 5, further comprising a detector shield surrounding a length of the detector, the detector shield comprising a detector aperture.

49. The inverted magnetron cold cathode ionization vacuum gauge of claim 48, comprising an energy filter grid surrounding or covering the detector aperture.

50. The inverted magnetron cold cathode ionization vacuum gauge of claim 48, further comprising a detector shield electrical connector that is in electrical connection between the detector shield and a voltage source applying a bias voltage to the detector shield.

51. The inverted magnetron cold cathode ionization vacuum gauge of claim 48, wherein the detector shield is grounded.

52. The inverted magnetron cold cathode ionization vacuum gauge of claim 5, further comprising a magnetic field extension assembly positioned to extend the magnetic field in a direction extending longitudinally from the source aperture towards the detector.

53. The inverted magnetron cold cathode ionization vacuum gauge of claim 52, wherein the magnetic field extension assembly comprises a magnet positioned to increase a magnetic field between the magnet assembly and the detector.

54. The inverted magnetron cold cathode ionization vacuum gauge of claim 52, wherein the magnetic field extension assembly comprises a magnetic yoke surrounding at least part of an outside of a passage that extends between the source aperture and the detector.

55. The inverted magnetron cold cathode ionization vacuum gauge of claim 1, wherein the inverted magnetron cold cathode ionization vacuum gauge comprises a portion of a combination gauge that further comprises a high pressure total pressure sensor connected to measure a total pressure of the gas from the monitored chamber when the total pressure is greater than a threshold total pressure, and wherein the inverted magnetron cold cathode ionization vacuum gauge is connected to measure the total pressure of the gas from the monitored chamber when the total pressure is less than the threshold total pressure of the high pressure total pressure sensor, and wherein the high pressure total pressure sensor comprises a Pirani total pressure sensor or a combination of a Pirani gauge and a Piezo differential pressure sensor, and wherein the threshold total pressure is one of: about $10^{-4}$ Torr or about $10^{-5}$ Torr.

56. An inverted magnetron cold cathode ionization vacuum gauge comprising:
an anode electrode;
a cathode electrode assembly surrounding a length of the anode electrode and positioned to create an electric field in a discharge space between the cathode electrode assembly and the anode electrode;
a magnet assembly positioned to define a magnetic field across the electric field;
an opening in the cathode electrode assembly positioned to permit entry of a gas from a monitored chamber into the discharge space such that ions of the gas are formed in the discharge space to be accelerated by the electric field in a direction towards the cathode electrode assembly;
a source aperture in the cathode electrode assembly positioned to emit a portion of the ions of the gas out of the cathode electrode assembly;
the magnet assembly positioned to angularly displace the emitted portion of the ions based on a mass to charge ratio of ions of the gas;
a detector positioned to detect a displaced ion component of the emitted portion of the ions;
ion current measurement circuitry electrically connected to measure a current produced from receipt of the displaced ion component at the detector; and
a gas inlet passage positioned to flow the gas from the monitored chamber to the opening in the cathode electrode assembly, wherein the emitted portion of the ions travel in a direction counter to the flow of the gas from the monitored chamber in the gas inlet passage.

57. The inverted magnetron cold cathode ionization vacuum gauge of claim 56, wherein the displaced ion components comprise helium ions separated from other components of the gas from the monitored chamber.

58. An inverted magnetron cold cathode ionization source comprising:
an anode electrode;
a cathode electrode assembly surrounding a length of the anode electrode and positioned to create an electric field in a discharge space between the cathode electrode assembly and the anode electrode;
a magnet assembly positioned to define a magnetic field across the electric field;
an opening in the cathode electrode assembly positioned to permit entry of a gas from a chamber into the discharge space such that ions of the gas are formed in the discharge space to be accelerated by the electric field in a direction towards the cathode electrode assembly;
a source aperture in the cathode electrode assembly positioned to emit a portion of the ions of the gas out of the cathode electrode assembly; and
a magnetic sector, a quadrupole mass filter, a time-of-flight mass spectrometer, an ion trap, or a Radio Frequency dynamic ion trap, positioned to receive the ions of the gas emitted from the source aperture.

59. The inverted magnetron cold cathode ionization source of claim 58, further comprising:
a gas inlet passage positioned to flow the gas from the monitored chamber to the opening in the cathode electrode assembly, wherein the emitted portion of the ions travel in a direction counter to the flow of the gas from the monitored chamber in the gas inlet passage.

60. The inverted magnetron cold cathode ionization source of claim 58, further comprising:
ion current measurement circuitry electrically connected to measure a total current flowing between the anode electrode and the cathode electrode assembly.

61. A method of measuring a total pressure and a partial pressure from a gas in a monitored chamber, the method comprising:

applying a voltage between an anode electrode and a cathode electrode assembly of an inverted magnetron cold cathode ionization vacuum gauge, the cathode electrode assembly surrounding a length of the anode electrode, to create an electric field in a discharge space between the cathode electrode assembly and the anode electrode;
defining a magnetic field across the electric field using a magnet assembly;
permitting entry of a gas from the monitored chamber into the discharge space, through an opening in the cathode electrode assembly, such that ions of the gas are formed in the discharge space to be accelerated by the electric field in a direction towards the cathode electrode assembly;
emitting a portion of the ions of the gas out of the cathode electrode assembly through a source aperture in the cathode electrode assembly;
angularly displacing the emitted portion of the ions based on a mass to charge ratio of ions of the gas, using the magnet assembly;
detecting a displaced ion component of the emitted portion of the ions, using a detector;
measuring a total current flowing between the anode electrode and the cathode electrode assembly using ion current measurement circuitry;
displaying an indication of a total pressure of the gas from the monitored chamber based on the total current measured by the ion current measurement circuitry;
measuring a current produced from receipt of the displaced ion component at the detector using the ion current measurement circuitry; and
displaying an indication of a partial pressure of a gas from the monitored chamber based on the current, produced from receipt of the displaced ion component at the detector, measured by the ion current measurement circuitry.

62. The method of claim 61, further comprising maintaining a constant voltage of the anode electrode independent of the total current flowing between the anode electrode and the cathode electrode assembly.

63. The method of claim 61, further comprising performing high pass ion energy filtering to permit only ions of the emitted portion of the ions that have energies higher than a desired threshold energy to reach the detector.

64. The method of claim 61, further comprising performing low pass ion energy filtering to permit only ions of the emitted portion of the ions that have energies lower than a desired threshold energy to reach the detector.

65. The method of claim 61, further comprising diagnosing a vacuum system comprising the monitored chamber, the method further comprising measuring a current produced from receipt of a water ion component at the detector using the ion current measurement circuitry, and measuring a current produced from receipt of a residual gas ion component at the detector using the ion current measurement circuitry.

* * * * *

UNITED STATES PATENT AND TRADEMARK OFFICE
CERTIFICATE OF CORRECTION

Page 1 of 2

PATENT NO. : 10,928,265 B2
APPLICATION NO. : 16/397436
DATED : February 23, 2021
INVENTOR(S) : Gerardo A. Brucker, Timothy C. Swinney and Clinton L. Percy It is certified that error appears in the above-identified patent and that said Letters Patent is hereby corrected as shown below:

In the Claims

In Claim 6, Column 50, at Line 43, delete "gauge of claim 5," and insert -- gauge of claim 1, --.

In Claim 7, Column 50, at Line 48, delete "gauge of claim 5," and insert -- gauge of claim 1, --.

In Claim 8, Column 50, at Line 51, delete "gauge of claim 5," and insert -- gauge of claim 1, --.

In Claim 9, Column 50, at Line 56, delete "gauge of claim 5," and insert -- gauge of claim 1, --.

In Claim 10, Column 50, at Lines 61-62, delete "gauge of claim 5," and insert -- gauge of claim 1, --.

In Claim 11, Column 50, at Line 67, delete "gauge of claim 5," and insert -- gauge of claim 1, --.

In Claim 12, Column 51, at Line 4, delete "gauge of claim 5," and insert -- gauge of claim 1, --.

In Claim 15, Column 51, at Line 16, delete "gauge of claim 5," and insert -- gauge of claim 1, --.

In Claim 17, Column 51, at Line 26, delete "gauge of claim 5," and insert -- gauge of claim 1, --.

In Claim 18, Column 51, at Line 31, delete "gauge of claim 5," and insert -- gauge of claim 1, --.

In Claim 19, Column 51, at Line 38, delete "gauge of claim 5," and insert -- gauge of claim 1, --.

In Claim 20, Column 51, at Line 42, delete "gauge of claim 5," and insert -- gauge of claim 1, --.

In Claim 24, Column 51, at Line 59, delete "gauge of claim 5," and insert -- gauge of claim 1, --.

In Claim 25, Column 51, at Line 62, delete "gauge of claim 5," and insert -- gauge of claim 1, --.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,928,265 B2

In Claim 43, Column 53, at Line 28, delete "gauge of claim 5," and insert -- gauge of claim 1, --.

In Claim 44, Column 53, at Line 40, delete "gauge of claim 5," and insert -- gauge of claim 1, --.

In Claim 45, Column 53, at Line 53, delete "gauge of claim 5," and insert -- gauge of claim 1, --.

In Claim 46, Column 53, at Line 62, delete "gauge of claim 5," and insert -- gauge of claim 1, --.

In Claim 48, Column 54, at Line 9, delete "gauge of claim 5," and insert -- gauge of claim 1, --.

In Claim 52, Column 54, at Line 25, delete "gauge of claim 5," and insert -- gauge of claim 1, --.